(12) United States Patent
Crisp

(10) Patent No.: US 12,164,983 B1
(45) Date of Patent: Dec. 10, 2024

(54) SYSTEM LINKED ITEM

(71) Applicant: Jackson L. Crisp, Moorcroft, WY (US)

(72) Inventor: Jackson L. Crisp, Moorcroft, WY (US)

( * ) Notice: Subject to any disclaimer, the term of this patent is extended or adjusted under 35 U.S.C. 154(b) by 0 days.

(21) Appl. No.: 18/777,185

(22) Filed: Jul. 18, 2024

Related U.S. Application Data

(63) Continuation of application No. 18/363,696, filed on Aug. 1, 2023, now Pat. No. 12,093,760, which is a continuation of application No. 18/169,777, filed on Feb. 15, 2023, now Pat. No. 11,783,147, which is a continuation of application No. 17/492,464, filed on Oct. 1, 2021, now Pat. No. 11,630,976, which is a continuation of application No. 17/063,653, filed on Oct. 5, 2020, now Pat. No. 11,164,054, which is a continuation of application No. 16/717,365, filed on Dec. 17, 2019, now abandoned, which is a continuation of application No. 13/652,446, filed on Oct. 15, 2012, now Pat. No. 10,552,715.

(60) Provisional application No. 61/589,387, filed on Jan. 22, 2012, provisional application No. 61/632,397, filed on Oct. 15, 2011.

(51) Int. Cl.
| | |
|---|---|
| *G06K 15/00* | (2006.01) |
| *G06K 15/02* | (2006.01) |
| *G06Q 30/0241* | (2023.01) |
| *G09F 3/02* | (2006.01) |
| *G09F 3/10* | (2006.01) |
| *G09F 23/00* | (2006.01) |

(52) U.S. Cl.
CPC ......... *G06K 15/18* (2013.01); *G06Q 30/0276* (2013.01); *G09F 3/02* (2013.01); *G09F 3/10* (2013.01); *G09F 23/00* (2013.01); *G09F 2003/0201* (2013.01)

(58) Field of Classification Search
None
See application file for complete search history.

(56) References Cited

U.S. PATENT DOCUMENTS

| | | |
|---|---|---|
| 4,671,004 A | 6/1987 | Berg |
| 6,853,979 B1 | 2/2005 | Bass |
| 7,269,837 B1 | 9/2007 | Redling et al. |
| 7,864,947 B2 | 1/2011 | Weiss et al. |

(Continued)

OTHER PUBLICATIONS

U.S. Appl. No. 61/477,043, System for Facilitating Return of Lost Property, filed Apr. 19, 2011, 29 Pages.

(Continued)

*Primary Examiner* — Dung D Tran
(74) *Attorney, Agent, or Firm* — Newman Law, LLC

(57) ABSTRACT

An information product or item, such as a for sale sign, can be configured with contact information and/or elements that link the information product to a networked system and related services (with the product being called a for information product or FIP in the description). These services can make available applications such as phone and web application that can be helpful in providing an additional mechanism/electronic media as it relates to the FIP and/or any FIP related product/object/item. These services may aid someone to whom the FIP belongs in fielding, FIP related, viewer inquires while providing the FIP viewer with more options, upon making requests to said system services. The FIP may make available linked application system services to viewers of the FIP, which may belong to someone who does not know how to link such services in other ways.

26 Claims, 39 Drawing Sheets

(56) References Cited

U.S. PATENT DOCUMENTS

| | | |
|---|---|---|
| 8,150,156 B2 | 4/2012 | Geva et al. |
| 8,973,813 B2 | 3/2015 | Penny et al. |
| 2001/0001854 A1 | 5/2001 | Schena et al. |
| 2002/0023001 A1 | 2/2002 | McFarlin et al. |
| 2002/0036654 A1 | 3/2002 | Evans et al. |
| 2002/0198892 A1 | 12/2002 | Rychel et al. |
| 2004/0148830 A1 | 8/2004 | Baskerville |
| 2005/0087895 A1 | 4/2005 | Franko, Sr. |
| 2007/0057050 A1 | 3/2007 | Kuhno et al. |
| 2007/0154098 A1 | 7/2007 | Geva et al. |
| 2007/0201093 A1 | 8/2007 | Johnson, II et al. |
| 2007/0252378 A1 | 11/2007 | Chambers |
| 2010/0324997 A1 | 12/2010 | Evans |
| 2014/0312114 A1 | 10/2014 | Floyd et al. |
| 2018/0108051 A1 | 4/2018 | Rygiel et al. |

OTHER PUBLICATIONS

"Easy Peel White Mailing Labels", Apr. 2008, 2 Pages.
"Uline Laser Labels—White, 2 5/8x1" S-5042, Accessed on Aug. 5, 2019, 2 Pages.
Near-field communication—Wikipedia, Accessed Apr. 20, 2023 at https://en.wikipedia.org/wiki/Near-field_communication, 22 Pages.
Radio-frequency identification—Wikipedia, Accessed on Apr. 20, 2023 at https://en.wikipedia.org/wiki/Radio-frequency_identification, 31 Pages.

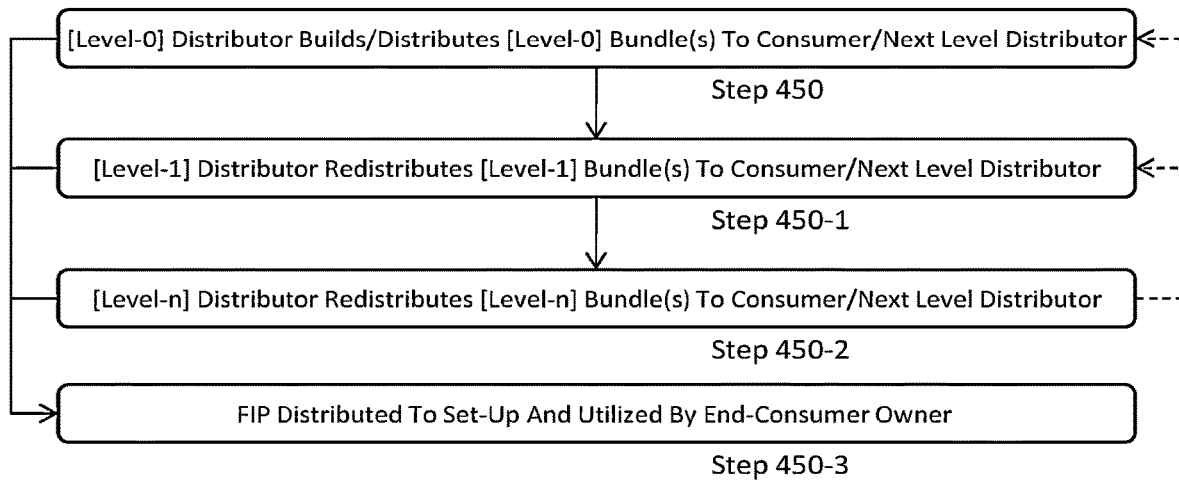
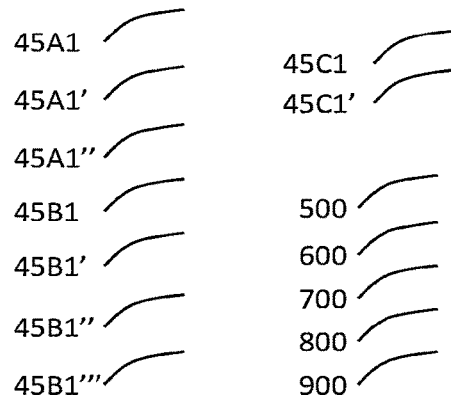
*FIG. 45*

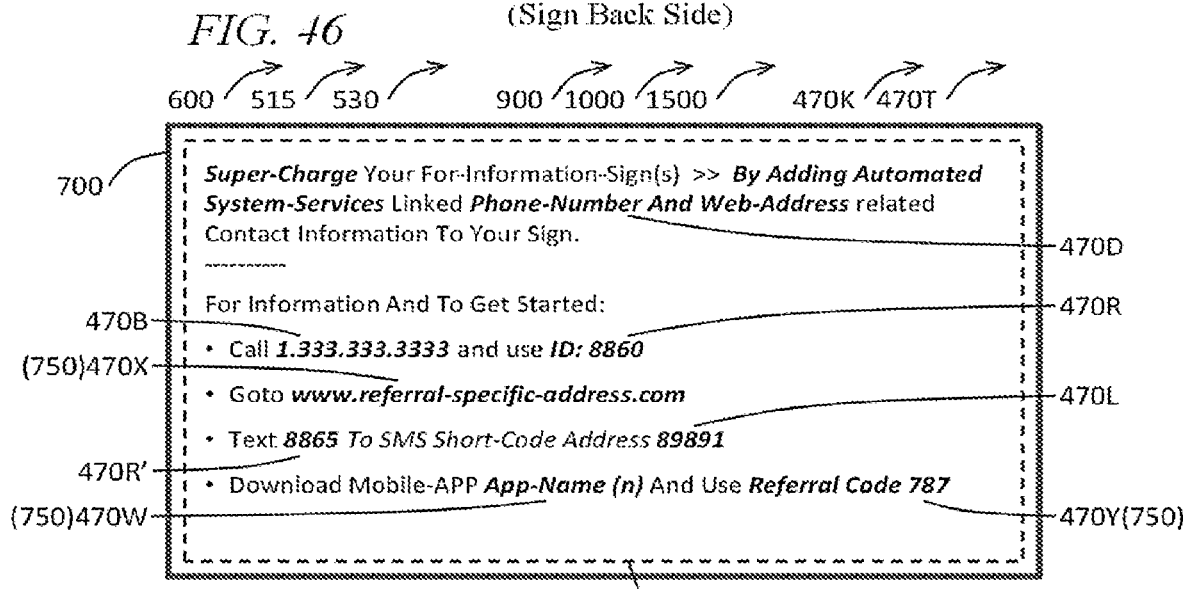
FIG. 46
FIG. 47

```
┌─────────────────────────────────────────────────────────────────────────┐
│  ▼  │ 5200  FIP Instructions, Preferably Consisting Of Referral Elements Is Created │
│     │                                    ▼                                          │
│  ▼  │ 5210  FIP Related Instructions Are Translated To A FIP Voice Ad               │
│     │                                    ▼                                          │
│  ▼  │ 5220  FIP Voice Ad Is Aired                                              ◄──┐ │
│     │                                    ▼                                        │ │
│  ▼  │ 5230  FIP Voice Ad Responding Consumers Access FIP Voice Ad Related Service(s) │ │
│     │                                    ▼                                        │ │
│  ▼  │ 5240  Consumer Sets FIP Voice Ad Related Services                            │ │
│     │                                    ▼                                        │ │
│  ▼  │ 5245  Optional, FIP Voice Ad Related Referral Crediting Is Issued            │ │
│     │                                    ▼                                        │ │
│  ▼  │ 5250  FIP Voice Ad Is Optionally Re-Aired                              ─────┘ │
└─────────────────────────────────────────────────────────────────────────┘
```

*FIG. 52A*

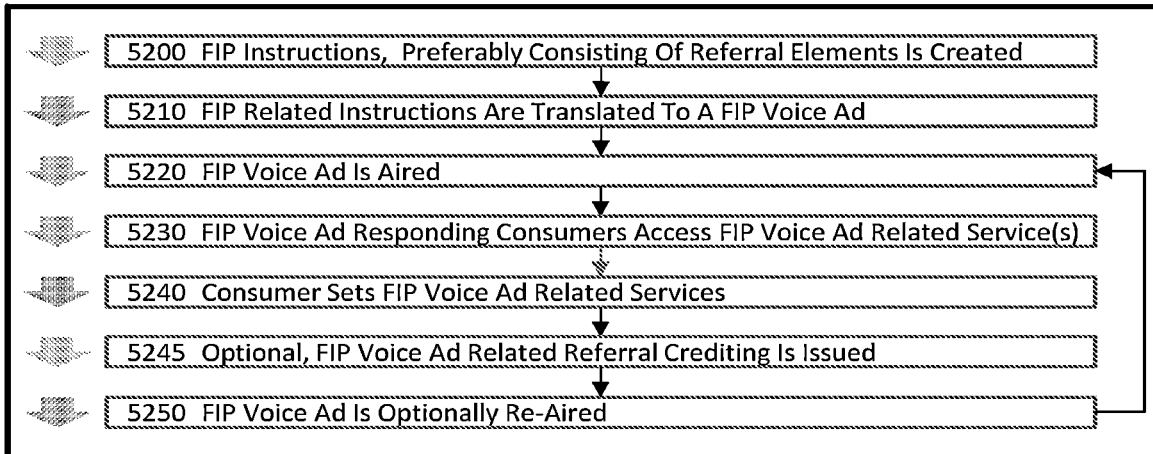

537 / 700 / 600

- Want a business call-system that sounds and functions like a big ─── 520B(750)
  business call-system call Us at 1.333.333.3333 for instant call-
  system activation, including an instantly provided active phone
  number with extension.

*FIG. 52B*

- Want a business call-system that sounds and functions like a big ─── 520B(750)
  business call-system call Us at 1.333.333.3333 or visit us as ─── 520X(750)
  *www.referalsite.com* for instant call-system activation, including
  an instantly provided active phone number with extension.

*FIG. 52C*

Introduction Prompt >>
- To request an instructional text-message be sent to your phone - Please enter or speak-in the Referral-ID as shown on the FIP followed by the Pound-Key.

Confirmation Prompt >>
- Your informational text-message has been sent.

*FIG. 54A*

Introduction Prompt (Primary Embodiment) >>
- An instructional text-message has been sent to your current phone.

Introduction Prompt -1 (Alternative Embodiment) >>
- To request an instructional text-message be sent to your phone – Press any key now.

Confirmation Prompt (Following Introduction Prompt-1) >>
- Your informational text-message has been sent.

*FIG. 54B*

Introduction Prompt >>
- Please enter the referral code for the product or service of which you'd like to receive information about.

Confirmation Prompt >>
- An informational text-message has been sent. You may now either hang-up or hold this line to enter another code.

*FIG. 54C*

For instructions on set /create your FIP, including information on how to retrieve your system linked contact elements and set related services visit *www.webaddress.com* and follow instructions using referral-ID: *89BN9H4.*

*FIG. 55A*

For instructions on how to retrieve your system linked contact elements visit referral web-address *www.referralwebaddress.com/23490* and follow instructions.

*FIG. 55B*

Your system-linked phone-number is *1.333.333.33333*; and your system-linked web-address is *www.webaddress.com/23145*. To Set your contact-element(s) linked services visit referral website *www.referralwebsite.com* and follow instructions using access code *899H98N.*

*FIG. 55C*

Your system-linked phone-number is *1.333.333.33333*. To Set your contact-element(s) linked services visit referral website *www.referralwebsite.com* and follow instructions using password *899H999.*

*FIG. 55D*

Your system-linked phone-number and lookup-ID are *1.333.333.33333* and ID *89912*. To Set your contact-element(s) linked services visit referral website *www.referralwebsite.com* and follow instructions using pin *8999.*

*FIG. 55E*

Your system-linked web-address is *www.webaddress.com/2314*. To Set your contact-element(s) linked services visit referral website *www.referralwebsite.com* and follow instructions .

*FIG. 55F*

To access system-services visit *www.website.com* , enter *89912* and follow instructions using pin *8999.*

*FIG. 55G*

To access system-services (and/or initiate a <predefined> system response) visit *www.website.com* , enter *89912* and follow instructions using pin *8999*; and/or lookup referral website *www.referralwebsite.com/89912*.

*FIG. 55H*

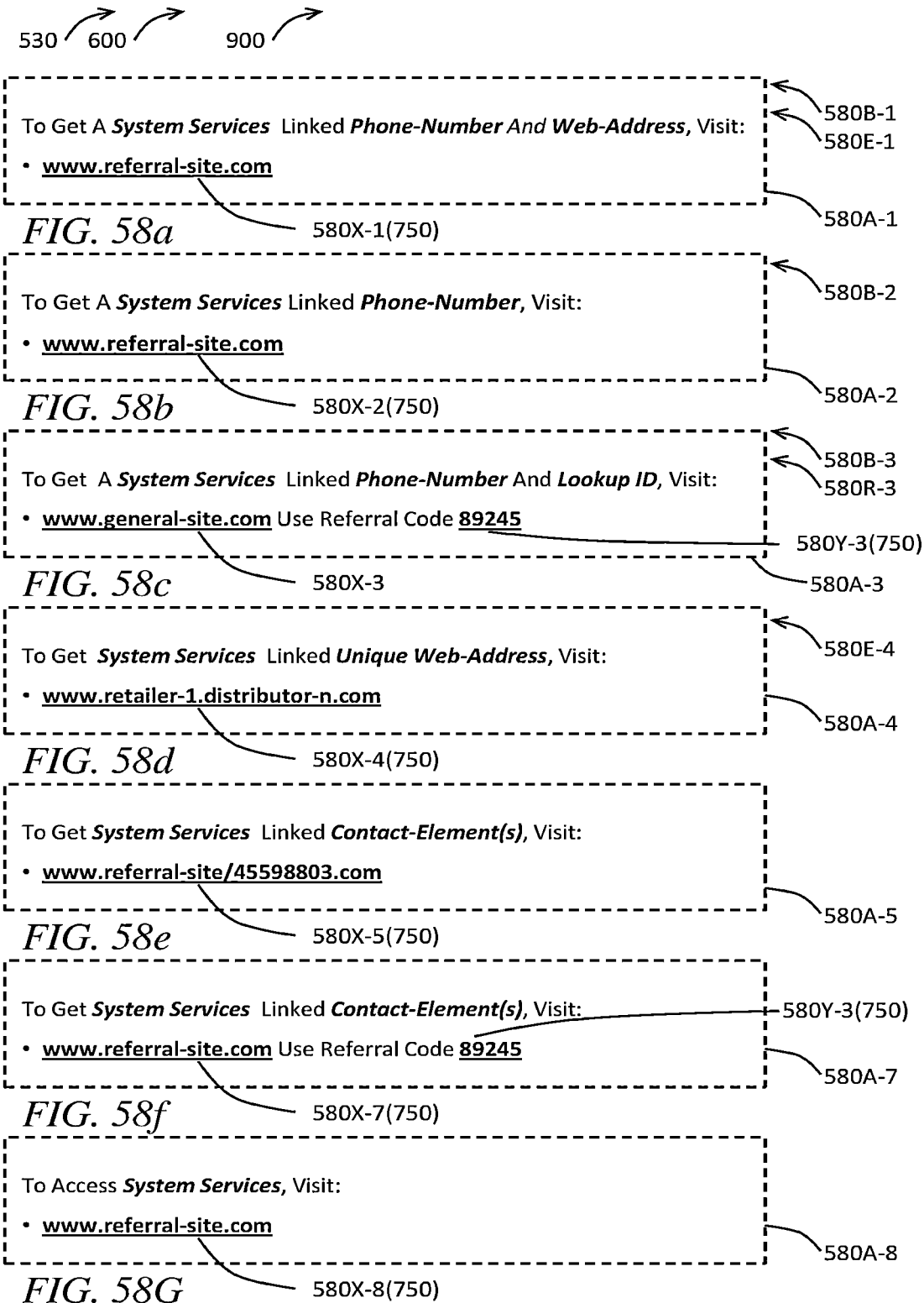

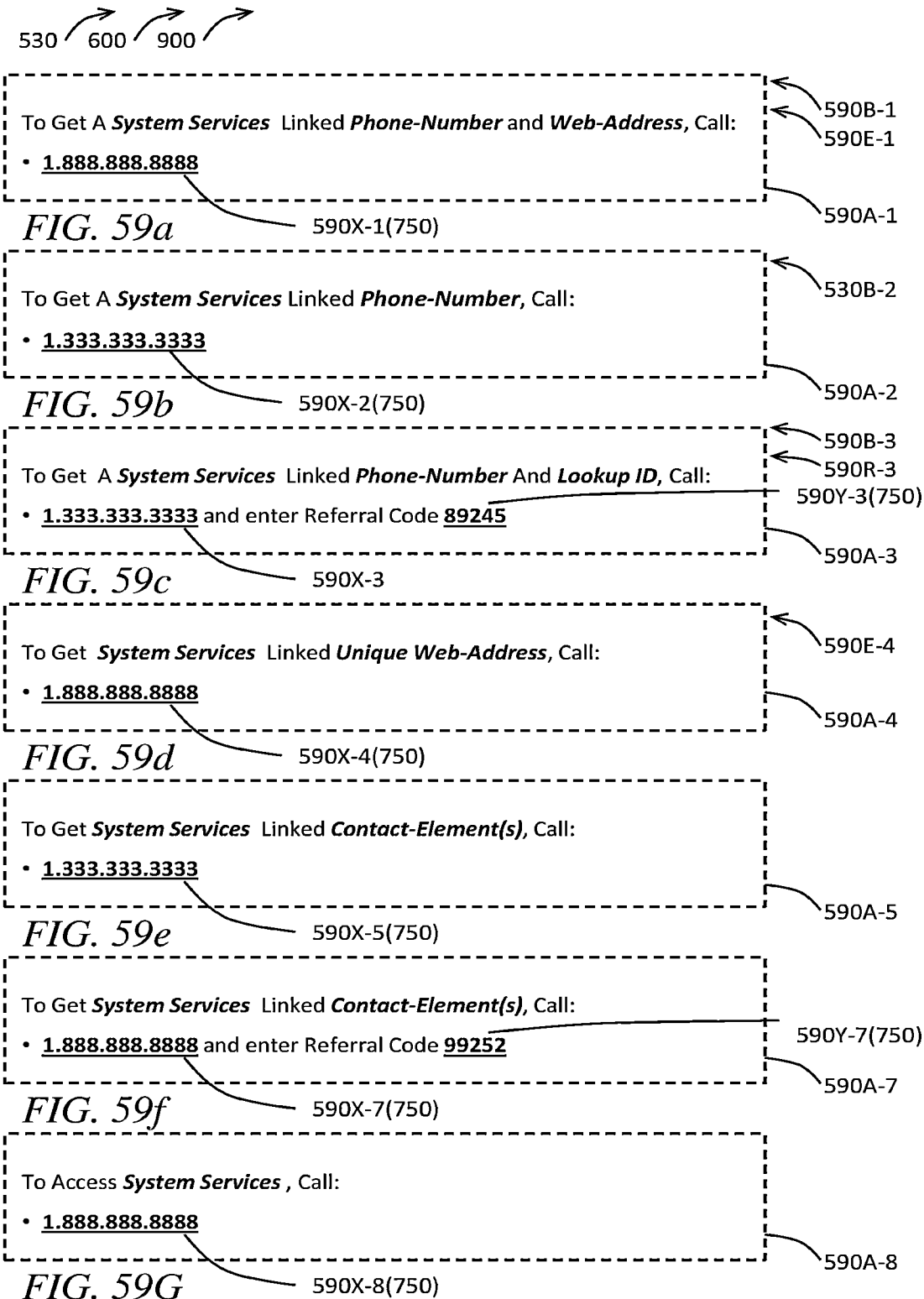

530 / 600 / 900

---

To Get System Services Linked Contact-Element(s), Open Or Download And Open App Below:

APP Name: <u>General APP Name-n</u> Use Referral ID: <u>89245</u>

To Access System Services, Open Or Download And Open App Below:

APP Name: <u>Referral APP Name-n</u>

To Get System Services Linked Contact-Element(s), Text Referral ID To SMS Address Below (or Call):

SMS Long Code Address: <u>1.333.333.3333</u> Use Referral ID: <u>89245</u>

To Access/Initiate System Services, Send <Blank> Text To:

SMS Short Code Address: <u>87445</u>

To Get System Services Linked Contact-Element(s), Using SKYPE Call To:

SKYPE ID: <u>General</u> Use Referral ID: <u>89245</u>

To Access System Services, Use SKYPE To Call:

SKYPE ID: <u>Referral.23</u>

To Access System Services, Send Email <With Specified Information> To:

<u>Referral.23@email.com</u>

530 600 900
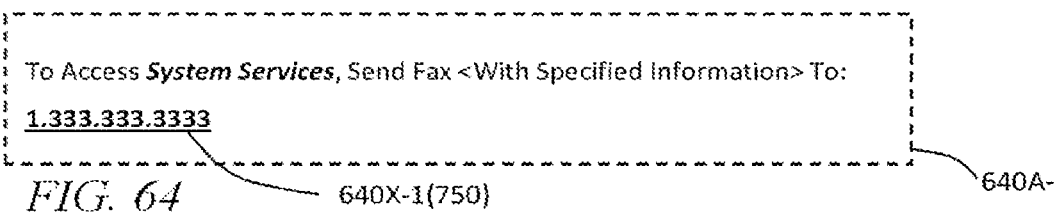
FIG. 64    640X-1(750)     640A-1
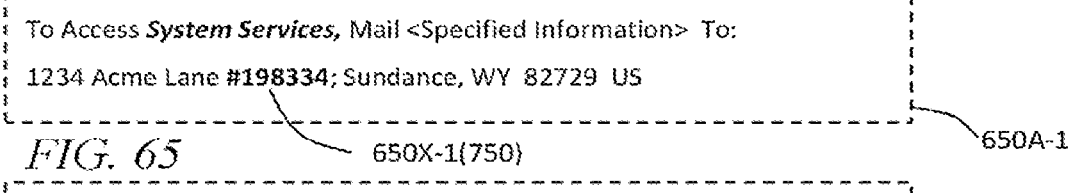
FIG. 65    650X-1(750)     650A-1
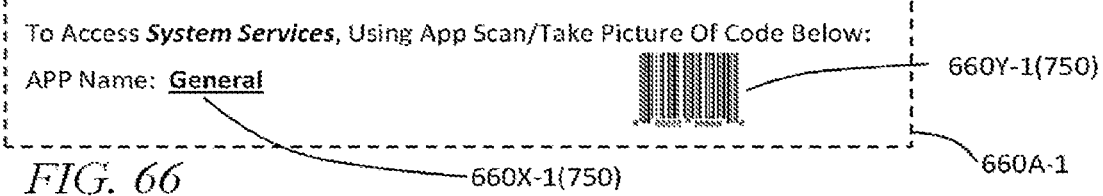
FIG. 66    660X-1(750)     660A-1
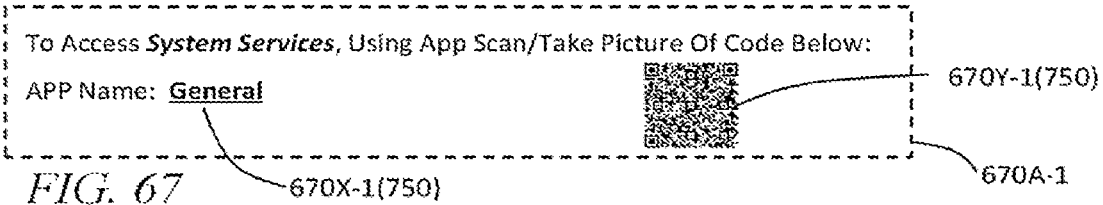
FIG. 67    670X-1(750)     670A-1
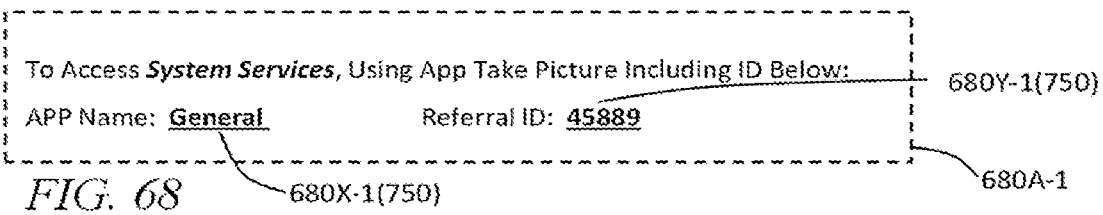
FIG. 68    680X-1(750)     680A-1

SYSTEM LINKED ITEM

CROSS-REFERENCE TO RELATED APPLICATIONS

The present application is a continuation of U.S. patent application Ser. No. 18/363,696, filed on Aug. 1, 2023, titled "System Linked Item," which is a continuation of U.S. patent application Ser. No. 18/169,777, filed on Feb. 15, 2023, titled "System Linked Item," which is a continuation of U.S. patent application Ser. No. 17/492,464, filed on Oct. 1, 2021, titled "System Linked Item," which issued on Apr. 18, 2023 as U.S. Pat. No. 11,630,976, which is a continuation of U.S. patent application Ser. No. 17/063,653, filed on Oct. 5, 2020, titled "System Linked Item," which issued on Nov. 2, 2021 as U.S. Pat. No. 11,164,054, which is a continuation of U.S. patent application Ser. No. 16/717,365, filed on Dec. 17, 2019, titled "A For-Display Advertisement Product and Related Method", which is a continuation of U.S. patent application Ser. No. 13/652,446, filed on Oct. 15, 2012, titled "Personalized Printed Product and Related Method", which issued on Feb. 4, 2020 as U.S. Pat. No. 10,552,715, which claims the benefit of U.S. Provisional Application No. 61/589,387, filed on Jan. 22, 2012, titled "A For-Display Advertisement Product and Method", and U.S. Provisional Application No. 61/632,397, filed on Oct. 15, 2011, titled "System-Linked for Information Product Including Distribution, Marketing and Advertising Methods". The foregoing are incorporated by reference as though set forth herein in their entirety.

FIELD OF THE DISCLOSURE

The present disclosure is in the field of advertisement products and networked computer systems, more specifically the disclosure relates to advertisement products that are linked to networked computer systems.

BACKGROUND

Traditional and often mass produced advertising products require that the owner configure said product with contact and sometimes advertising specific information. Mass produced advertising products are usually intended for display. These standard-information-products or SIP(s) typically consist of advertisement oriented products such as, information label products, information literature products, information sign products, information object related products and/or objects that contain information-areas.

As standard process SIP(s) are usually purchased from online or location-based retail stores, with both retailers and retail-distributors being limited on the money they can make from the sale of SIP(s), usually only making a onetime small profit with each SIP unit sold, in a competitive industry "retail" where every penny made counts.

Some typical SIP(s) categories include: 1. Information label products which can include peel and stick labels, peel and stick stamps, magnetic labels, static labels, non-adhesive backed labels, tags and/or other label similar type of products; 2. Information literature products which can include personal contact cards, business contact cards, information cards, books, post cards, fliers, pamphlets, booklets and/or other literature similar type products; 3. Information sign products which can include signs such as for sale, for rent, yard sale, lease signs and/or other sign similar type of products; 4. Information object related products which can include objects such as envelopes, cases, bulletin boards, post boards, billboards, certain signs, advertising magnets, banners, table displays, window/viewing displays, display stands, tagged key chains and/or other advertisement oriented objects/products.

SIP(s) are usually configured with size-limited blank information areas, typically designated for end-consumer customized advertisement information.

SIP(s) are typically obtained and/or purchased from a distributor, including retail stores. Usually these products are size constrained, limiting the amount of information that can be directly placed onto them by the associated consumer or product owner, creating a situation that forces the SIP owner and/or designee(s) to field, process and/or organize all SIP related viewer of the advertisement information related inquires, furthermore SIP(s) are generally used once for a specific advertising purpose and then are typically discarded and/or they are marked up (creating an non-professional look) to update outdated information contained thereon, especially contact information.

Phone and web application systems can be extremely helpful in such areas as providing advertisement and fielding inquiring caller needs. Currently when someone buys an SIP (standard-information-product) product, for advertisement purposes, such as a for sale sign and/or product display, and they want to apply contact information onto the SIP, such as a phone number and/or website, that point to said powerful/helpful application systems, there are many complicated steps. Some of these steps involve knowing how to obtain a phone-number/domain-name; developing said and useful phone/web application(s); and finally, pointing said phone-number/domain-name to the newly set application. So what often time happens is the SIP owner places their own contact information directly onto the SIP, in-turn forcing them to field all ad related calls.

The current disclosure provides a solution to the problems previously identified by seamlessly making available SIP(s) that are linked to powerful application systems.

DISCUSSION OF KNOWN ART

U.S. Pat. No. 7,269,837 to Peter M. Redling for INTERACTIVE TELEVISION ADVERTISING METHOD discusses an interactive advertising method involving interaction between global computer networks and interactive television advertisement.

U.S. Pat. No. 7,864,947 to Tom Weiss for CALL NOTIFICATION SYSTEM, METHOD, COMPUTER PROGRAM AND ADVERTISING METHOD discusses the use of networked call (IVR) systems to manage system generated advertising.

OBJECTS

It is an object to provide a mass producible and made for distribution system linked SIP, from here forward simply known as a for information product or FIP, which is pre-configured with system linked contact information, that seamlessly links/makes available powerful system networked applications, that help to manage as well as provide information to FIP related viewer inquires, system applications that would otherwise not be readily available to your typical FIP consumer. Upon referencing the FIP configured system linked contact information to call to said system, the applications would then provide the FIP viewer with (advertised) information as it relates to the FIP and/or the FIP related/advertised object(s), thus minimizing/eliminating the need of the FIP owner having to: field repetitive FIP related viewer inquiry calls; track FIP viewer inquiry information, i.e. inquiry timestamps, contact information, call notes, etc.; field FIP viewer messages; personally provide FIP related information to every inquiring FIP viewer; and/or from having to perform any number of other services which the system applications could automatically manage to aid both the FIP viewer and owner alike, such as the distribution/ management of information/services as they relate to any given FIP and/or the FIP advertised product; and/or other convenient services such as automatically connecting FIP viewer calls to FIP owner preset forward-call-to phone(s) or having system initiated text messages, containing FIP related information sent back to FIP related user phones, for use, storage and reference needs.

It is another object to show several 1-step process and other minimal step processes by which FIP related service(s)/account(s)/application(s)/transaction(s) can be initially set/triggered, providing optimized/convenient user to FIP services interactive experience.

It is yet another object to make available a mass produced and distributed FIP, configured with up-line distribution linkable referral-elements, that allow for up-line referral tracking for some pre-determined amount of credits/money, preferably credit in the form of money, as a percentage of money made from for-pay service-applications set by FIP end-owner-consumers, as a result of direct FIP referral; whereby FIP referral-elements are stored by said service systems and used to create up-line referral/crediting associations. The enclosed defined referral system, related elements and process, make available, highly valuable and alternative, revenue generation method(s) available to retailers, distributors, organizations, groups, etc. Furthermore as an alternative to said FIP being made for distribution purposes, it instead could be intended for in store (location) display, functioning as a referral tool that instructs end-consumers on how to access FIP related pay-for services, optionally credit provided to select FIP associated distributor(s)/retailer(s) for each FIP related and activated service.

It is another objective to make available a reusable FIP, because the FIP manufacturing applied and system linked contact information is permanently configured onto the FIP, with settable system-applications associated/point to said contact information, the need for a FIP owner to directly place contact/advertisement information directly onto said FIP can be eliminated, allowing the FIP to be repeatedly used, advertising different information (including contact information) for different FIP related occasions/products by simply updating said settable system-applications.

It is yet another objective to provide FIP system services that would allow FIP owners to advertise and receive FIP viewer related inquiries without having to reveal actual FIP owner contact information. Since FIP configured contact information is system-application related, the FIP owner is given the option of whether or not they want to make their contact information public via the settable system-application distributed advertised information.

Still it is another objective to make available several FIP embodiment design concepts/processes some of which detail how a FIP is created for mass production and distribution.

Furthermore, it is yet an objective to introduce the concept for FIP related software that aids in creating custom FIP.

Furthermore still, it is another objective to introduce the concept for a FIP related service website that aids in creating custom FIP(s).

It is still another objective to make a available a process by which a picture can be taken of FIP configured and system-linked contact data by a FIP viewer, said picture being sent to system(s) for processing and with results related data being returned to said viewer.

SUMMARY

One or more of the forgoing objects may be met by features in the present disclosure wherein a system linked for information product called FIP, including related methods, services and systems is now made available.

BRIEF DESCRIPTION OF THE DRAWINGS

The above and further objects, features and advantages will be more fully understood from the following description taken with the accompanying drawings in which several of the drawings represents an embodiment or a component of an embodiment.

FIG. 45 is a simple flow chart showing a FIP typical distribution process, including distributor FIP sales crediting process.

FIG. 46 shows the front and back view of a FIP, type for-sale-sign, configured with a contact-element(s) group that includes system referral elements.

FIG. 47 shows the front view of a FIP, type (retailer/distributor) for-display advertisement sign or placard, configured with a contact-element(s) group that includes system referral elements.

FIG. 52A depicts a flowchart for a broadcast FIP of a type radio, related process.

FIG. 52B-52C depicts (2) audio-transcript samples of a broadcast via FIP of a type radio.

FIG. 54A-54C depicts (3) sample voice-prompts similar to those that might be heard by a viewer/consumer/user who calls to access a system maintained call-services.

FIG. 55A-54H depicts (8) user initiated and system sent text-message samples, each message providing system services related (access) information.

FIG. 58A-G show (6) FIP contact-element(s) group configuration alternatives 29-35, each comprised of instructions embedded referral elements, of type website related data.

FIG. 59A-G show (6) FIP contact-element(s) group configuration alternatives 36-42, each comprised of instructions embedded referral elements, of type phone related data.

FIG. 60A-B show (2) FIP contact-element(s) group configuration alternatives 43-44, each comprised of instructions embedded referral elements, of type (mobile/downloadable) application related data.

FIG. 61A-B show (2) FIP contact-element(s) group configuration alternatives 45-46, each comprised of instructions embedded referral elements, of type SMS/text related data.

FIG. 62A-B show (2) FIP contact-element(s) group configuration alternatives 47-48, each comprised of instructions embedded referral elements, of type call-system related data.

FIG. 63 shows a FIP contact-element(s) group configuration alternative-49, comprised of instructions embedded referral elements, of a type email related data.

FIG. 64 shows a FIP contact-element(s) group configuration alternative-50, comprised of instructions embedded referral elements, of a type fax related data.

FIG. 65 shows a FIP contact-element(s) group configuration alternative-51, comprised of instructions embedded referral elements, of a type (physical) mail-address related data.

FIG. 66 shows a FIP contact-element(s) group configuration alternative-52, comprised of instructions embedded referral elements, of a type scanned-code related data.

FIG. 67 shows a FIP contact-element(s) group configuration alternative-53, comprised of instructions embedded referral elements, of type photo-recognition related data.

FIG. 68 shows a FIP contact-element(s) group configuration alternative-54, comprised of instructions embedded referral elements, of type photo-pattern-recognition related data.

FIG. 72A shows related process steps, FIG. 72B shows a packaged and consumer ready FIP retail label product, FIG. 72C shows FIP label stock being removed from FIP retail label product related envelope, FIG. 72D-F show FIP label stock related and removed FIP labels adhered to standard information signs.

FIG. 75 could also be depicted as a retail ready FIP of type label-stock located in a (retail) packaging envelope, preferably to be made available for retail sale.

DETAILED DESCRIPTION

An information product, such as a for sale sign, configured with contact information and/or elements that link the advertisement/information product to, globally networked system, related services, called a for information product or FIP, is discussed herein. These services make available powerful applications such as phone and web application that are extremely helpful in providing an additional advertisement mechanism/electronic-media as it relates to the FIP and/or any FIP related product/object/item. These services aid the FIP owner in fielding, FIP related, viewer called in inquires while providing the FIP viewer with more options when researching FIP related/advertised item information, upon calling to said system services. The FIP seamlessly makes available linked and powerful application system services to the FIP owner, who in most cases would not know how to link such services. Also disclosed is a method of crediting up-line distributors for end-consumer owner distributed FIP related new system services setup, crediting preferably monetary as related with for-pay system services.

Still Further disclosed is a method by which pictures taking of FIPs can be system submitted to initiate pre-defined system responses, one such response being the send of data as related to said FIP and/or said FIP advertised item.

Furthermore disclosed is a method involving the retail/service location display of FIPs configured with item(s) referral references information; whereby viewers reference said FIP configured information to access said FIP related and linked services in order to obtain access to said item(s); whereby credit as related to item(s) obtained/purchased, credit preferably monetary, would be paid to the referring said retail/service location owner/organization.

Figure 1:
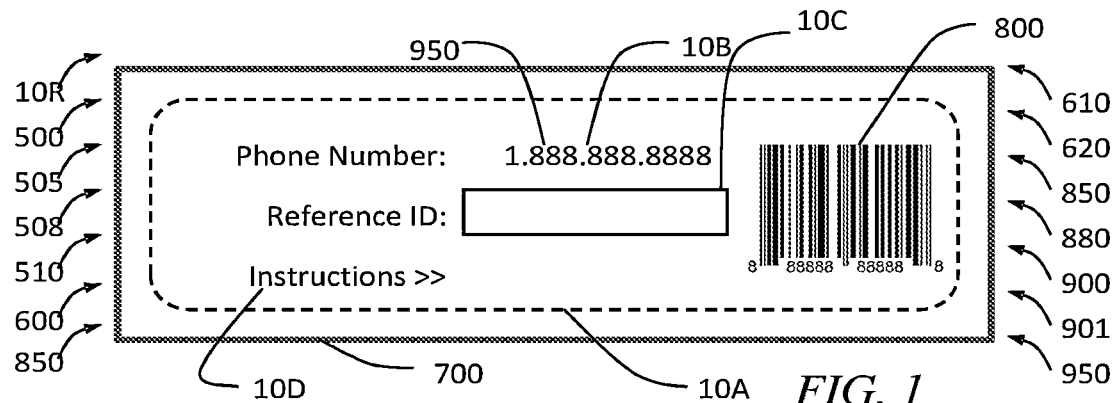
FIG. 1 shows a FIP configured with a system linked contact information also known as a contact-element group.

FIG. 1 depicts a mass produced for retail and/or wholesale distribution system-linked for information product or FIP 700, configured with optional text/graphics artwork 850, implied not shown, and contact-element(s) group 10A information, consisting of product barcode 800, system phone number 10B, labeled reference-id area 10C, and FIP instructions 10D; whereby system phone number 10B a type of call address 950, points to system 600 maintained phone-services 901, a type of system service 900; wherein system 600, using phone number 10B, can be called-to, using a call device 620. Call address 950 is defined as any call-id, phone-number, phone-ip, etc., used to place an audio call to system 600, via a calling device such as a phone, PDA, call-enable computer, etc. System services 900 when accessed, distribute/capture FIP 700 related, and typically FIP owner 500 set, information/data to viewer(s) 510 and other users.

System service 900 types can include phone services 901, web services 904, call services 910, messaging services 912, email services 914, fax services 916, SMS services 918, mail services 920, Electronic Services 930 and variations and combinations thereof. Electronic Services 930 include any non-physical related services elements, such as physical-mailing services and can encompass phone services, web services, messaging services, email services, electronic fax services, SMS services, any other electronic based services and/or variations and/or combinations thereof.

Figure 2:
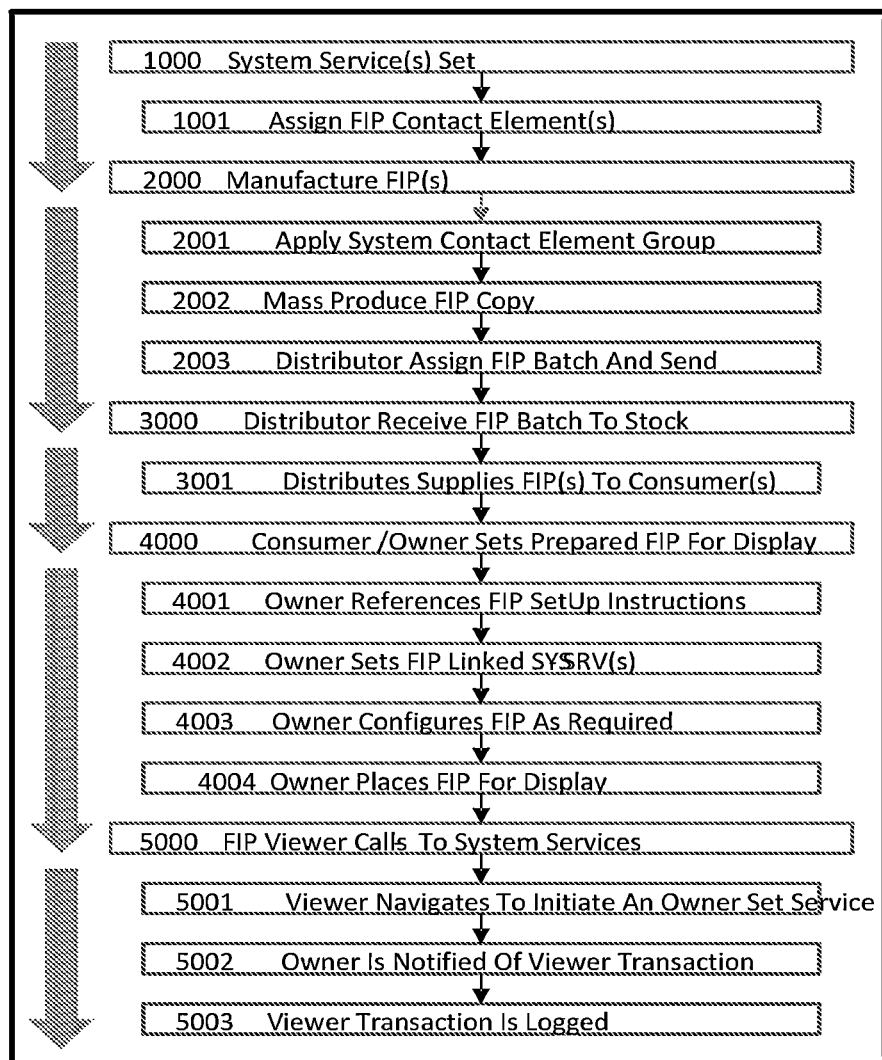
FIG. 2 shows a FIP lifecycle flowchart for the FIP depicted in FIG. 1.

FIG. 2 depicts a lifecycle flowchart for FIP 700 depicted in FIG. 1, from the manufacturing process thru owner 500 operational use step 1000, where system 600 maintained phone services 901 are made ready for activation and use by FIP related users, process detailed by, sub-step 1001, phone number 10B is pointed at system 600 maintained phone services 901.

Step 2000, FIP 700 is mass produced by manufacturer 505 and distributed, process detailed by, sub-step 2001, manufacturer 505 applies contact-element(s) group 10A to FIP 700; sub-step 2002, FIP 700 is replicated and grouped by manufacture 505, forming FIP 700 batch, made available for distribution; sub-step 2003, FIP batch is assigned to a specific distributor 508 and then sent/shipped for distribution. Step 3000, distributor 508 receives FIP 700 batch to inventory, whereby batch related FIP 700 units are staged for end-consumer (FIP owner 500) distribution, process detailed by, sub-step 3001, distributor 508 supplies/makes available FIP 700 individual units for end-consumer, preferably setting product on shelves for purchase. Step 4000, FIP owner 500 prepares FIP 700 for display, process detailed by, sub-step 4001, owner 500 reviews FIP-instructions 10D, preferably configured directly on FIP 700, in order to receive instruction on how/where to set FIP 700 linked system 600 services. Preferably instructions 10D would refer owner 500 to some specified website to set said and FIP 700 related services; sub-step 4002, owner 500 sets FIP 700 linked and system 600 maintained phone services 901 as related to FIP 700 advertised item 880 and/or to FIP 700 itself. Phone services 901 settings are set via an owner 500 accessible networked computing device 620, such as a networked computer and/or PDA. During the phone services 901 setup process system 600 generates to provide a phone services 901 linked reference id 10R to owner 500 for placement onto FIP 700; sub-step 4003, owner 500 preferably scribes newly generated reference id 10R directly onto FIP 700 in reference id area 10C, making FIP 700 ready for use; sub-step 4004, owner 500 displays and/or otherwise makes FIP 700 available for viewer 510 viewing, reference and use. Step 5000, viewer 510, calls to connect with system 600 using call device 610 and calling to system phone number 10B, process detailed by, sub-step 5001, viewer 510, using phone device 610 is prompted by phone service 901 to enter reference-id 10R, using either by touch-tone and/or voice input commands, upon viewer 510 entry, visitor access to owner 500 set phone services 901 is granted; sub-step 5002, owner 500 would then access a phone services 901 related and designated systems 600 area, preferably an account, to review/respond to any viewer 510 phone services 901 visitor access related activity/requests; and/or retrieve any viewer 510 submitted data, e.g. voice messages, translated voice-messages, action requests, etc.; sub-step 5003, preferably, viewer 510 and/or owner 500 phone services 901 (pre-designated) session-activity including any-to-all system 600 data-exchanges would be processed and/or stored onto system 600 in the form of transaction-logs and/or files, allowing system 600 administrators and/or owner 500 and/or viewers 510 access to all or some pre-defined portion of said pre-designated log/data/file/information.

As defined in the current application, a FIP or for information product, is a product that is configured with and/or supplied with system 600 linked contact-element(s) group data; whereas a SIP or standard information product is defined as a product that is NOT configured with and/or supplied with system 600 linked contact-element(s) group data.

FIP(s) similar to that depicted in FIG. 1, can be of any type as selected from the following group, for information label product; for information literature product; for information sign product; for information object product; or it could be a for information area located in, on or around a SIP (standard-information-product) and/or any applicable object. More specifically FIP 700 could be a for information label product selected from a group consisting of peel and stick labels, peel and stick stamps, magnetic labels, static labels, non-adhesive backed labels, pre-scored label stock, bundled pre-scored label stock, bundled labels, labels, tags, various types of cards, any other applicable label product type and/or any variation and/or combinations thereof; and/or FIP 700 could be a for information literature product selected from a group consisting of spec-sheets/documents, data-sheets/documents, sales-literature/documents/sheets/fliers, tear-away-page booklets, containers, personal contact cards, business contact cards, information cards, books, post cards, fliers, pamphlets, booklets, bundled documents, documents, magazines, paper products, card stock, perforated card stock, pre-configured paper products, menus, pamphlets, business cards, any card, mailers, post cards, gift cards, coupons, lab notebooks, notebooks, planners, any other applicable literature product type and/or any variation and/or combinations thereof; and/or FIP 700 could be a for information sign product selected from a group consisting of information signs, for sale signs, for rent signs, for lease signs, yard sale signs, organization informational signs, event information signs, service information signs, product information signs, hiring information signs, space available signs, no trespassing signs, private road signs, vacancy information signs, general information signs, location information signs, generic signs, advertisement signs, any other applicable sign type and/or any variation and/or combinations thereof; and/or FIP 700 could be a for information object product selected from a group consisting of boxes, moving boxes, packaging, product packaging, products, luggage, envelopes, briefcases, backpacks, purses, wallets, garnet bags, gym bags, personal bags, any bag, document containers, product cases, PDAs, phones, mobile computers, electronic books, tablet computers, music players, protective cases, any other container type, bulletin boards, passports, birth certificates, social security cards, credit cards, charge cards, any card, key chains, dog collars, kid bracelets, jewelry, any display boards, floor/counter displays, sign holders, counter display sign holders, floor display sign holders, hanging sign holders, insert signs intended for placement into sign holders, any product display, any services/information/event display, any display, personal accessories, skates, roller blades, sporting equipment, electronic equipment, mobile electronic equipment, tools, motorized tools, home furnishings, furniture, kitchen items, desk/office items, sales items, items that could be lost or stolen, motorized vehicles, bikes, scooters, non-motorized vehicles, any advertisement related object/item, any other applicable object type and/or any variation and/or combinations thereof; or instead of FIP 700 being a product type it could be a for information area located on any of the previously mentioned or unmentioned FIP(s). Furthermore, some to every page and/or piece in FIP 700 item(s) containing multiple pages and/or pieces could be a FIP 700 duplicate, i.e. said tear-away-page booklets could be comprised of FIP 700 duplicates, each page meant for tear-away, preferably by a user/consumer; furthermore, each page/piece or FIP 700 copy could contain same and/or different contact-element data. Still, FIP(s) of a type container could be designed to hold at least one other FIP, optionally in addition to other items, objects, SIP(s), etc.; similarly as depicted in FIG. 69.

As a FIGS. 1 and 2 alternative to using a networked computing device 620 to access system 600 in order to set system services 900, owner 500 could instead use a phone to set system services 900 ideally using IVR type call-applications.

Figure 25:
FIG. 25 shows a FIP contact-element(s) group configuration alternative-23, depicting contact-element(s) associated with phone and web services.
Figure 26:
FIG. 26 shows a FIP contact-element(s) group configuration alternative-24, depicting contact-element(s) associated with phone and web services.
Figure 27:
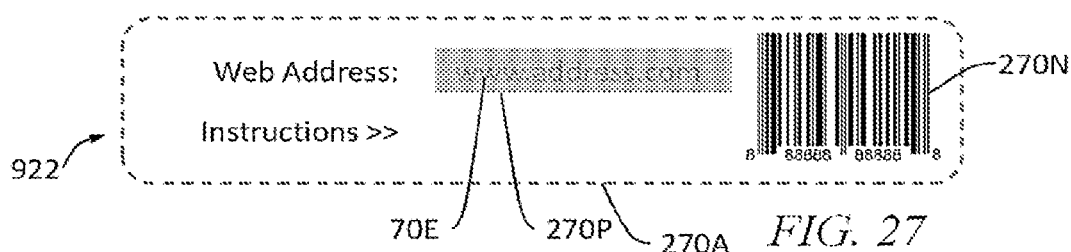
FIG. 27 shows a FIP contact-element(s) group configuration alternative-25, depicting contact-element(s) associated with web services.

FIP 700 depicted in FIG. 2, sub-step 2002, alternatively could be configured with at least one and/or any combination of the following, a unique code and/or id; a serialized barcode, similar to those depicted in FIGS. 25-27; a serialized reference id; a human and/or device readable (serialized) code; a unique call-address; any applicable contact-element; any applicable serialized contact-element; and/or variations thereof; whereas each FIP700 batch (similarly referred to as a bundle in current application) could be configured with at least one and/or any combination of the following, a unique code and/or id; a serialized code and/or id; a serialized barcode; a human and/or device readable (serialized) code; any applicable contact-element; any applicable serialized contact-element; and/or variations thereof.

FIG. 2, applicable, FIP 700 contact-element(s), serialized contact-element(s) and/or FIP batch/bundle/lot codes can be unique at a call address 950, system services 900, system 600, manufacturer, distributer, retailer and/or any other predetermined grouping-level. Serialization of FIP(s) and/or FIP batches allows for up-line distribution tracking of any FIP related and set system services 900, allowing for pre-determined up-line distributor crediting for each new FIP related system service 900 set, optional monetary crediting when for-pay services 900 are set, similar process/concept depicted in FIG. 51 Paid up-line distributor crediting incents distributors to move/distribute FIP product. Serialization of contact-element(s), including reference ids, defined at any grouping level, assures uniqueness of said serialize contact-element within said grouping level, thus avoiding FIP to system service set-up activation related duplication errors.

As appropriate, any of the alternatives as they relate to FIGS. 1 and 2 can similarly be applied to any embodiment depicted in the current application. Furthermore it is to be understood that the steps depicted in FIG. 2 and as appropriate, could be re arranged, collapsed, expanded, removed and/or have other steps added without deviating from the main process concept(s).

Figure 3:
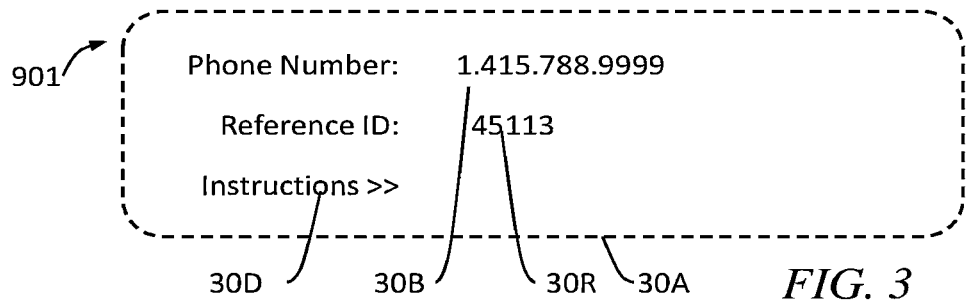
FIG. 3 shows a FIP contact-element(s) group configuration alternative-1, depicting contact-element(s) associated with phone services.

FIG. 3 shows (FIG. 1) contact-element(s) group 30A alternative-1, consisting of a system phone number 30B, reference id 30R and FIP-instructions 30D; whereas FIP-instructions 30D instruct owner 500 on how/where to set phone services 901. Next, owner 500 would set phone services 901; whereas during the phone services 901 setup process system 600 would activate phone number 30B and reference id 30R by pointing them at activated phone services 901; at this point FIP 700 would be placed (made available) for display, whereby an inquiring viewer 510 could then call to system phone number 30B and, when prompted, provide/submit reference id 30R to system 600 to access FIP 700 and/or FIP 700 advertised item 880 related phone services 901.

Figure 4:
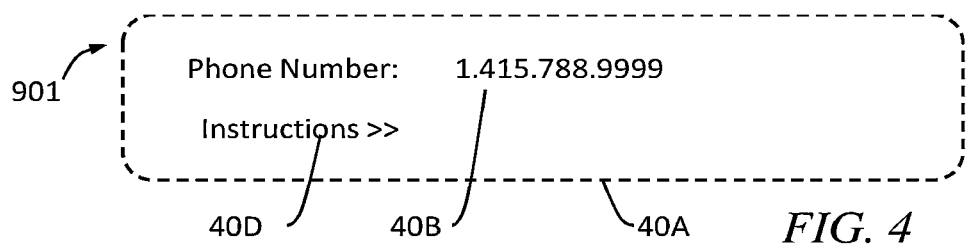
FIG. 4 shows a FIP contact-element(s) group configuration alternative-2, depicting contact-element(s) associated with phone services.

FIG. 4 shows (FIG. 1) contact-element(s) group 40A alternative-2, consisting of a, FIP 700 unique, phone number 40B and FIP-instructions 40D; whereas FIP-instructions 40D instruct owner 500 on how/where to set phone services 901. Next, owner 500 would set phone services 901; whereas during the phone services 901 setup process system 600 would activate phone number 40B by pointing it at activated phone services 901; at this point FIP 700 would be placed (made available) for display, whereby an inquiring viewer 510 could then call system phone number 40B to access FIP 700 and/or FIP 700 advertised item 880 related phone services 901.

Figure 5:
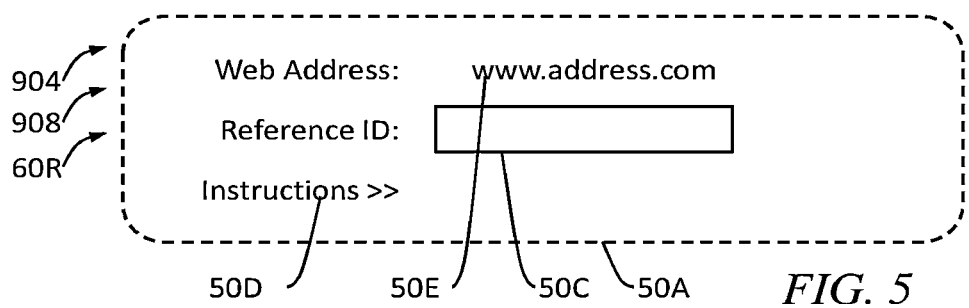
FIG. 5 shows a FIP contact-element(s) group configuration alternative-3, depicting contact-element(s) associated with web services.

FIG. 5 shows (FIG. 1) contact-element(s) group 50A alternative-3, consisting of a general system web address 50E, reference id area 50C and FIP-instructions 50D; whereas FIP-instructions 50D instruct owner 500 on how/where to set system 600 maintained and owner 500 settable web services 904; whereas during the web services 904 setup process system 600 would generate-to-provide a web services 904 related reference id 50R to owner 500 for placement into reference id area 50C; at this point FIP 700 would then be placed (made available) for display, whereby an inquiring viewer 510 could then lookup general system web address 50E to display services website 908, through which inquiring viewer 510 would then provide/submit reference id 50R to system 600 to access FIP 700 and/or FIP 700 advertised item 880 related web services 904.

Figure 6:
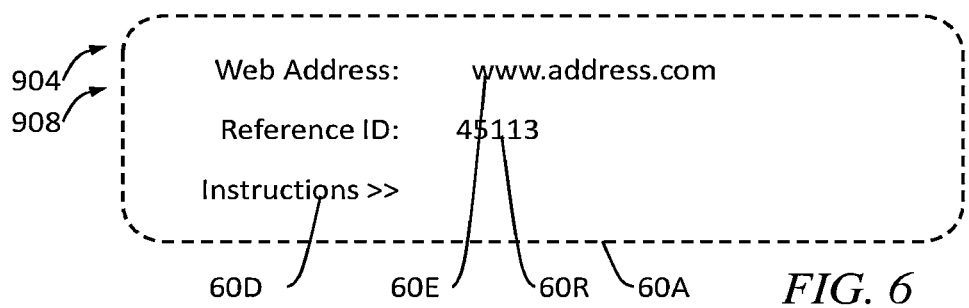
FIG. 6 shows a FIP contact-element(s) group configuration alternative-4, depicting contact-element(s) associated with web services.

FIG. 6 shows (FIG. 1) contact-element(s) group 60A alternative-4, consisting of a general system web address 60E, reference id 60R and FIP-instructions 60D; whereas FIP-instructions 60D instruct owner 500 on how/where to set web services 904. Next, owner 500 would set web services 904; whereas during the web services 904 setup process system 600 activates web address 60E related reference id 60R by pointing it at web services 904; at this point FIP 700 would then be placed (made available) for display whereby an inquiring viewer 510 could then lookup general system web address 60E to display service website 908, through which inquiring viewer 510 would then provide/submit reference id 60R to system 600 to access FIP 700 and/or FIP 700 advertised item 880 related web services 904.

Figure 7:
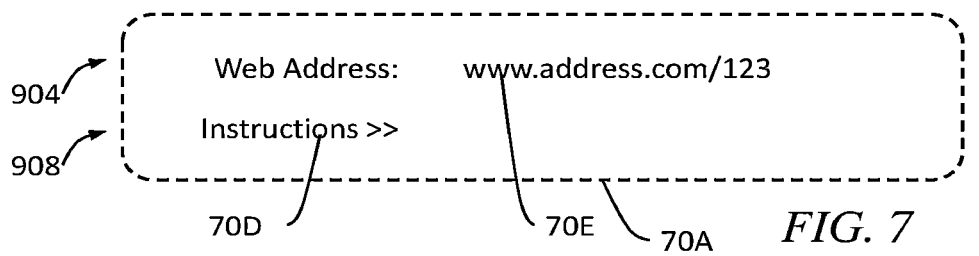
FIG. 7 shows a FIP contact-element(s) group configuration alternative-5, depicting contact-element(s) associated with web services.

FIG. 7 shows (FIG. 1) contact-element(s) group 70A alternative-5, consisting of a direct system web address 70E and FIP-instructions 70D; whereas FIP-instructions 70D instruct owner 500 on how/where to set web services 904. Next, owner 500 would set web services 904; whereas during the web services 904 setup process system 600 would generate/activate direct system web address 70E, related services website 908 and website 908 displayed/activated web services 904; at this point FIP 700 would then be placed (made available) for display whereby an inquiring viewer 510 could then lookup direct system web address 70E to display services website 908 though which inquiring viewer 510 would then access FIP 700 and/or FIP 700 advertised item 880 related web services 904.

Figure 8:
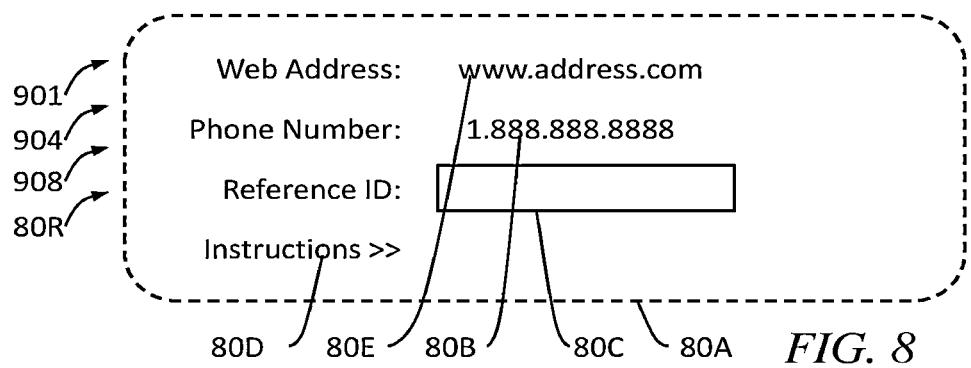
FIG. 8 shows a FIP contact-element(s) group configuration alternative-6, depicting contact-element(s) associated with phone and web services.

FIG. 8 shows (FIG. 1) contact-element(s) group 80A alternative-6, consisting of a general system web address 80E, general system phone number 80B, reference id area 80C and FIP-instructions 80D; whereas FIP-instructions 80D instruct owner 500 on how/where to set system 600 maintained and owner 500 settable web services 904 and phone services 901. Next, owner 500 would set web services 904 and phone services 901; whereas during the web services 904 and phone services 901 setup process system 600 would provide a web services 904 and phone services 901 related reference id 80R to owner 500 for placement into reference id area 80C; at this point FIP 700 would then be placed (made available) for display, whereby an inquiring viewer 510 could then lookup general system web address 80E to display service website 908 through which inquiring viewer 510 would then provide/submit reference id 80R to system 600 to access FIP 700 and/or FIP 700 advertised item 880 related web services 904; or an inquiring viewer 510 could then lookup direct system phone number 80B and, when prompted, provide/submit reference id 80R to system 600 to access FIP 700 and/or FIP 700 advertised item 880 related phone services 901.

Figure 9:
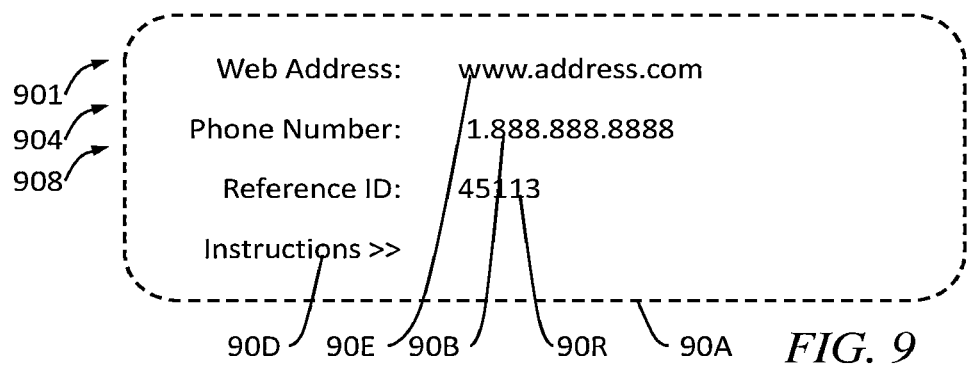
FIG. 9 shows a FIP contact-element(s) group configuration alternative-7, depicting contact-element(s) associated with phone and web services.

FIG. 9 shows (FIG. 1) contact-element(s) group 90A alternative-7, consisting of a general system web address 90E, general system phone number 90B, reference id 90R and FIP-instructions 90D; whereas FIP-instructions 90D instruct owner 500 on how/where to set system 600 maintained and owner 500 settable web services 904 and phone services 901. Next, owner 500 would set web services 904 and phone services 901; whereas during the web services 904 and/or phone services 901 setup process system 600 activates web services 904 and phone services 901 related reference id 90R; at this point FIP 700 would then be placed (made available) for display, whereby an inquiring viewer 510 could then lookup general system web address 90E and associated services website 904 through which inquiring viewer 510 would then provide/submit reference id 90R to system 600 to access FIP 700 and/or FIP 700 advertised item 880 related web services 904; or an inquiring viewer 510 could then call to general system phone number 90B and, when prompted, provide/submit reference id 90R to system 600 to access FIP 700 and/or FIP 700 advertised item 880 related phone services 901.

Figure 10:
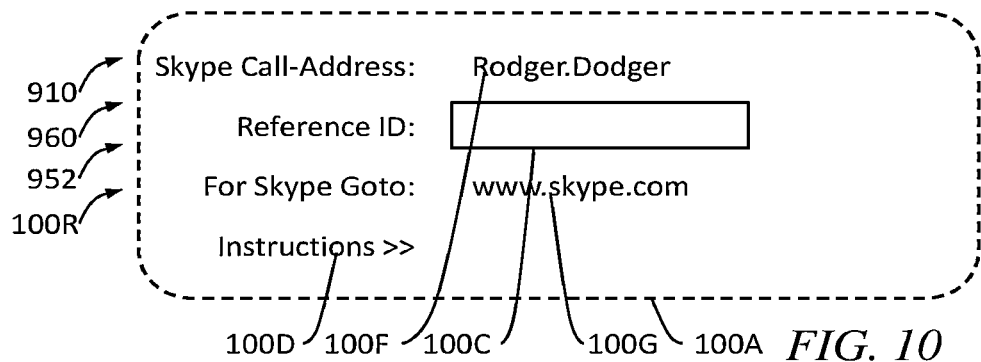
FIG. 10 shows a FIP contact-element(s) group configuration alternative-8, depicting contact-element(s) associated with internet initiated call services.

FIG. 10 shows (FIG. 1) contact-element(s) group 100A alternative-8, consisting of a general call id 100F, reference id area 100C and FIP-instructions 100D; and whereas FIP-instructions 100D instruct owner 500 on how/where to set system 600 maintained and owner 500 settable call services 910. Next, owner 500 would set call services 910; whereas during the call services 910 setup process system 600 would provide a system 600 unique and call services 910 related reference id 100R to owner 500 for placement into reference id area 100C; at this point FIP 700 would then be placed (made available) for display, whereby an inquiring viewer 510 could access call services website 952 (or related and said software application) to place a phone call to general call id 100F and then, when prompted, provide/submit reference id 100R to system 600 to access FIP 700 and/or FIP 700 advertised item 880 related call services 910. General call id 100F would be maintained by a third party provider 960 (such as SKYPE™ or similar online communication services).

Figure 11:
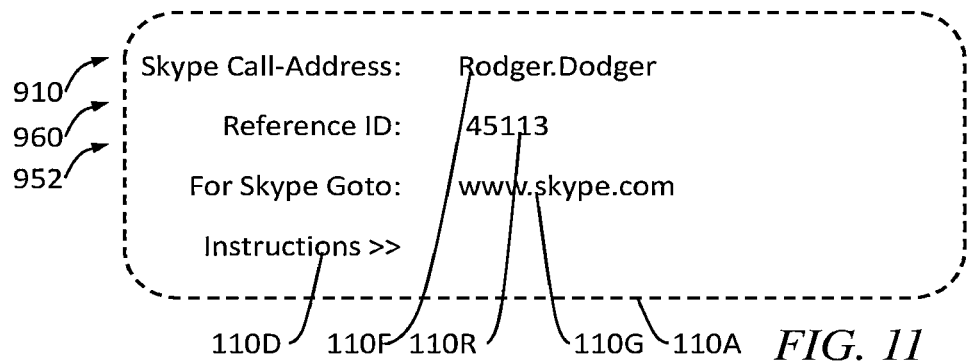
FIG. 11 shows a FIP contact-element(s) group configuration alternative-9, depicting contact-element(s) associated with internet initiated call services.

FIG. 11 shows (FIG. 1) contact-element(s) group 110A alternative-9, consisting of a general call id 110F, reference id 110C and FIP-instructions 110D; whereas FIP-instructions 110D instruct owner 500 on how/where to set FIG. 10 defined call services 910. Next, owner 500 would set call services 910; whereas during the call services 910 setup process system 600 would activate call services 910 related reference id 110R; at this point for sale sign 100 would then be placed (made available) for display, whereby an inquiring viewer 510 could access FIG. 10 defined call services website 952 (or related and said software) to place a phone call to general call id 110F and then, when prompted, provide/submit reference id 110R to system 600 to access FIP 700 and or FIP 700 advertised item 880 related call services 910. Call web address 110G is the service provider website where a viewer 510 would go to access call-applications and software for local computer install. General call id 101F would be maintained by a third party provider 960 (such as SKYPE™ or similar online communication services).

Figure 12:
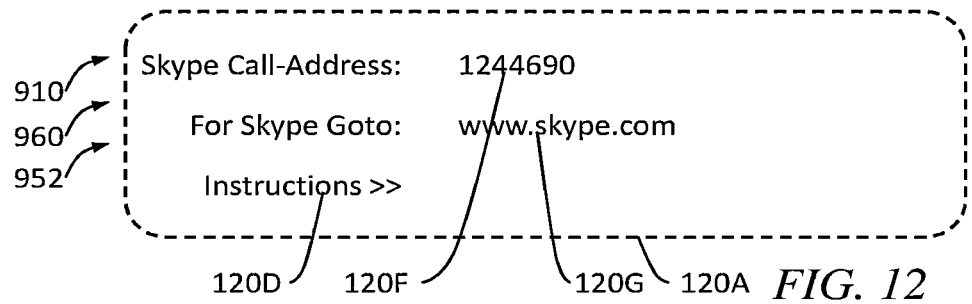
FIG. 12 shows a FIP contact-element(s) group configuration alternative-10, depicting contact-element(s) associated with internet initiated call services.

FIG. 12 shows (FIG. 1) contact-element(s) group 120A alternative-10, consisting of a direct-call id 120F and FIP-instructions 120D; whereas FIP-instructions 120D instruct owner 500 on how/where to set FIG. 10 defined call services 910. Next, owner 500 would set call services 910; whereas during the call services 910 setup process system 600 would point direct call id 120F to call services 910; at this point FIP 700 would be placed (made available) for display, whereby an inquiring viewer 510 could access FIG. 10 defined call services website 952 (or related and said software) to place a phone call to direct call id 120F to access FIP 700 and/or FIP 700 advertised item 880 related call services 910. General call id 120F would be maintained by a third party provider 960 (such as SKYPE™ or similar online communication services). Call web address 120G is the service provider website where a viewer 510 would go to access call-applications and software for a local computer install.

In FIGS. 10-12, call web address 110G is a provider 960 operated website, accessible by viewer 510, to either run communication-applications via site services and/or to download communication-application(s) to install/run computer local. In addition to and in order to share call services 910 related data, provider 960 systems would preferably be networked with system 600. Alternatively call web address could be optionally configured directly onto or provided with FIP 700.

Figure 13:
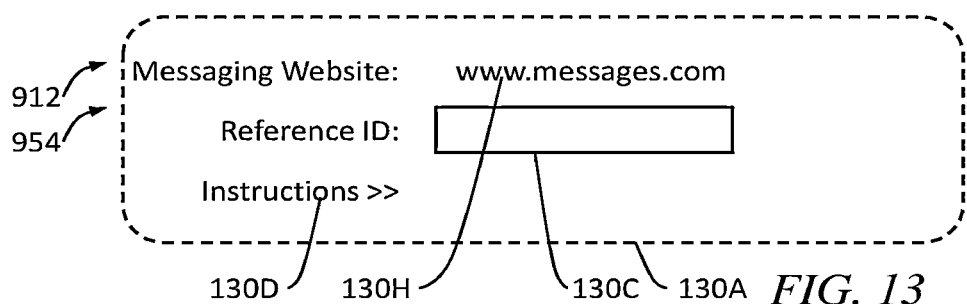
FIG. 13 shows a FIP contact-element(s) group configuration alternative-11, depicting contact-element(s) associated with messaging services.

FIG. 13 shows (FIG. 1) contact-element(s) group 130A alternative-11, consisting of a general messaging web address 130H, a reference id area 130C and FIP-instructions 130D; whereas FIP-instructions 130D instruct owner 500 on how/where to set FIG. 10 defined call services 912. Next, owner 500 would set messaging services 912; whereas during the messaging services 912 setup process system 600 would provide a system 600 unique and messaging services 912 related reference id 130R to owner 500 for placement into reference area 130C; at this point FIP 700 would be placed (made available) for display, whereby an inquiring viewer 510 could send a message to owner 500 by accessing general messaging web address 130H related message initiation website 954, whereby an inquiring viewer 510 would enter/submit reference id 130R and an electronic message 955 to send electronic message 955 to owner 500, whereby owner 500 would preferably receive electronic message 955 via a message services 912 related electronic message 955 retrieval/review service/mechanism/process.

Figure 14:
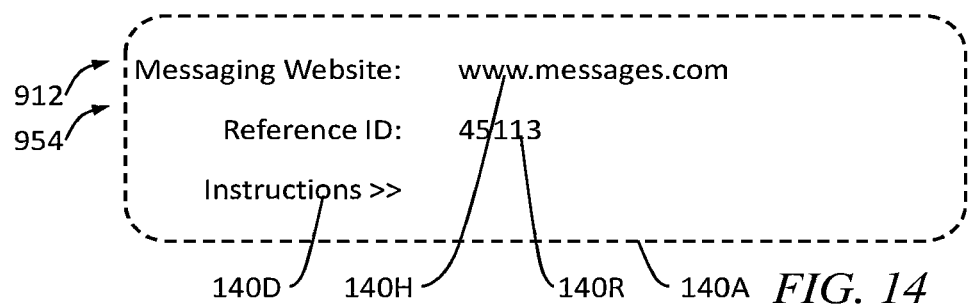
FIG. 14 shows a FIP contact-element(s) group configuration alternative-12, depicting contact-element(s) associated with messaging services.

FIG. 14 shows (FIG. 1) contact-element(s) group 140A alternative-12, consisting of a general messaging web address 140H, a reference id area 140R and FIP-instructions 140D; whereas FIP-instructions 140D instruct owner 500 on how/where to set FIG. 10 defined messaging services 912. Next, owner 500 would set messaging services 912; whereas during the messaging services 912 setup process system 600 would activate messaging services 912 related reference id 140R; at this point FIP 700 would be placed (made available) for display, whereby an inquiring viewer 510 could send a message to owner 500 by accessing a general messaging web address 140H related message initiation website 954, through which inquiring viewer 510 could access messaging services 912 to enter/submit reference id 140R and an electronic message 955 to send electronic message 955 to owner 500, whereby owner 500 would preferably receive electronic message 955 via a message services 912 related electronic message 955 retrieval/review service/mechanism/process. Alternatively messaging services 912 via message initiation website 954 could allow for any form of communication to be sent/processed; said communications could include but are not limited to faxes, pages, calls, all types of messages (including voice, text, email, etc.).

Figure 15:
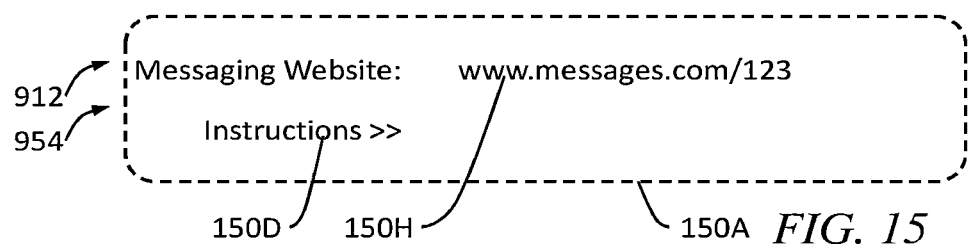
FIG. 15 shows a FIP contact-element(s) group configuration alternative-13, depicting contact-element(s) associated with messaging services.

FIG. 15 shows (FIG. 1) contact-element(s) group 150A alternative-13, consisting of a direct messaging web address 150H and FIP-instructions 150D; whereas FIP-instructions 150D instruct owner 500 on how/where to set messaging services 912. Next, owner 500 would set messaging services 912; whereas during the messaging services 912 setup process system 600 would generate/activate direct messaging web address 150H and related message initiation website 954 which in turn would present newly set messaging services 912; at this point FIP 700 would be placed (made available) for display, whereby an inquiring viewer 510 could send a message to owner 500 by accessing a general messaging web address 150H related message initiation website 954, through which inquiring viewer 510 could access messaging services 912 to prepare/submit an electronic message 955 for send to owner 500 who would then receive electronic message 955 via a message services 912 related electronic message 955 retrieval/review service/mechanism/process.

Figure 16:
FIG. 16 shows a FIP contact-element(s) group configuration alternative-14, depicting contact-element(s) associated with email services.

FIG. 16 shows (FIG. 1) contact-element(s) group 160A alternative-14, consisting of a direct system email address 160J and FIP-instructions 160D; whereas FIP-instructions 160D instruct owner 500 on how/where to set email services 914. Next, owner 500 would set email services 914; whereas during the email services 912 setup process system 600 would generate/activate system email address 160H; at this point FIP 700 would be placed (made available) for display, whereby an inquiring viewer 510 could send an email 957 to system email address 160H for distribution/processing by email services 914 for owner 500 retrieval/review/other purposes.

Figure 17:
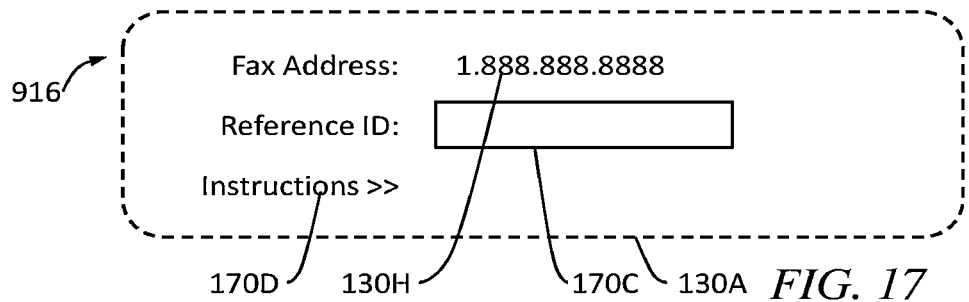
FIG. 17 shows a FIP contact-element(s) group configuration alternative-15, depicting contact-element(s) associated with faxing services.

FIG. 17 shows (FIG. 1) contact-element(s) group 170A alternative-15, consisting of a general fax number 170K, a reference id area 170C and FIP-instructions 170D; whereas FIP-instructions 170D instruct owner 500 on how/where to set fax services 916. Next, owner 500 would set fax services 916; whereas during the fax services 916 setup process system 600 would provide a system 600 unique and fax services 916 related reference id 170R to owner 500 for placement into reference id area 170C; at this point FIP 700 would be placed (made available) for display, whereby an inquiring viewer 510 could send fax 959 by calling to general fax number 170K and, when prompted, entering/submitting reference id 170R to start processing fax 959 for distribution/processing to/by fax services 916 for owner 500 retrieval/review/other purposes.

Figure 18:
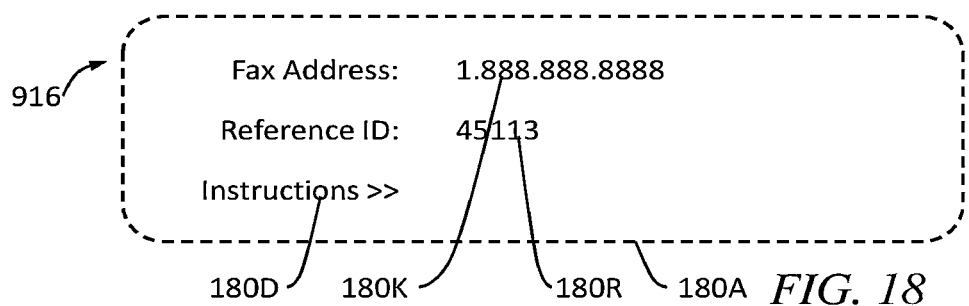
FIG. 18 shows a FIP contact-element(s) group configuration alternative-16, depicting contact-element(s) associated with faxing services.

FIG. 18 shows (FIG. 1) contact-element(s) group 180A alternative-16, consisting of a general fax number 180K, a reference id area 180R and FIP-instructions 180D; whereas FIP-instructions 180D instruct owner 500 on how/where to set fax services 916. Next, owner 500 would set fax services 916; whereas during the fax services 916 setup process system 600 would activate faxing services 916 related reference id 180R; at this point FIP 700 would be placed (made available) for display, whereby an inquiring viewer 510 could send fax 959 by calling to general fax number 180K and, when prompted, entering/submitting reference id 180R to start processing fax 959 for distribution/processing to/by fax services 916 for owner 500 retrieval/review/other purposes.

Figure 19:
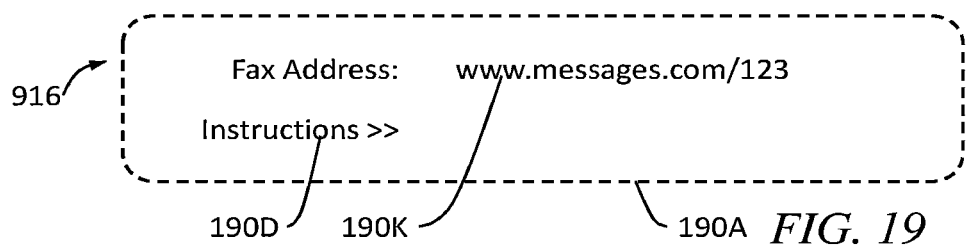
FIG. 19 shows a FIP contact-element(s) group configuration alternative-17, depicting contact-element(s) associated with faxing services.

FIG. 19 shows (FIG. 1) contact-element(s) group 190A alternative-17, consisting of a general fax number 190K, and FIP-instructions 190D; whereas FIP-instructions 190D instruct owner 500 on how/where to set fax services 916. Next, owner 500 would set fax services 916; whereas during the fax services 916 setup process system 600 would assign/activate system 600 unique direct fax number 190K and point it to fax services 916; at this point FIP 700 would be placed (made available) for display, whereby an inquiring viewer 510 could send fax 959 by calling to general fax number 190K for distribution/processing to/by fax services 916 for owner 500 retrieval/review/other purposes.

Figure 20:
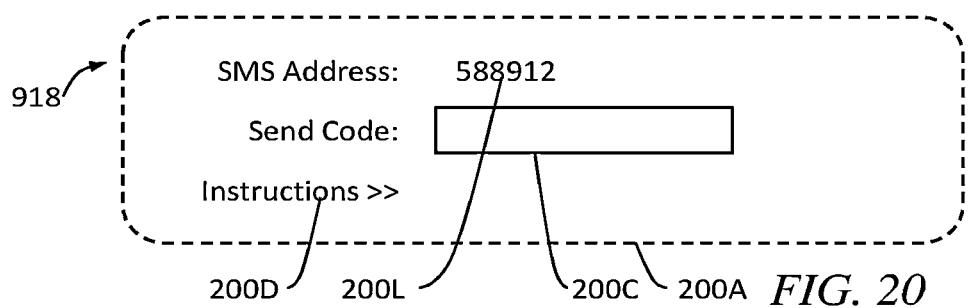
FIG. 20 shows a FIP contact-element(s) group configuration alternative-18, depicting contact-element(s) associated with SMS services.

FIG. 20 shows (FIG. 1) contact-element(s) group 200A alternative-18, consisting of a general SMS address 200L (short code), a reference id area 200C and FIP-instructions 200D; whereas FIP-instructions 200D instruct owner 500 on how/where to set SMS services 918. Next, owner 500 would set SMS services 918; whereas during the SMS services 918 setup process system 600 would provide a system 600 unique and SMS services 918 related reference id 200R to owner 500 for placement into reference id area 200C; at this point FIP 700 would be placed (made available) for display, whereby an inquiring viewer 510 could send a SMS message 961 containing reference id 200R to general SMS address 200L to access/request/initiate system 600 available and owner 500 set SMS services 918.

Figure 21:
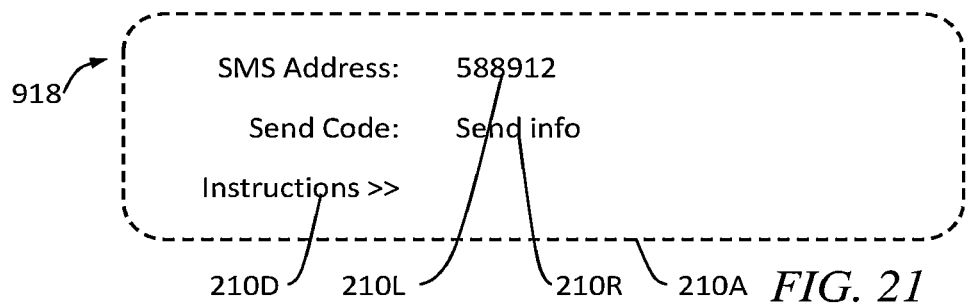
FIG. 21 shows a FIP contact-element(s) group configuration alternative-19, depicting contact-element(s) associated with SMS services.

FIG. 21 shows (FIG. 1) contact-element(s) group 210A alternative-19, consisting of a general SMS address 210L, a reference id 210R and FIP-instructions 210D; whereas FIP-instructions 210D instruct owner 500 on how/where to set SMS services 918. Next, owner 500 would set SMS services 918, whereas during the SMS services 918 setup process system 600 would activate SMS services 918 related reference id 210R; at this point FIP 700 would be placed (made available) for display whereby an inquiring viewer 510 could send a SMS message 961 containing reference ID 210R to general SMS address 200L to access/request/initiate system 600 available and owner 500 set SMS services 918.

In FIG. 20-21, as an alternative, FIP-instructions could request viewer to send additional/specific information/data, along with said reference id to system 600 for more advanced processing purposes. Optionally, SMS short code addresses could instead be long-code address (or standard phone-id/number) and called to gain access.

Figure 22:
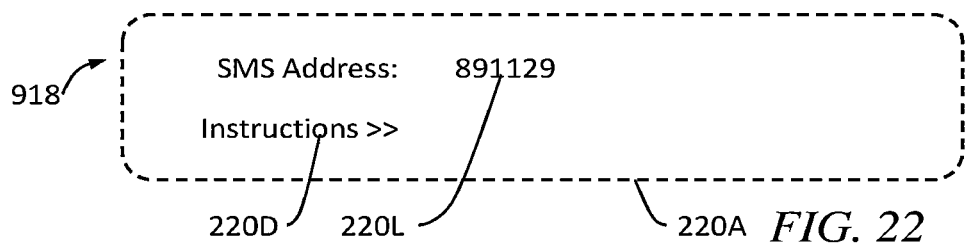
FIG. 22 shows a FIP contact-element(s) group configuration alternative-20, depicting contact-element(s) associated with SMS services.

FIG. 22 shows (FIG. 1) contact-element(s) group 220A alternative-20, consisting of a direct SMS address 220L and FIP-instructions 220D; whereas FIP-instructions 220D instruct owner 500 on how/where to set SMS services 918. Next, owner 500 would set SMS services 918; whereas during the SMS services 918 setup process system 600 would assign/activate system 600 unique SMS address 22L and point it to SMS services 918; at this point FIP 700 would be placed (made available) for display whereby an inquiring viewer 510 could send a SMS message 961 to SMS services 918 to access/request/initiate system 600 available and owner 500 set SMS services 918. Alternatively, FIP-instructions 220D could also request viewer 510 to send specific information/data in SMS message 961 to system 600 for more advanced processing purposes.

Figure 23:
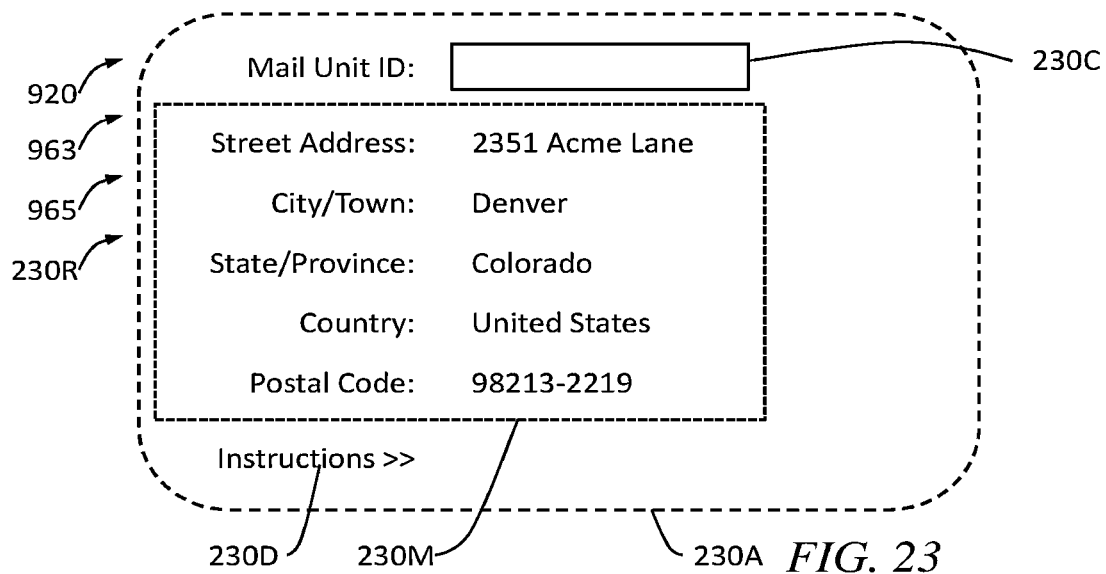
FIG. 23 shows a FIP contact-element(s) group configuration alternative-21, depicting contact-element(s) associated with mailing services.

FIG. 23 shows (FIG. 1) contact-element(s) group 230A alternative-21, consisting of a reference id area 230C, system street address 230M and FIP-instructions 230D, whereas system street address 230M points to (or is addressed to) a system 600 related mail processing provider 963. Initially, owner 500 preferably reads FIP-instructions 230D, to learn how/where to set mail services 920; Next, owner 500 would set mail services 920; whereas during the mail services 920 setup process system 600 would provide a system 600 unique and mail services 920 related reference id 230R to owner 500 for placement into reference id area 230C; at this point FIP 700 would be placed (made available) for displayed, whereby an inquiring viewer 510 using a mailing address consisting of reference id 230R and system street address 230M can send mail 963 to mail services 920 related mail processing provider 965; whereby mail processing provider 965 would reference mail 963 contained reference id 230R and related mail services 920 instructions/directions/comments to process mail 963 per owner 500 set mail services 920 instruction/directions/commands.

Figure 24:
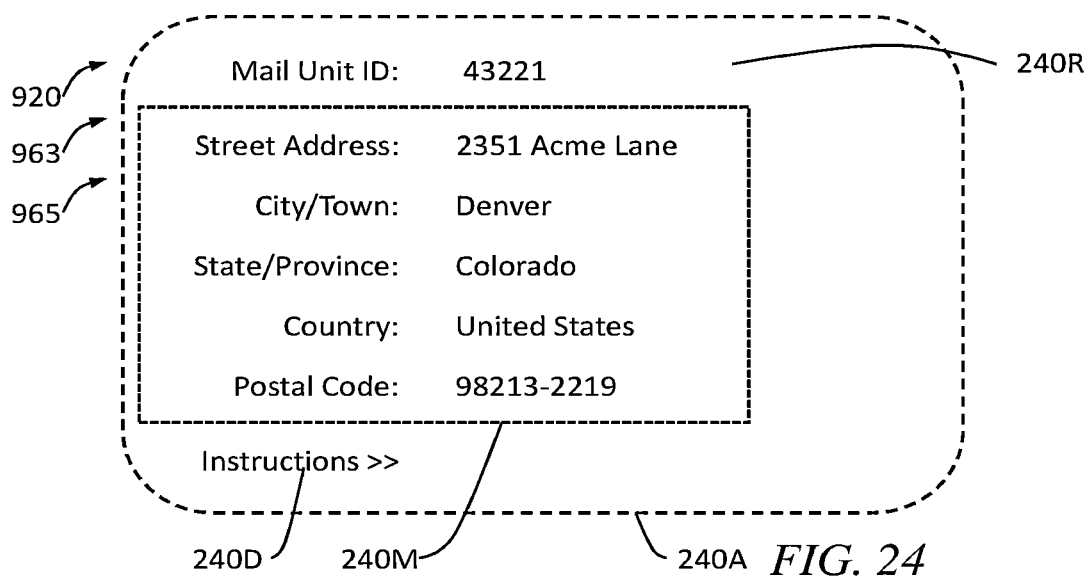
FIG. 24 shows a FIP contact-element(s) group configuration alternative-22, depicting contact-element(s) associated with mailing services.

FIG. 24 shows (FIG. 1) contact-element(s) group 240A alternative-22, consisting of a reference id area 240R, system street address 240M and FIP-instructions 240D, whereas system street address 240M points to (or is addressed to) a system 600 related mail processing provider 963. Initially, owner 500 preferably reads FIP-instructions 240D, to learn how/where to set mail services 920; Next, owner 500 would set mail services 920; whereas during the mail services 920 setup process system 600 would activate mail services 920 related reference id 240R; at this point FIP 700 would be placed (made available) for displayed, whereby an inquiring viewer 510 using a mailing address consisting of reference id 240R and system street address 240M can send mail 963 to mail services 920 related mail processing provider 965; whereby mail processing provider 965 would reference mail 963 contained reference id 240R and related mail services 920 instructions/directions/comments to process mail 963 per owner 500 set mail services 920 instruction/directions/commands.

In FIGS. 23-24, system street address could instead be a single, mail distribution provider(s) recognized, location id; whereas the location id when scanned would provide to the mail distribution provider(s) routing information/instructions; furthermore a handling id could be used in place of both the location and reference id; whereas the handling id when scanned would provide to the mail distribution provider(s) routing/handling information/instructions. A primary advantage to using a process like this is flexibility in routing of mail parcels, as routing could be change (and optionally billed) real time per owner 500 and/or qualified designee inputs to system services 900. The following generally describes said previous alternative mail services process: 1. mail parcels would be received by a mail distribution provider such as the US Postal Service, Fed-Ex, UPS and/or similar; 2. given the mail distribution provider systems are networked with system 600 the mail distribution provider would then scan mail parcel location and/or handling ID to fulfill parcel routing/handling instruction, including possible delivery of parcel to mail processing provider or other designation; 3. in a case where mail parcel is (addressed to via physical address and/or location-id) sent to a mail processing provider they would then preferably scan a handling ID to fulfill owner 500 system services 900 inputted request/commands.

FIG. 25 shows (FIG. 1) contact-element(s) group 250A alternative-23, consisting of the same contact-element(s) group 90A shown in FIG. 9 with the addition of a system 600 related and FIP 700 unique activation barcode 250N; whereas unique activation barcode 250N is scanned by a system 600 networked scanner 922 which in turn activates reference id 250R making it available to system 600 for owner 500 setup and activation process as described in FIG. 9. Reference id 250R can be unique at either a system 600 or a call-address 950 level. Alternatively, an activation barcode such as the one depicted in FIG. 25, can be set as such, to activate multiple contact-element(s), as related with any given FIP.

FIG. 26 shows (FIG. 1) contact-element(s) group 260A alternative-24, consisting of a similar contact-element(s) group 250A as that depicted in FIG. 25 with the addition of a opaque rub away covering material 160P (in figure it is shown as translucent for depiction purposes) which is initially covering reference id 250R (depicted in FIG. 25) so as to keep in private until such point an owner 500 obtains/purchases FIP 700 and activates reference id 250R per setup and activation process described in FIG. 25. Alternatively, activation barcode 250N could be omitted from FIP 700 and covering material 260P could initially conceal reference id 250R.

FIG. 27 shows (FIG. 1) contact-element(s) group 270A alternative-25, consisting of a similar contact-element(s) group 70A as that depicted in FIG. 7 with the addition of a opaque rub away covering material 270P (in figure it is shown as translucent for depiction purposes) which is initially covering direct system web address 70E (depicted in FIG. 7); and activation barcode 270N which when scanned by a system 600 networked scanner 922 activates direct system web address 70E making it available to system 600 for the continuation of the owner 500 setup and activation process as described in FIG. 7. In FIGS. 26 and 27, alternatively covering material 260P could also include peel-away tape; peel-away film; packaging materials; any other temporary (printed/written) information concealing type of method and combination thereof.

Figure 28:
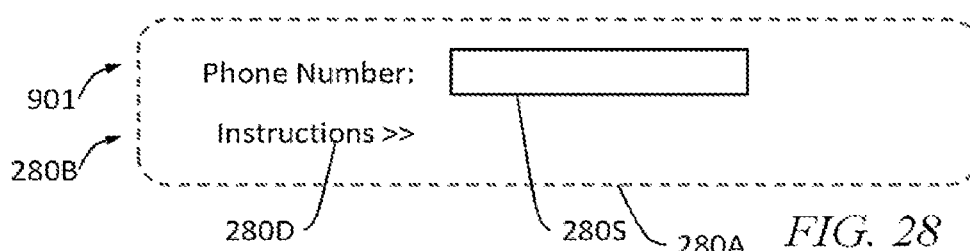
FIG. 28 shows a FIP contact-element(s) group configuration alternative-26, depicting contact-element(s) associated with phone services.

FIG. 28 shows (FIG. 1) contact-element(s) group 280A alternative-26, consisting of contact-element (placement) area phone number area 280S and FIP-instructions 280D; whereas FIP-instructions 280D instruct owner 500 on how/where to retrieve direct system phone number 280B and set system 600 maintained and owner 500 settable phone services 901. Next, owner 500 would set phone services 901; whereas during the phone services 901 setup process system 600 would assign/point direct system id 280B to phone services 901; system 600 would also distribute a direct system phone number 280B to owner 500 for placement into phone number area 280C; at this point FIP 700 would be placed (made available) for display, whereby an inquiring viewer 510 could then call to direct system phone number 280B to access FIP 700 advertised item 880 related phone services 901. In some cases, the FIP-Instructions could be the only contact-element located on FIP 700, simply intended to provide owner 500 on how to set system services 900 as they relate to FIP 700.

Figure 29:
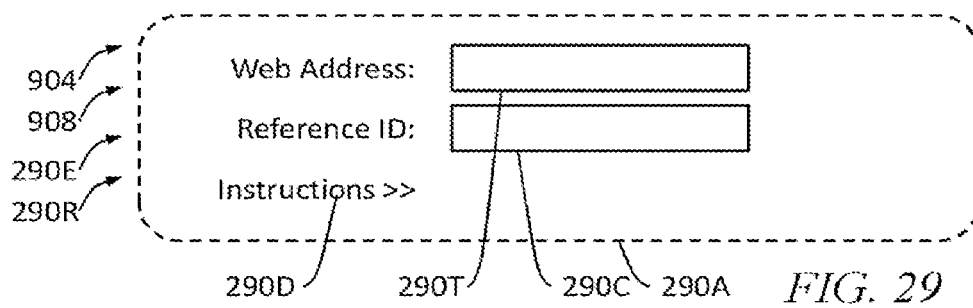
FIG. 29 shows a FIP contact-element(s) group configuration alternative-27, depicting contact-element(s) associated with web services.

FIG. 29 shows (FIG. 1) contact-element(s) group 290A alternative-27, consisting of web address area 290T, reference id area 290C and FIP-instructions 290D; whereas FIP-instructions 290D instruct owner 500 on how/where to retrieve general system web address 290E and set system 600 maintained and owner 500 settable web services 904. Next, owner 500 would set web services 904; whereas during the web services 904 setup process system 600 would provide both web address 290E and reference id 290R to owner 500 placement into web address area 290T and reference id area 290C, respectively; at this point FIP 700 would be placed (made available) for display, whereby an inquiring viewer 510 could then lookup general system web address 290E to access services website 908 through which inquiring viewer 510 would then provide/submit reference id 50R to system 600 to access FIP 700 advertised/related item 880 related web services 904.

Figure 30:
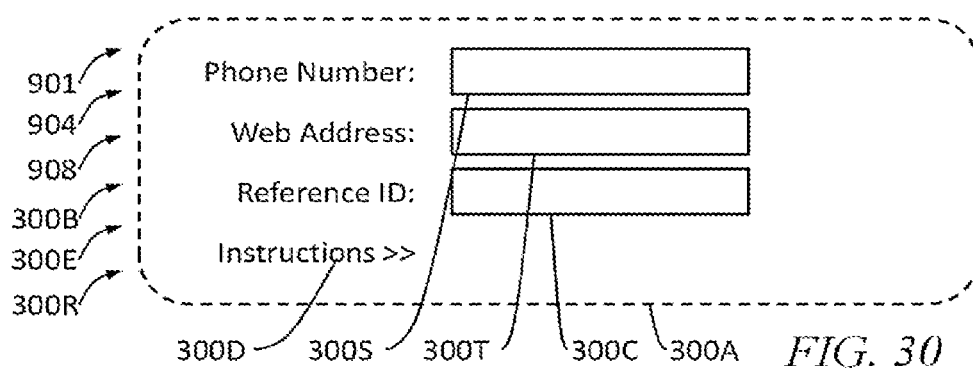
FIG. 30 shows a FIP contact-element(s) group configuration alternative-28, depicting contact-element(s) associated with phone and web services.

FIG. 30 shows (FIG. 1) contact-element(s) group 300A alternative-28, consisting of web address area 300T, phone number area 300S, reference id area 300C and FIP-instructions 300D; whereas FIP-instructions 300D instruct owner 500 on how/where to set system 600 maintained and owner 500 settable web services 904 and phone services 901. Next, owner 500 would set web services 904 and phone services 901; whereas during the web services 904 and phone services 901 setup process system 600 would provide a web services 904 and phone services 901 related general system web address 300B, phone address 300E and reference id 80R to owner 500 for placement into web address area 300T, phone number area 300S and reference id area 300C, respectively; at this point FIP 700 would be placed (made available) for display, whereby an inquiring viewer 510 could then lookup general system web address 300B to access a service website 908 through which inquiring viewer 510 could then provide/submit reference id 300R to system 600 to access FIP 700 advertised/related item 880 related phone services 904; and/or an inquiring viewer 510 could then call to general system phone number 300E and, when prompted, provide/submit reference id 300R to system 600 to access FIP 700 advertised/related item 880 related phone services 901.

Figure 31:
FIG. 31 shows a FIP of type bulletin board, configured with a contact-element(s) group.

FIG. 31 shows a preferred embodiment of a manufactured, pre-configured, mass-produced and owner 500 obtainable FIP 700 of a type bulletin-advertisement board 702 which contains contact-element(s) group 310A, a contacts elements group consisting of a general system phone number 310B, direct system web address 310E, activation barcode 310N, product inventory barcode 801, reference id(s) 310R-1 through 310R-5 and FIP-instructions 310D; whereas when activation barcode 310N is scanned (as described in FIG. 25) reference id(s) 310R-1 through 310R-5 and direct system web address 310E are made available to system 600 for owner 500 to set each reference id 310R-1 through 310R-5 related phone services (as per similar process described in FIG. 3). The activation barcode 310N activation would also activate direct system web address 310E, making it available to system 600 for owner 500 to set related web services 904 (as per similar process described in FIG. 7).

Figure 32:
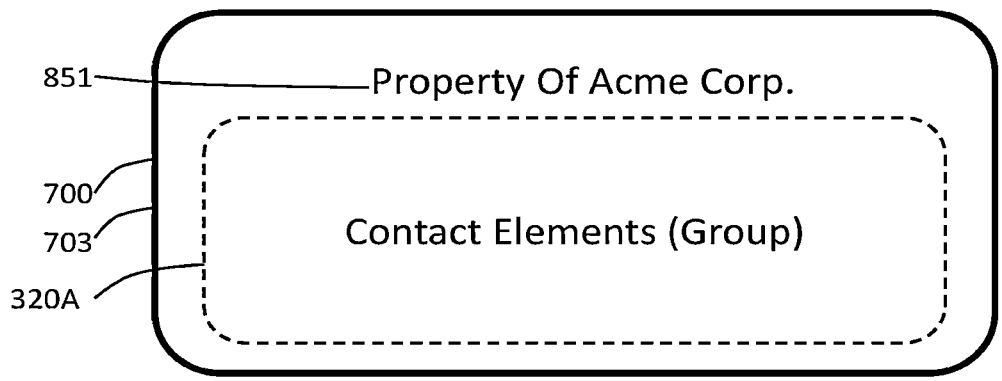
FIG. 32 shows a FIP of type label/tag, configured with a contact-element(s) group.

FIG. 32 shows a preferred embodiment of a manufactured, pre-configured, mass-produced, mass-distributed and owner 500 obtainable FIP 700 of a type tag 703; whereas tag 703 can have an adhesive back and/or be assembled with/to a chain, ring, signs, containers and/or any other applicable device/object. Tag 703 is configured with a contacts elements group 320A. Tag 703 could be attached to any item where-if said item was lost, any person, who found said item, could contact said item's owner by referencing tag 703 configured contact-element(s) group 320A to contact said item owner. Tag 703 could be manufactured to be re-attachably attached to said device/object; it could also be intended to be detachably to said device/object.

Figure 33:
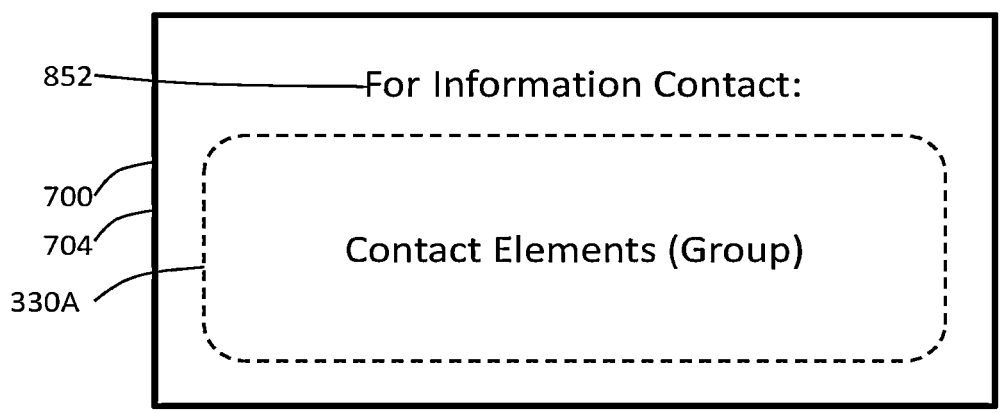
FIG. 33 shows a FIP of type card, configured with a contact-element(s) group.

FIG. 33 shows a preferred embodiment of a manufactured, pre-configured, mass-produced, mass-distributed and owner 500 obtainable FIP 700 of a type card 704, configured with a contact-element(s) group 330A; whereas card 704 could be a business, personal, service or any other type of (promotional/advertising) card. It could be made of plastic, paper, or any applicable/appropriate material; and could be configured with additional graphics 852.

Figure 34:
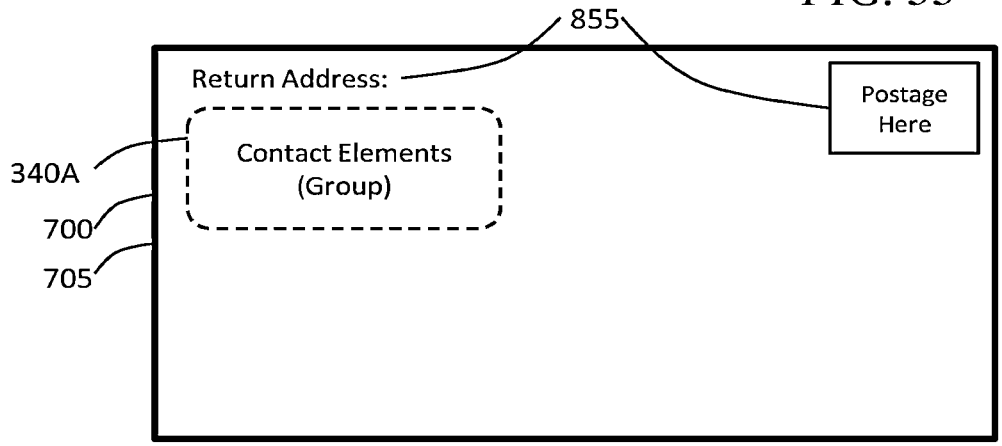
FIG. 34 shows a FIP of type envelope, configured with a contact-element(s) group.

FIG. 34 shows a preferred embodiment of a manufactured, pre-configured, mass-produced, mass-distributed and owner 500 obtainable FIP 700 of a type envelope 705, configured with a contact-element(s) group 340A; whereas envelope 705 can be made from any material and could be configured with additional graphics 855.

Figure 35:
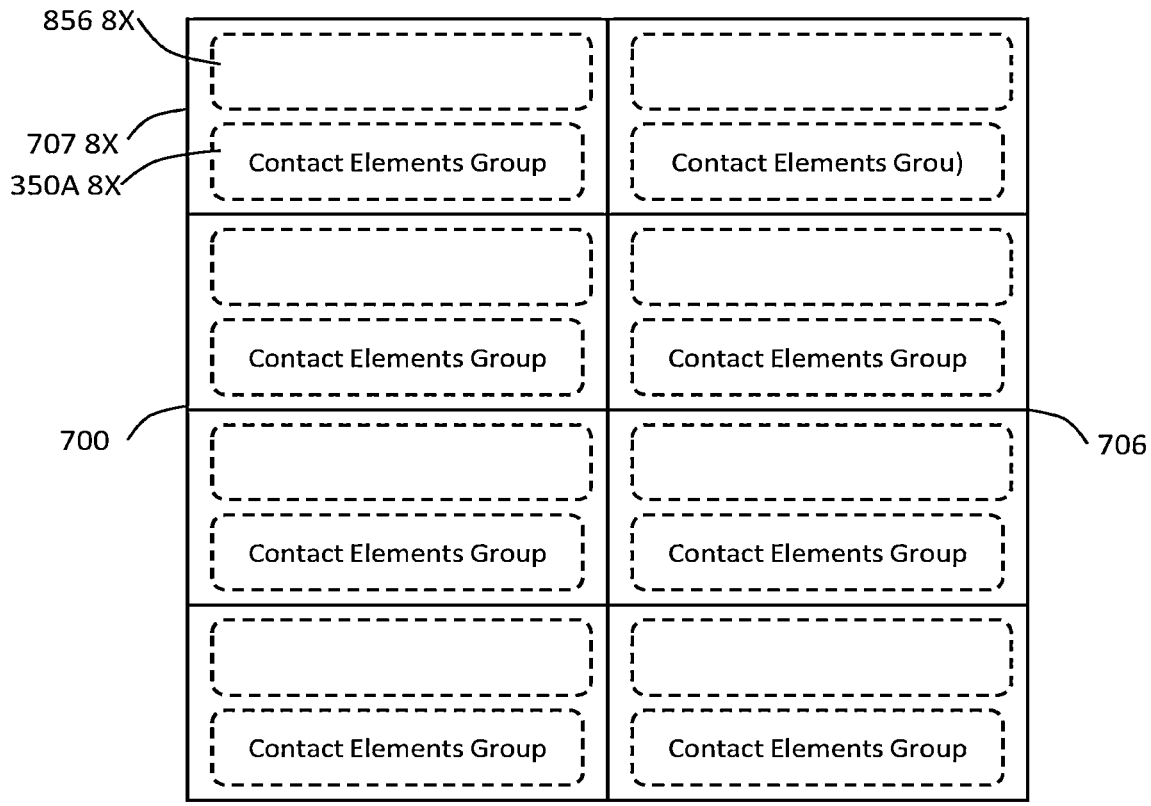
FIG. 35 shows a FIP of type multi-card (generic print) card-stock with detachably attached cards, each configured with a contact-element(s) group.

FIG. 35 shows a preferred embodiment of a manufactured, pre-configured, mass-produced, mass-distributed, print ready and owner 500 obtainable FIP 700 of a type multi-card stock 706 comprised from multiple individual and temporarily attached card(s) 707; whereas each card 707 is configured with a contacts elements group 350A along with some additional/optional graphics 856. Preferably graphics 856 would include an outlined area for owner 500 to place custom information, such as business/service/other name information. Alternatively, designated area 856 could also contain manufacturing printed art or information.

Figure 36:
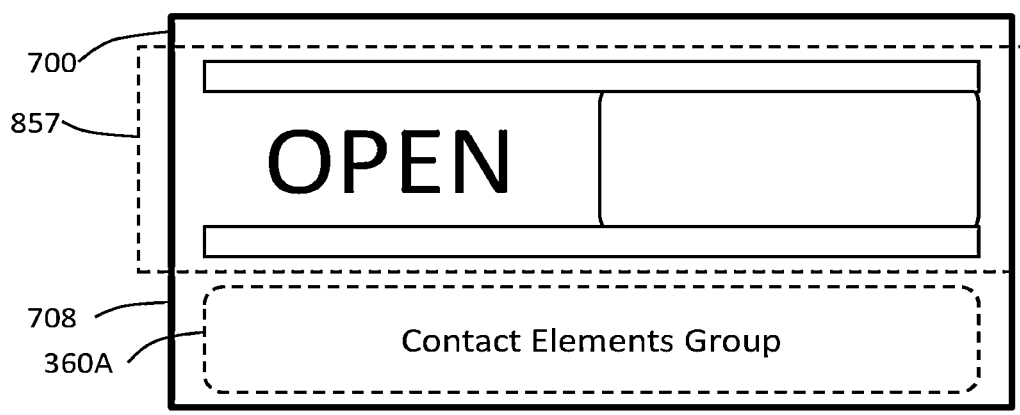
FIG. 36 shows a FIP of type open/closed advertisement product, configured with a contact-element(s) group.

FIG. 36 shows a preferred embodiment of a manufactured pre-printed, mass-produced, mass-distributed and owner 500 obtainable FIP 700 of a type advertisement product 708, configured with a contact-element(s) group 360A; whereas advertisement product 708 can be made from any material and any number/combination of parts. Advertisement product 708 is fabricated from simple mechanical parts 857 consisting of a sliding cover which is maintained by some guides, whereas said cover slides back and forth (preferably with a mechanism which can be accessed on the back side of Ad FIP 708) to expose the word OPEN in one position and the word CLOSED in the other. Ad FIP 708 would be ideal for small shop owners, allowing them to provide additional shop information via the FIP 700 to system 600 information distribution process, including hours of operation.

Figure 37:
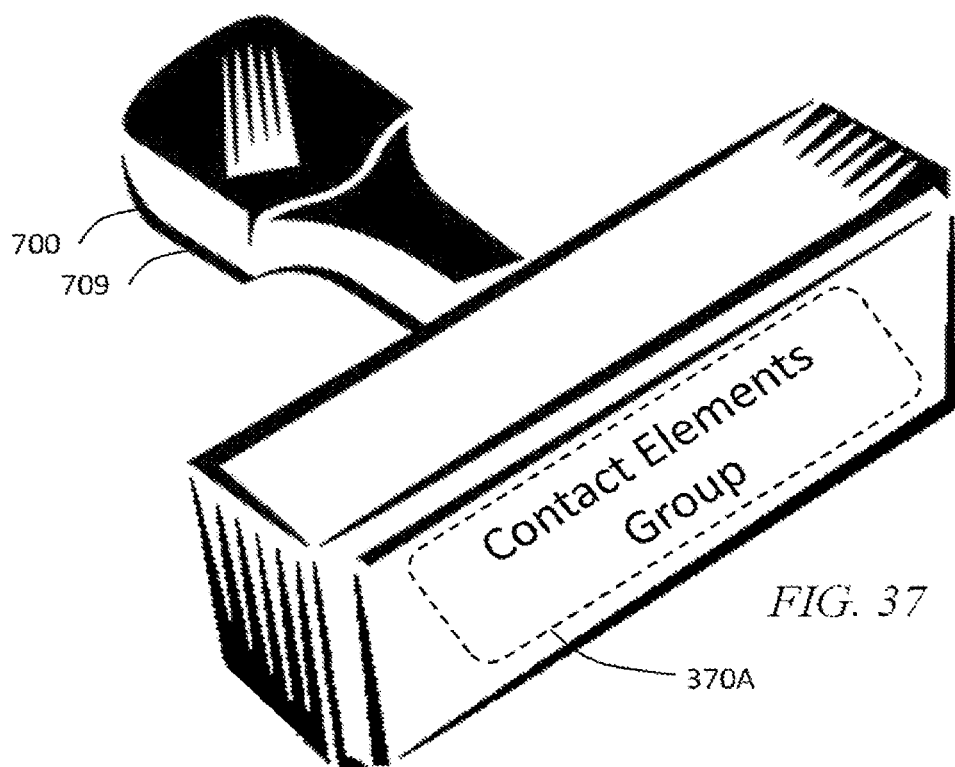
FIG. 37 shows a FIP of type stamping mechanism, stamp imprinting surface, configured with a contact-element(s) group.

FIG. 37 shows a manufacturing pre-printed, mass-produced, mass-distributed and owner 500 obtainable FIP 700 of a type stamping mechanism 709 configured with a contact-element(s) group 370A imprinted on the stamping surface; whereas when stamp mechanism 709 is applied to any applicable object surface contact-element(s) group 370A is printed/stamped to said object surface. Alternatively, stamp mechanism 709 instead of being constructed as such to leave ink stamps it could rather be constructed to leave indention or physical impression stamps.

Figure 38:
FIG. 38 shows a FIP of type for sale sign, configured with a contact-element(s) group.

FIG. 38 shows a preferred embodiment of a manufactured, pre-configured, mass-produced, mass-distributed and owner 500 obtainable FIP 700 of a type for sale sign 710 configured with a contact-element(s) group 380A and artwork 852.

Figure 39:
FIG. 39 shows a FIP of type for peel and stick label, configured with a contact-element(s) group.

FIG. 39 shows a preferred embodiment of a manufactured, pre-configured, mass-produced, mass-distributed and owner 500 obtainable FIP 700 of a type peel and stick label 711 configured with a contact-element(s) group 390A.

Figure 40:
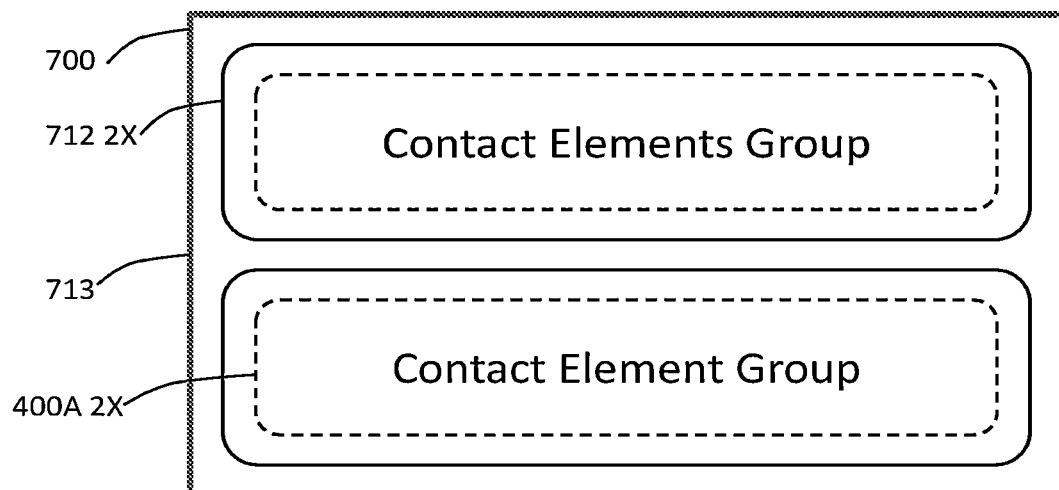
FIG. 40 shows a FIP of type containing multiple peel and stick labels, each configured with a contact-element(s) group.

FIG. 40 shows a preferred embodiment of a manufactured, pre-configured, mass-produced, mass-distributed and owner 500 obtainable FIP 700 of a type label stock 713 with (2) peel and stick labels 712 each configured with a contact-element(s) group 400A. Alternatively, there could be more then (2) labels per label stock sheet configured with varying and/or identical contact-element(s) groups.

Figure 41:
FIG. 41 shows a FIP of type containing multiple peel and stick labels, some configured with a contact-element(s) groups and others configured with graphics.

FIG. 41 shows a preferred embodiment of a manufactured, pre-configured, mass-produced, mass-distributed and owner 500 obtainable FIP 700 of a type label stock 714 with (2) peel and stick labels, one regular label 715 and one for information label 716 configured, FIP label 716 configured with a contact-element(s) group 410A.

Figure 42:
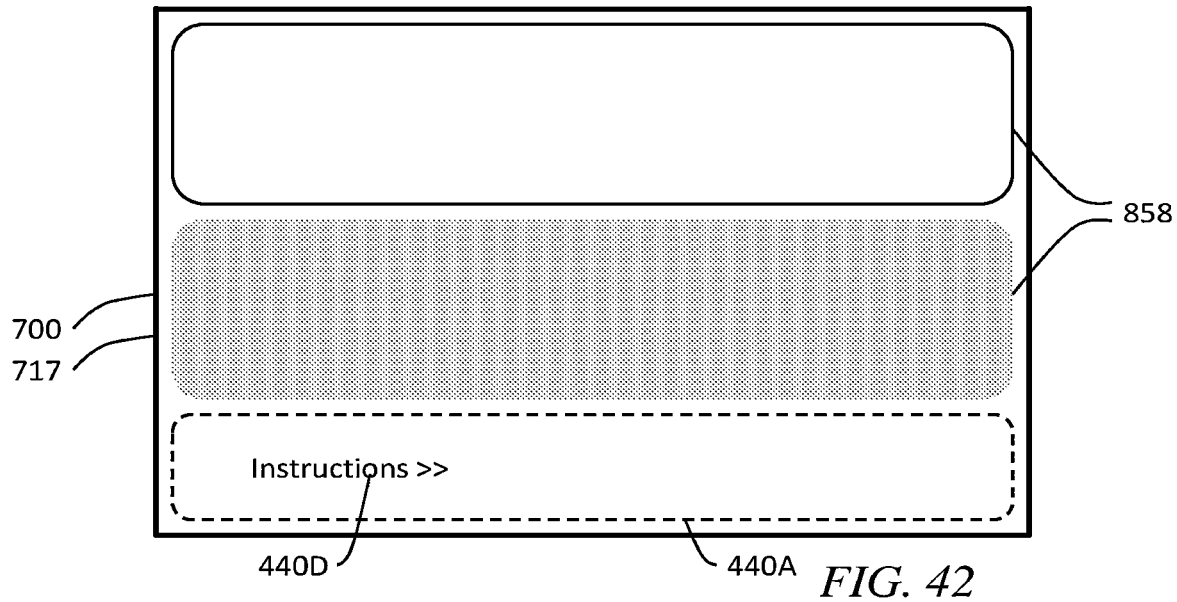
FIG. 42 shows a FIP of type sign, configured with a contact-element(s) group and label/graphics placement areas.

FIG. 42 shows a preferred embodiment of a manufactured, pre-configured, mass-produced, mass-distributed and owner 500 obtainable FIP 700 of a type sign 717 with optional graphics 858, configured with contacts elements groups 440A. In this case the contact-element(s) group 440A is defined as being FIP instructions 440D only, indicating that for this FIP 700 owner 500 would be instructed, using FIP instructions 440D, on how to set up FIP 700 related system services 900.

Figure 43:
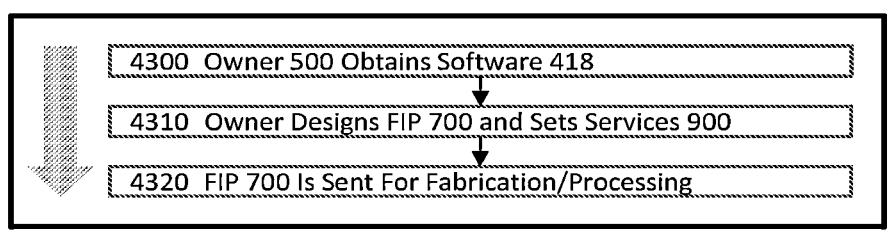
FIG. 43 is a simple method flow chart for an embodiment which depicts the main steps involved in using a FIP software product to produce, through the use of a fabricator services, customized FIP(s).

FIG. 43 depicts a method/process for creating a FIP using software 418. In step 4300: owner 500 would obtain FIP 700 creation software 418 by some means, such as, but not limited to, downloading it from the internet, purchasing it from a store and/or ordering it through the mail. Step 4310: owner 500 would then utilize software 418 to design, arrange and/or configure (in a computer design format) any applicable/appropriate contact-element(s) group, as defined in this patent application, onto an applicable/appropriate/ electronic-version FIP 700; software 418 could also allow for owner 500 to design parts of and/or all of FIP 700; ideally software 418 would directly allow owner 500 to set contact-element(s) group related system services 900. Step 4320: software 418 would then via the use of the internet allow for owner 500 to send the electronic version of FIP 700 to at least one fabricator for build. Upon FIP 700 physical build completion fabricator would then send/ship said physical FIP 700 version back to owner 500. Alternative, to owner 500 using software 418 to design FIP 700 a software 418 equivalent service website could be made available to owner 500 which would fulfill the same functions as provided by software 418.

Figure 44:
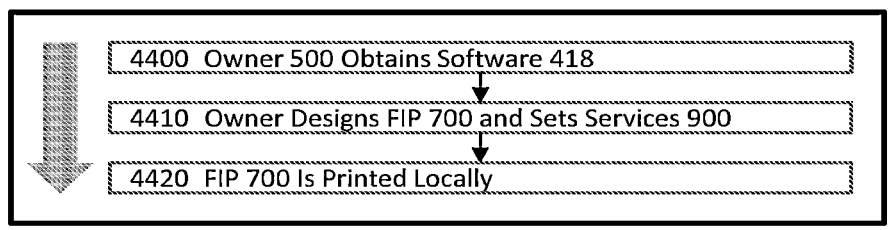
FIG. 44 is a simple method flow chart for an embodiment which depicts the main steps involved in using a FIP software product to produce, locally, customized FIP(s).

FIG. 44 depicts a method/process for creating a FIP using software 428. In step 4400: owner 500 would obtain FIP 700 creation software 428 by some means, such as, but not limited to, downloading it from the internet, purchasing it from a store and/or ordering it through the mail. Step 4410: owner 500 would then utilize software 428 to design, arrange and/or configure (in a computer design format) any applicable/appropriate contact-element(s) group, as defined in this patent application, onto an applicable/appropriate/ electronic-version FIP 700; software 428 could also allow for owner 500 to design parts of and/or all of FIP 700; ideally software 428 would directly allow owner 500 to set contact-element(s) group related system services 900. Step 4420: software 428 would then allow owner 500 to print a physical FIP 700 version locally to a device such as a printer/plotter. Alternatively, to owner 500 using software 428 to design FIP 700 a software 428 equivalent service website could be made available to owner 500 which would fulfill the same functions as provided by software 428.

FIG. 45 depicts a flowchart showing a general FIP distribution process, in the following steps:

FIG. 45, step 450, a level-0 distributor 45C1 configures a predetermined number of optionally and previously manufactured FIP 700 units with batch code 45A1, units bundled with other FIP units, preferably similar/same, into FIP level-0 bundle 45B1, also preferably configured with a bundle batch code, bundle information logged for distribution and tracking purposes. The preceding and said FIP bundling process can be repeated, using the same and/or different FIP types and bundle batch codes, any number FIP bundles can be created;

FIG. 45, step(s) 450-1, a predetermined number of FIP 700 units can be pulled from level-0 bundle 45B1 by level-0 distributor 45C1, creating level-1 bundle 45B1', which can then be distributed to level-1 distributor 45C1', who can either distribute level-1 bundle 45B1' related FIP 700 units to FIP owners 500 (end consumers) and/or create a level-n bundle 45B'', pulling FIP 700 units from level-1 bundle 45B1', bundle information logged for distribution and tracking purposes.

FIG. 45, step(s) 450-2, a predetermined number of FIP 700 units can be pulled from level-1 bundle 45B1' by level-1 distributor 45C1', creating level-n bundle 45B1'', which can then be distributed to level-n distributor 45C1', who can either distribute level-n bundle 45B1'' related FIP 700 units to FIP owners 500 (end consumers) and/or create a level-m bundle 45B''', pulling FIP 700 units from level-n bundle 45B1'', bundle information logged for distribution and tracking purposes.

FIG. 45, step(s) 450-3, a selected number of FIP 700 units, would be obtained by owner 500, preferably through a retailer and by method of purchase; whereby owner 500 would then set said FIP 700 unit(s) related services 900. Alternatively, each FIP 700 unit could be configured with a product bar-code 800, scanned at purchased, deducting unit from inventory; furthermore, FIP 700 could also contain a system 600 linked activation code, such as those depicted in FIGS. 25-27, that when scanned would activate FIP 700 related system 600 maintained services 900, preferably making services 900 accessible to be set by owner 500.

In FIG. 45, Steps 450-1 to 450-2 can be repeated for as many down line distributors as required. Steps 450 to 450-3 can be repeated for any number of distributor(s) and/or distributor down-line(s), distributing any number of FIP bundles, containing any FIP type, each preferably configured with a batch code.

Figure 57:
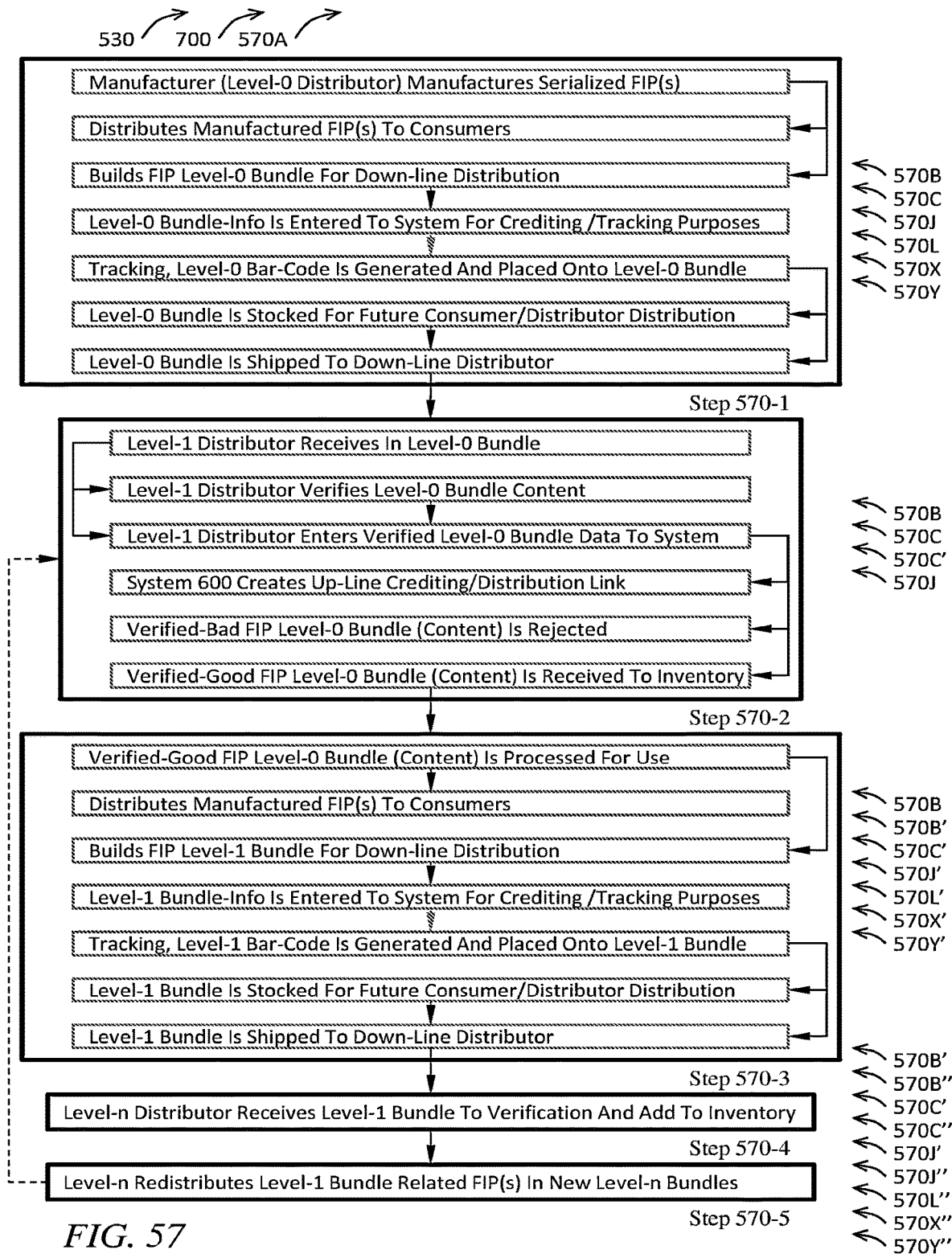
FIG. 57 depicts a flowchart showing a preferred FIP distribution process, including distributor related crediting process; whereas FIP(s) are configured with serialized referral codes.
Figure 69A:
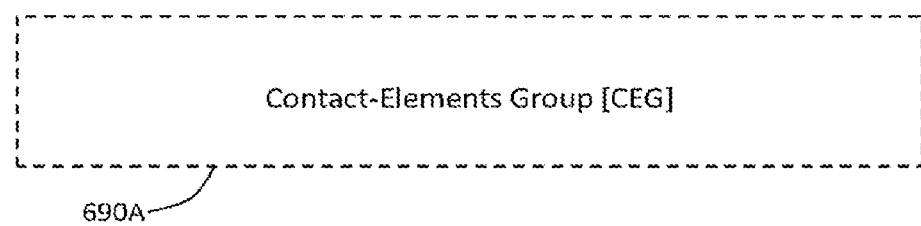
FIG. 69A-G show a contact-element group, not defined but assumed to be any one of the applicable contact-element group embodiment possibilities presented in the current application, configured onto (6) possible FIP(s), each FIP of a type product display.
Figure 69B:
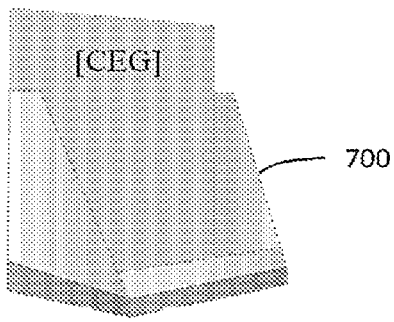
Figure 69C:
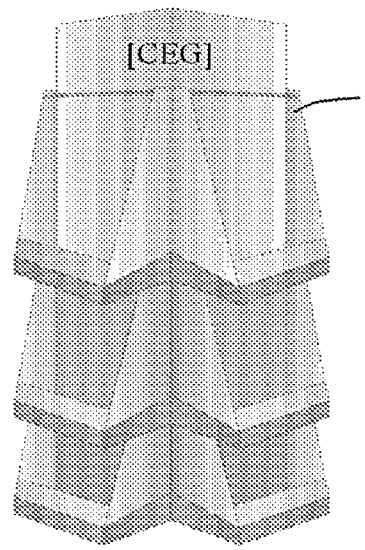
Figure 69D:
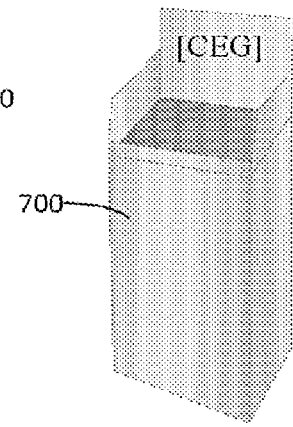
Figure 69E:
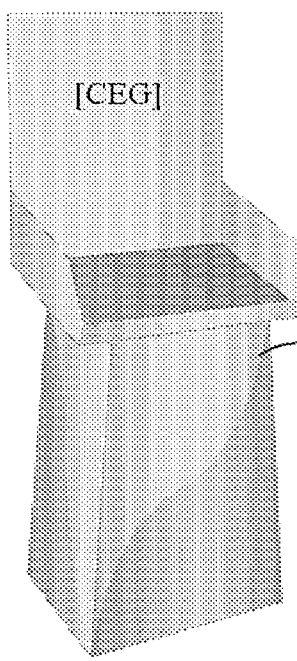
Figure 69F:
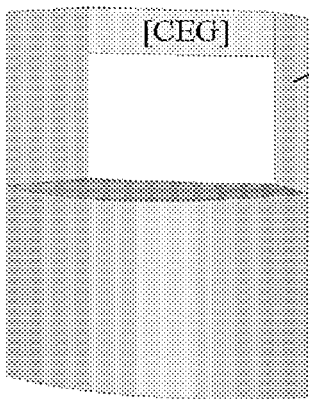
Figure 69G:
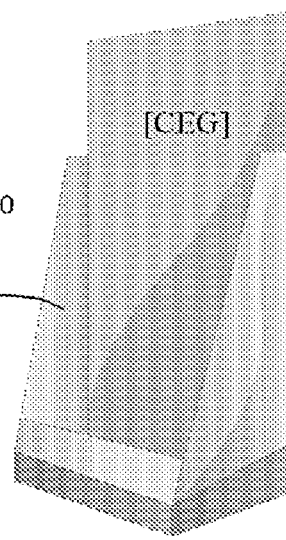

In FIG. 45, as an alternative to each FIP 700 unit containing a batch-code instead they could contain a serialized referral code for crediting and tracking purposes, similar to that depicted in FIG. 57.

FIG. 46 shows a front and back view of a retailer 515 referral code 460Y related FIP 700 of a type for-sale-sign, configured with contact-element(s) group 460A, similar to that depicted in FIG. 1, but additionally comprised of contact-element(s) web address 460X and referral code 460Y, both also a types of referral element 750, which are preferably configured directly on FIP 700 and are incorporated within FIP instructions 460D; and whereas FIP 700 setup process is similar to that depicted in FIGS. 1&2, but additionally and more specifically include FIP instructions 460D that instruct FIP owner 500 to go to web address 460X related services 900 website, where services 900 can be set, during which referral code 460Y is entered to system 600, where referral code 460Y is used to relate FIP owner 460 to newly activated services 900 to retailer 515, creating a system 600 utilized and/or maintained referral association 1000, preferably utilized for monetary credit-tracking purposes, where ideally some designated amount of money is paid to retailer 515 for each pre-designated services 900 activation referral, preferred paid money amount being some percentage of services 900 FIP owner 500 costs.

FIG. 47 depicts a retailer 515 referral code 470Y related FIP 700 of a type display placard/sign, configured with contact-element(s) group 470A; whereas FIP 700 is intended for display-only, for viewing by consumer 530, who utilize contact-element(s) group 470A applicable elements, to call-to system 600 to access services 900, that either provide information on how to access services that help you create FIP(s) and/or provide access to services that help you create FIP(s). The following, details steps for a FIP 700 preferred embodiment.

FIG. 47, Step 1, FIP 700 is placed for display in at least one retailer 515 related store(s), intended for viewing by consumer 530. Continue to Step 2.

FIG. 47, step 2, an end consumer 530 shopping at a retailer 515 store notices and reads instructions 470D, which inform on how/why consumer 530 can/should access services 900 to create a FIP. Continue to Step(s) 3*a*, 3*b* and/or 3*c*.

FIG. 47, step 3*a*, upon end consumer 530 calling phone number 470B via a call device to access system 600 related service 900, when prompted (similar to that shown in FIG. 54A) would enter referral id 470R, entry triggering a system 600 message 470K text-back, text sent to call device related and system 600 captured caller-id, message 470K preferably containing instructions along with retailer 515 related referral elements 750 used to access services 900 (similar to that shown in FIG. 55A), services preferably used to create and/or assist in creating FIP(s) and/or FIP related services; whereby consumer 530 using referral elements 750 to access services 900, a consumer 530 to services 900 to retailer 515 referral association 1000 can be created. Alternatively, information 470K could instead include any applicable linked contact-element or linked contact-element combination. Furthermore, services 900 would not be limited. Alternatives to system 600 initiated message text-back message could include, data sent via system 600 initiated, live person callbacks, phone based callbacks, web-services based callbacks, electronic messages, faxes, placement to website(s); placement to applicable electronic site(s); placement to mobile applications; placement to applications, physical courier services; via any other applicable way data can be sent between services and users. As yet another alternative, instead of text-back messages being text based it could be text, file and/or code based and/or variations thereof and/or combinations thereof. Continue to Step 4.

FIG. 47, step 3b, upon consumer 530 using an internet accessible device looks-up system 600 maintained and retailer 515 related referral web-address 470X, which points to services website 1500, a reference site to which system 600 navigates to upon a said lookup, and which provides access to services 900, services preferably used to set/assist in creating FIP(s) and/or FIP related services; whereby when services 900 have been utilized/set/activated, and using consumer 530 to retailer 515 related and looked-up referral web-address 470X data, system 600 can create, maintain and/or utilize a consumer 530 to services 900 to retailer 515 referral association 1000. Unlike a standard web-address that simply point a user (consumer) to some predefined website; a referral web-address in addition to pointing said user to said website can also be system captured and utilized for referral and crediting purposes; for example, mass produced FIP units can each and/or at some grouping-level be configured with different referral web-address(es), that each point to said website; and that can be related to different distributors, retailers, organizations, groups, people, etc.; and can be utilized for referral and credit tracking purposes, as depicted in current step; furthermore, referral web-addresses can also be serialized, to be placed on FIP(s) and distributed for use, as similarly depicted in FIG. 57.

FIG. 47, step 3c, upon end consumer 530 using a text enabled device, to send a text message 470T, containing referral code 470R', to SMS short code 470L, in order to access system 600 related service 900, system 600 would trigger a system 600 message 470K text-back; whereby remaining processes are similarly described in FIG. 47, step 3a. As an alternatively, FIP instructions 470D could additionally request consumer 530 to send specific information/data in place of or in addition to sent referral code 470R', for more advanced processing purposes. Optionally, instead of SMS address being of a type short-code, it instead could be long-code (or standard phone-id/number). Furthermore, a text message 470T could trigger an instant SMS billed service charge for any services provided. As yet another alternative, instead of initial sent text message 470T being only text based, it could instead be text, file and/or code based and/or variations thereof and/or combinations thereof. See FIG. 47, step-a, for additional, applicable alternative embodiments. Continue to Step 4.

FIG. 47, step 3d, if/when consumer 530 downloads (if not already downloaded) mobile application 470W (preferably networked with system 600) from a given network, accessing said application, a preferred application 470W embodiment would at some point request entry of a retailer 515 uniquely related referral code 470Y, where upon entry application 470W would make available retailer 515 linked/referred services 900, that ideally consumer 530 would access to assist in creating FIP(s) and/or setting FIP related services; whereby when services 900 have been utilized/set/activated, system 600 can create, maintain and/or utilize a consumer 530 to services 900 to retailer 515 referral association 1000. Continue to Step 4.

FIG. 47, step 4, consumer 530 upon setting and/or utilizing services 900 processes and/or services would then apply any system 600 generated/provided system-linked contact-element(s), as instructed and appropriate, onto an assumedly and separately obtained/purchased FIP (system linked, for information product) and/or SIP (standard information-product), in this case assumed to be a FIP type FIS (system linked, for information sign) and/or SIS (standard-information-sign), e.g. for-sale-sign, yard-sale-sign, garage-sale-sign, for-rent-sign, etc.; thus, in the case of FIP being a type SIS, by adding system-linked contact-element(s) it would be converted, by definition to a FIS. Continue to Step 5.

FIG. 47, step 5, consumer 530 upon completing SIP to FIP conversion process, preferably places FIP for public access/viewing, whereby viewers 510 can access FIP related services 900, but additionally system 600 can utilize stored referral association 1000 data to credit retailer 515 as well as optionally selected and applicable up-line distributors, for pre-designated services 900 use/activation/new-accounts referrals; whereas preferably for-pay services 900 related credit would be monetary with paid money amount being some percentage of services 900 (product purchase) related consumer 530 costs.

FIG. 47, FIP 700 provides a potentially advantage to organizations that display it, in the fact that the FIP can offer another potentially significant revenue source; whereby and preferably, some amount of credits/monies are paid to said organization for consumer referrals to services, items, products, advertising etc., as a result of being referred via/through FIP 700 advertised and referral linked system services.

In FIG. 47 Steps 3a and 3c, as an alternative to system 600 sending a text-message upon consumer initiated request, system 600 could instead, unlock and/or provide access to certain services; initiate system 600 callback calls to provide service related access/information; send automated text-messages containing application(s), picture(s), video(s), other file(s), link(s) to website(s), variations thereof, combinations thereof, etc.; and/or system 600 could auto set services and/or subscriptions that consumer could preferably access/set later; etc. Furthermore, FIP 700 instead of being a placard, could be, a sign; poster; a tear-away-page booklet, comprised of duplicated FIP 700 similar pages; a brochure, preferably with multiple brochures presented in a holder; information cards, preferably with multiple cards presented in a holder; and/or any applicable FIP as provided in the current application. In addition, FIP 700 could contain referral elements and mass produced for distribution and display in multiple locations, preferably retail and/or service based locations.

Figure 48:
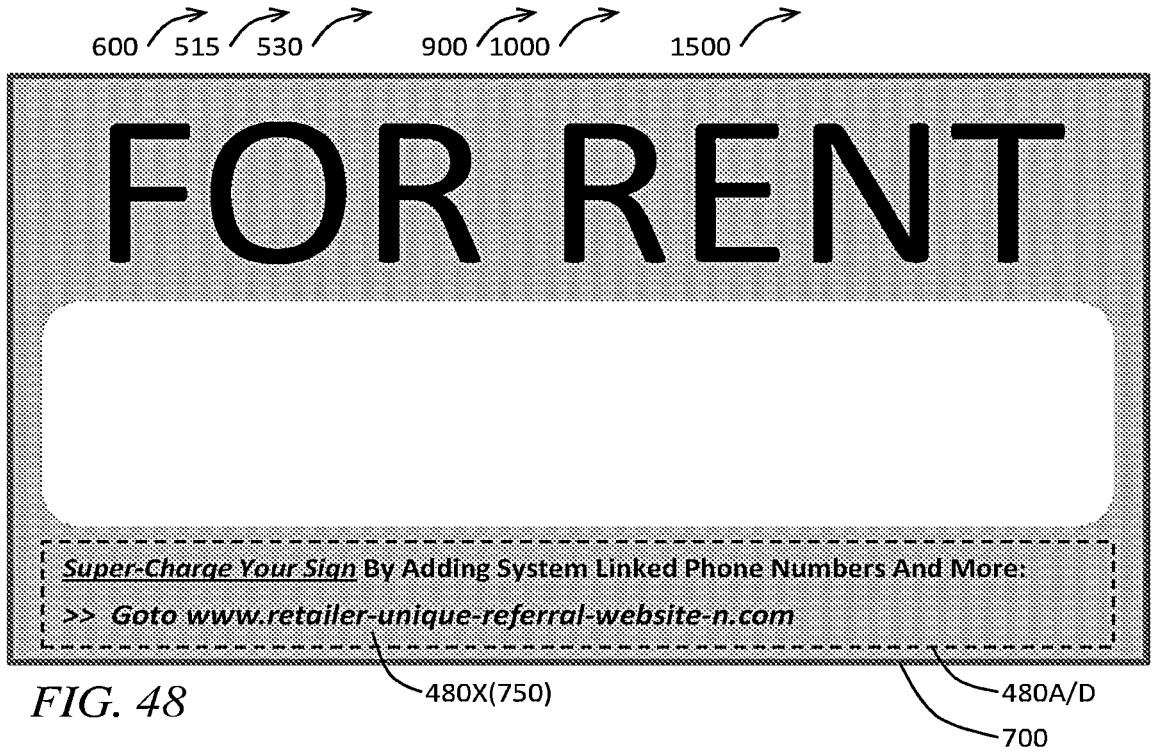
FIG. 48 shows the front and back view of a FIP, type for-rent-sign, configured with a contact-element(s) group that includes system referral elements.

FIG. 48 depicts retailer 515 referral web-address 480X related FIP 700 of a type for-rent-sign, configured with contact-element(s) group 480A, consisting only of instructions 480D, infused with referral elements 750; whereas FIP 700 is intended for display, by consumer 530, who would presumably use an internet access device to looks-up system 600 maintained and retailer 515 related referral web-address 480X, which points to services website 1500, a reference site to which system 600 navigates to upon a said lookup, and of which provides access to services 900, that would ideally allow consumer 530 to set FIP 700 related services and/or generate/provide pre-designated/applicable contact-element(s) information, intended for placement by consumer 530 onto FIP 700, preferably into the advertisement space shown; whereby when services 900 have been utilized/set/active, and using consumer 530 to retailer 515 related and looked-up referral web-address 480X data, system 600 can create, maintain and/or utilize a consumer 530 to services 900 to retailer 515 referral association 1000, an association preferably used for crediting purposes, similar to that described in FIG. 46-47.

Figure 49:
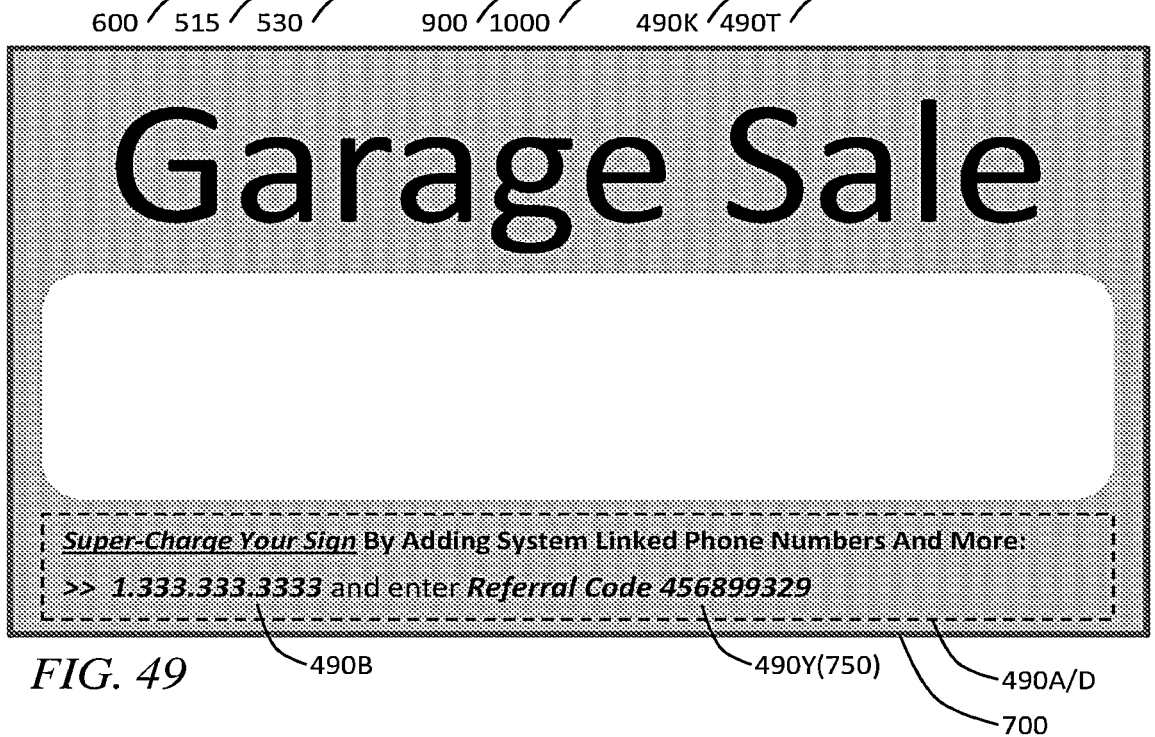
FIG. 49 shows the front and back view of a FIP, type garage-sale-sign, configured with a contact-element(s) group that includes system referral elements.

FIG. 49 depicts retailer 515 referral code 490Y related FIP 700 of a type garage-sale-sign, configured with contact-element(s) group 490A, consisting only of instructions 490D, infused with referral elements 750; whereas FIP 700 is intended for display, by consumer 530, who would call-to system 600 using phone number 490B, where they would be prompted to enter referral code 490Y, which in this case is uniquely related-to retailer 515, and where upon said entry being made makes services 900 related information 490K available, informing consumer 530 on how and preferably why to access system 600 maintained services 900, services that would assumedly allow consumer 530 to set FIP 700 related services and/or generate/provide pre-designated/applicable contact-element(s) information, intended for placement by consumer 530 onto FIP 700, preferably into the advertisement space shown; whereas information 490K is preferably made available in the form of a system 600 initiated text message 490T, and ideally sent to consumer 530 call-device or phone, from which initial call to system 600 was made; and where text information 490K contains retailer 515 related referral elements 750, which ideally would be entered into system 600 during the services 900 setup process at some future point when consumer 530, referring back to text message 490T provided information 490K, has access to a network accessible device; whereby system 600 using select referral elements 750 data, could then create, maintain and/or utilize a consumer 530 to services 900 to retailer 515 referral association 1000, an association preferably used for crediting purposes, similar to that described in FIG. 46-47. It should be noted, that the current FIP embodiment related and configured referral code 490Y, could be of a type serialized referral code, as depicted in FIG. 57.

Figure 50:
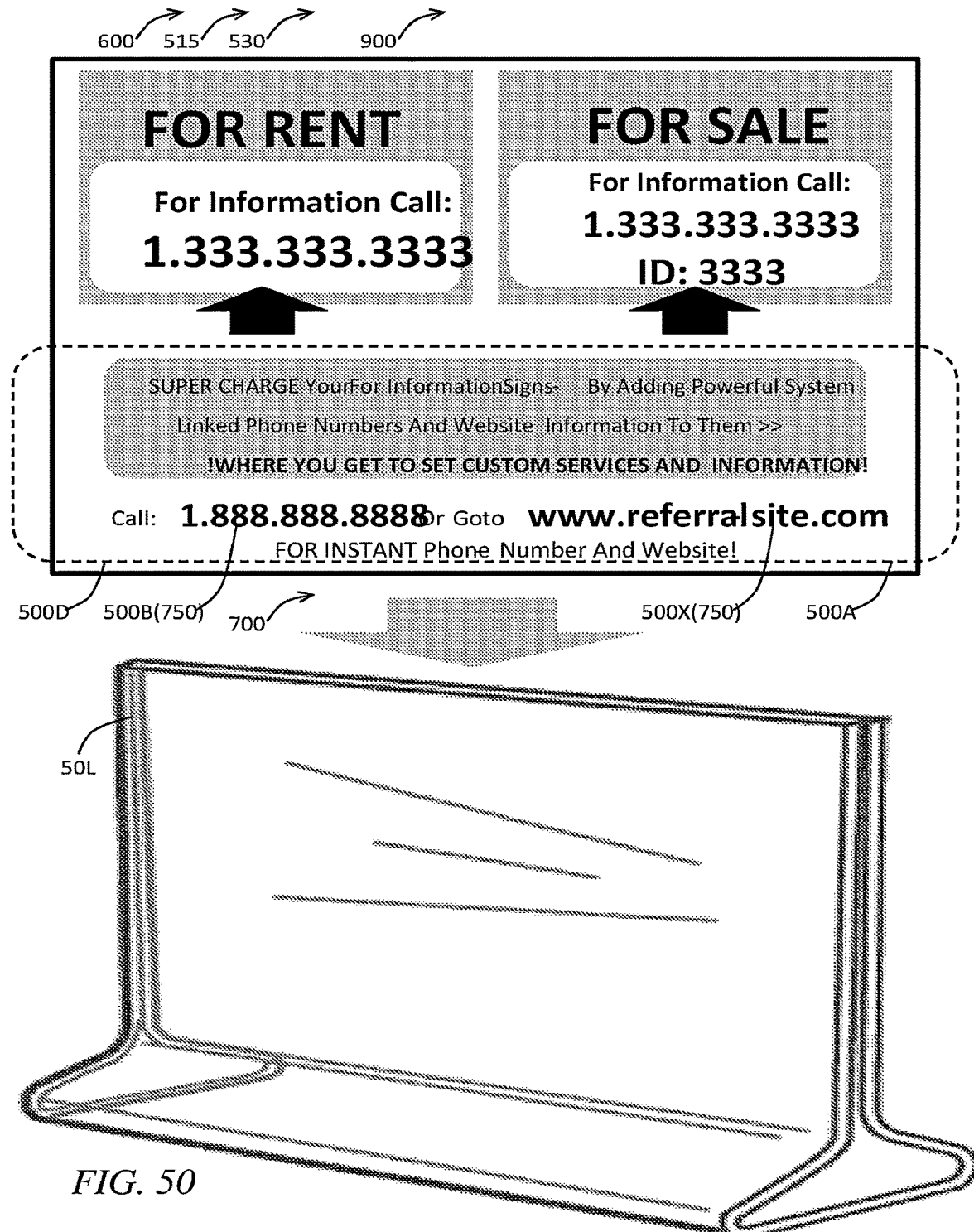
FIG. 50 shows a front view of a FIP of type display-insert, configured with a contact-element(s) group, including referral element information, being inserted into a plastic insert holder, assembled holder meant for in-location display.
Figure 71:
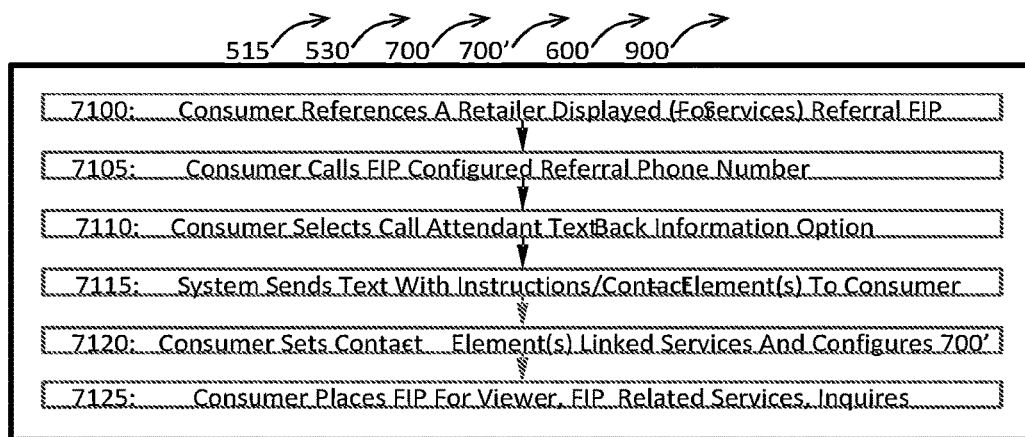
FIG. 71 depicts process steps as related to FIG. 50 FIP of type display with insert.

FIG. 50 shows a front view of a FIP 700 of type display-insert located in plastic holder, configured with contact-element(s) group 500A, including instruction 500D infused referral elements 750; whereas shown insert is intended for insertion into a plastic insert holder 50L, assembled holder or FIP 700 meant for retailer 515 in-store/location display; whereby consumer 530 can either call to system 600 using a call-device and referral phone number 500B to access preset services 900 and/or lookup referral web address 500X using an internet accessible device to access preset services 900 related website, either option making available custom phone-number and/or web-address related contact-element(s), that point to consumer 530 settable, call-attendant and web-services applications; and whereas optionally, referral elements 750 could be used for referral and credit tracking purposes for all referred and set/activated, preferably for-pay, services 900, similar to FIG. 46-47 referral tracking process. See FIG. 71 for steps detailing a preferred embodiment as related to current figure.

Figure 51A:
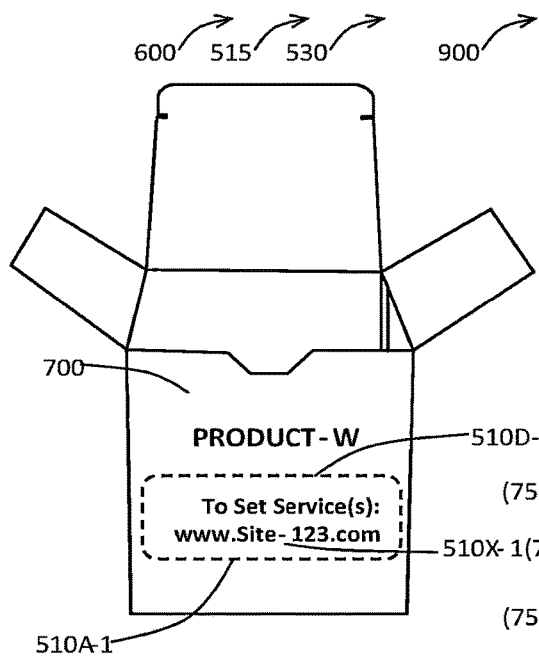
FIGS. 51A-D show several retailer available FIP product types, FIG. A being a box packaged product; FIG. B being a bottled food item; FIG. C being a poly-bag packaged product; FIG. D being any packaged product; whereby each product is configured with contact-element(s), including type referral elements.
Figure 51B:
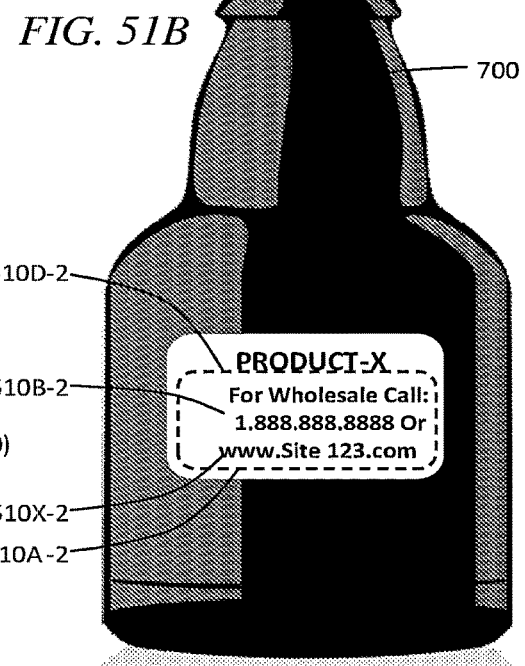
Figure 51C:
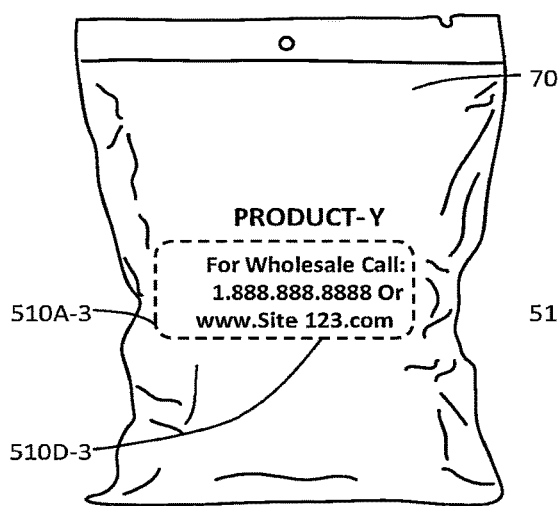
Figure 51D:
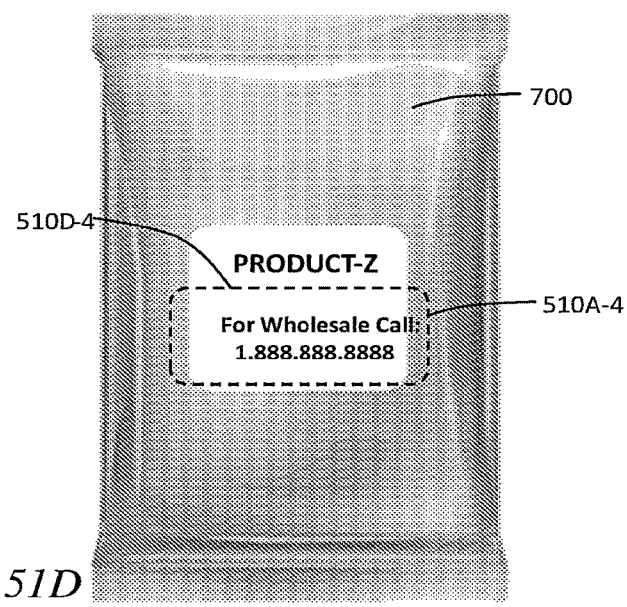

FIGS. 51A-D show several retailer 515 available FIP 700 product types, FIG. 51A being a FIP 700 of a type box packaged product, implied product requiring additional and separate services for use, services preferably being for-pay services; FIG. 51B being a FIP 700 of a type bottled product; FIG. 51C being a poly-bag packaged product; FIG. 51D represent any retail packaged product; whereby FIGS. 51B-D related product manufactures have the same and other products, including wholesale products available for purchase from other sources other than said and/or similar retailer 515, said sources preferably being direct from manufacture and/or manufacturer associated distributor(s) in the form of phone, online, mail, fax, SMS-text, email, etc., placed orders.

FIG. 51A depicted FIP 700 of a type packaged product is configured and/or supplied with manufacturing provided contact-element(s) group 510A-1 data, contact-element(s) including instruction 510D-1 infused referral elements 750; whereas FIP 700 is preferably intended for retail distribution; where preferably upon consumer 530 conducted FIP 700 purchase and/or upon reading set (for-pay) services 900 instructions, consumer 530 can access system 600 to set FIP 700 related services 900, in this case by looking-up referral web-address 500X using an internet accessible device to access services 900 related website; and whereas optionally, referral elements 750 could be used for referral and credit tracking purposes for all referred and set/activated, preferably for-pay, services 900, similar to FIG. 46-47 depicted tracking process.

FIG. 51B depicted FIP 700 of a type bottle product is configured and/or supplied with manufacturing provided contact-element(s) group 510A-2 data, contact-element(s) including instruction 510D-2 infused referral elements 750; whereas FIP 700 is preferably intended for retail distribution; and whereas preferably upon consumer 530 conducted FIP 700 purchase and/or upon reading instructions 510D-2, in this case 'how to purchase' wholesale product instructions, consumer 530 can either call to system 600 using a call-device and referral phone number 510B-2 to access product ordering related services 900 and/or lookup referral web address 500X-2 using an internet accessible device to access said services 900 related website and whereas optionally, referral elements 750 could be used for referral and credit tracking purposes for all referred services 900 initiated product orders, similar to FIG. 46-47 depicted tracking process.

FIG. 51C depicted FIP 700 of a type poly-bagged product is configured and/or supplied with manufacturing provided contact-element(s) group 510A-3 data, contact-element(s) including instruction 510D-3 infused referral elements 750; whereas FIP 700 is intended for retail distribution and optional after purchase product ordering via service 900 with orders preferably referral tracked as similarly discussed in FIG. 51B.

FIG. 51D depicted FIP 700 representing any retail packaged product is configured and/or supplied with manufacturing provided contact-element(s) group 510A-4 data, contact-element(s) including instruction 510D-4 infused referral elements 750; whereas FIP 700 is intended for retail distribution and optional after purchase product ordering via service 900 with orders preferably referral tracked as similarly discussed in FIG. 51B.

In FIG. 51, services 900 could instead provide information related to FIP 700; provide information about FIP 700 related manufacturer and/or distributors; set accounts related to FIP 700; initiate re-occurring orders of FIP 700 unit(s) and/or related product/services; process one time orders of FIP 700 unit(s) and/or related product/services; set events and other alerts associated with FIP 700; allow orders of other products as offered by FIP 700 manufacturer(s) and/or distributor(s); set services related to FIP 700; etc. Where preferably referral elements 750 of said FIP 700 related (for-pay) service 900 transactions would be used for referral/credit tracking purposes, similar to FIG. 46-47 depicted tracking process. Where still, manufacturer(s) and/or distributor(s) could also credit retailer 515 for consumer 530 product related services 900 referrals, including, advertisement services, product/service related account setups, product/services related alerts setups, etc.

In FIG. 51 packaged products could include, apparel, baby, bakery, book and entertainment, dairy, deli, plant, frozen food, grocery, health-care and beauty, home and garden, meat, office/stationery/photo, organic/natural, paper/plastic/foil, pet food and supply, produce, candy, non-dairy drink, cleaning, food disinfecting, seafood, seasonal/holiday, special service, tobacco products, food, food accessory, art, toy, media, electronics, automotive, home furnishing, equipment, tool, hardware, outdoor, appliances and/or any other package product type; whereby product is preferable made available for retail sale. Alternatively, some products may not be packaged but still be configured with and/or be supplied with contact-element(s) group information/data. Furthermore, packages could be retailer 515 (end-consumer distributor) private brand labeled or manufacture and/or distributor brand labeled.

Figure 70:
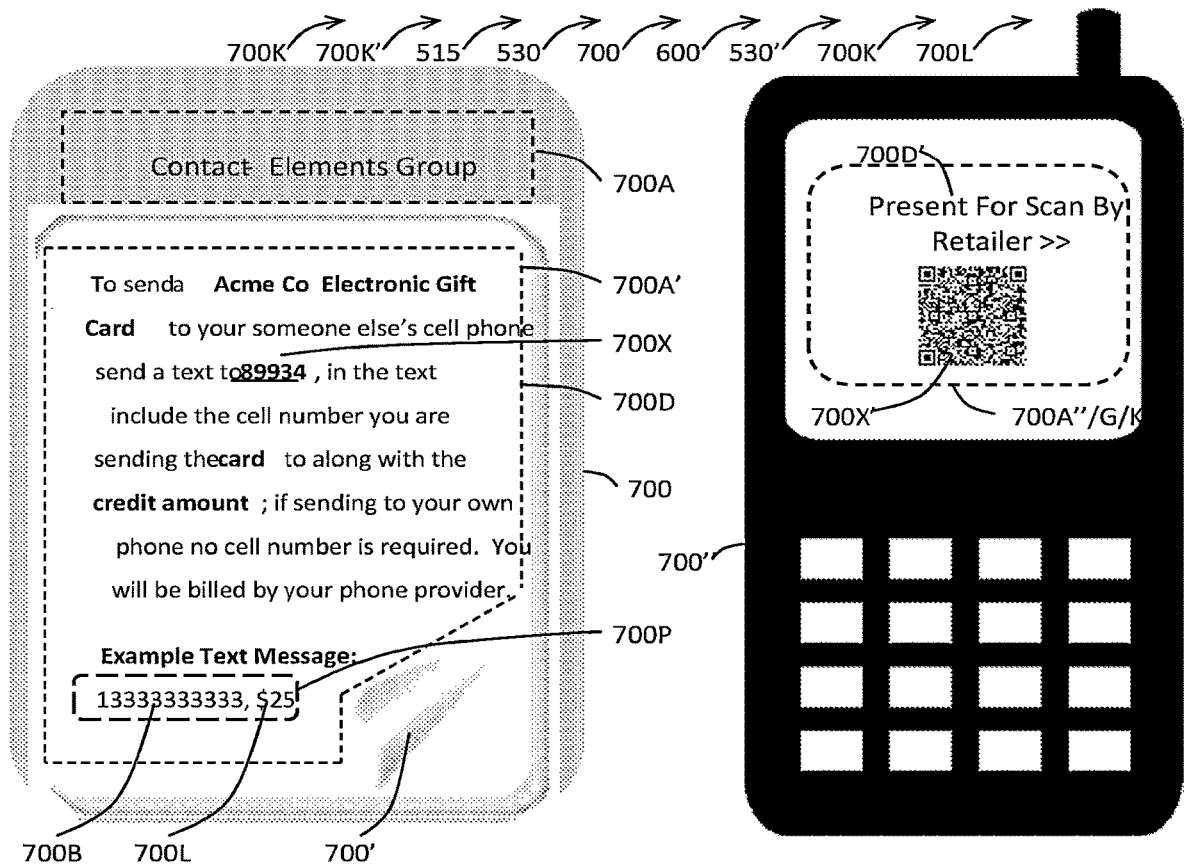
FIG. 70 depicts a FIP of type PDA (mobile phone), displaying contact-element(s) group alternative-54 on PDA screen.

FIP configured contact-element(s) group data can also be made available in an electronic format such as: website advertised media; in the form of translated text-to-speech, made available via call-system/audio applications (as depicted in FIG. 52); via mobile applications, making FIP available on a PDA or similar device screen (as depicted in FIG. 70); in the body-of and/or attached-to a SMS text-message (as depicted in FIG. 55); in the body-of or attached as a file to an email; on a faxed document; on mailed media; and/or variations thereof; and/or variations thereof; etc.

An FIP in addition to being any applicable product, object, item, etc. that is configured with and/or supplied with contact-element(s) group data, can also include devices like radios, PDAs, monitors, televisions, computers, laptops, etc., considered a FIP when broadcasting or display contacts-elements group data (as depicted in FIG. 53).

FIG. 52A depicts a flowchart for a broadcast commercial/advertisement as received by FIP 700 (of a type radio); whereas the radio is defined as an FIP because it is making available said broadcast translated contact-element information and wherein, step 5200, a made for radio script including said contact-element(s) is developed; step 5210 said script is used to make a made for radio audio-file, such as a radio commercial; in step 5220, the commercial is broadcast to be received and translated by FIP 700 (radio); in step 5230, any given commercial listener 537, preferably using a call-device, could then place a call-to system 600 using broadcasted phone number 520B in order to access system services (a process similarly depicted in FIG. 54B) and/or look-up referral web-address 520X to access system services; in step 5245, referral element 750 data can be used for referral and credit tracking purposes, similar to FIG. 47; in step 5250, said commercial could be re-aired. Alternatively, to said commercial being aired via broadcast radio it instead could be broadcast via internet radio, satellite radio, etc.

FIG. 52B commercial script depicts/describes a unique and useful process, a process by which a listener 537 can call phone number 520B and in doing so have instantly set a customizable call-system; wherein a preferred embodiment the listener 537 call to system 600 action, instantly (default) sets said custom call-system complete with listener 537 settable account settings and instantly makes available said call-system linked call-address related contact-element(s), with said call-address elements and call-system account settings information preferably made available in the form of a system 600 sent text message similar to the process depicted in FIG. 55E but different in that the system-linked phone number and lookup-id (or extension as described FIG. 52B) would point to said (default) set call-system and where pin (or password) would allow initial access to said settable call-system related account settings. To further clarify, said call-system is a system service of a type call-attendant application, one where callers to said call-application are greeted by a call-attendant, which makes available pre-defined call related options, e.g. connect calls to preset extension(s)/phone-numbers options, leave message options, provide information options, etc.; and where said call-system account settings can be accessed to custom set said call-attendant function/prompts/options/etc.; preferably additional said call-system linked (direct-access) phone/call ids/address/numbers related contact elements can be set via said account settings. In an alternative embodiment, instead of said listener 537 call action initiating said call-system setup process, system 600 could instead allow listener 537 to initiate/request said call-system setup process at some point during said initial system 600 call session. Instantly setting/activating a call-system (services) as previously described is a major advantage in that, listener 537 (or user) upon placing a call to system 600 in response to an (aired/televised) advertisement, instantly receives a newly activated (default set) call-system, complete with account settings access information and/or system linked call-address related contact elements, all of which listener 537 can immediately start using/evaluating; as opposed to listener 537 having to memorize advertisement related information, until such time they can access a networked computing device to then lookup and set said advertised services. Alternatively, said listener 537 system provided and linked phone-number with extension could be optionally provided; furthermore said instantly set call-system could instead be any other instantly set service and/or system-response, e.g. customizable website (with instructions sent on how to access said website settings), data generation (with instructions sent on how to access said generated data), auto-set web-services (with instructions sent on how to access said service settings), product/service purchases (with instructions sent on how to complete any outstanding order requirements), etc.; furthermore still, said commercial advertisement could include a referral web-address where listener 537 could also activate said call-system (services), similar to FIG. 52C website activation processes. The preferred embodiment as described makes available a 1-step process by which, via a system placed phone call, a service (more specifically a call-system service) can instantly be set/activated/functioning; and more generally FIG. 52 makes available a process by which system services/responses can be instantly set/activated via a (phone) call action/session.

FIG. 52C shows a commercial script similar to that depicted in FIG. 52B but different in that listener 537 is also presented with the option to set/activate said call-system via a website located at referral web-address 520X; and like FIG. 52B upon listener 537 looking up said advertised referral web-address 520X, system 600 could auto (default) set and activate said call-system (including account settings access information), again allowing for an instant 1-step web-service activation, where the said look-up action (default) sets an active (ready for use) service and/or initiates some system response.

In FIG. 52B-C advertised phone and web addresses could instead not be referral elements but instead a general phone and web addresses; furthermore, a referral/reference code/id could be included in said advertisement(s), said code intended for entry when upon first accessing said advertised phone and/or web address related site, said code preferably used for referral and credit tracking purposes.

Figure 53A:
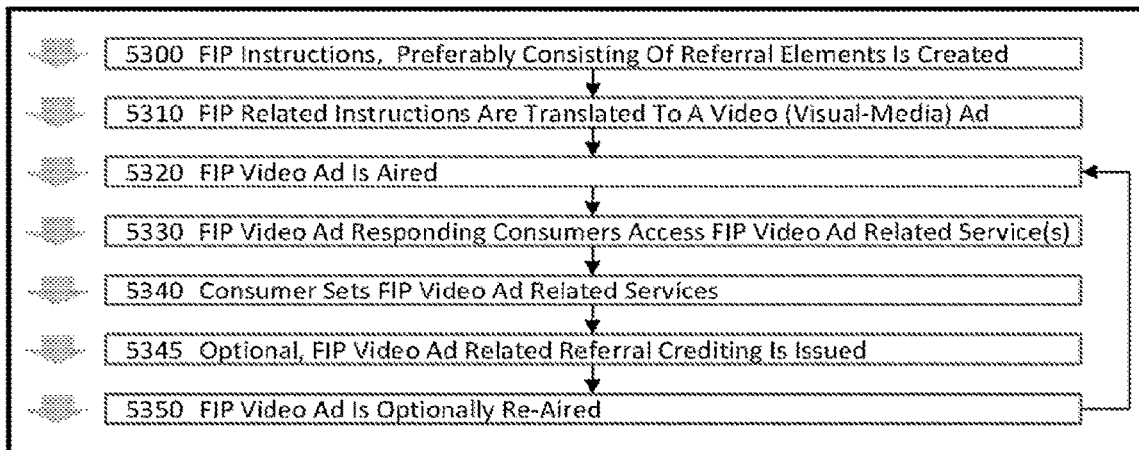
FIG. 53A depicts a flowchart for a televised FIP of a type television, related process.

FIG. 53A depicts a process similar to that described in FIG. 52A but different in that said advertisement is televised as opposed to radio broadcasted and FIP 700 is a television as opposed to a radio. In step 5300, a made for TV script including said contact-element(s) is developed; step 5310 said script is used to make a made for TV media-file, such as a TV commercial; in step 5320, the commercial is televised to be received and translated by FIP 700 (TV); in step 5330, any given commercial viewer 538, preferably using a call-device, could then place a call-to system 600 using televised phone number 530B in order to access system services (a process similarly depicted in FIG. 54B) and/or look-up referral web-address 530X (a process similarly depicted in FIG. 56) to access system services; in step 5345, referral element 750 data can be used for referral and credit tracking purposes, similar to FIG. 47; in step 5350, said commercial could be re-televises. Alternatively, to said commercial being aired via TV broadcast it instead could be broadcast via web, mobile-web, closed circuit monitor/television, etc.

Figure 53B:
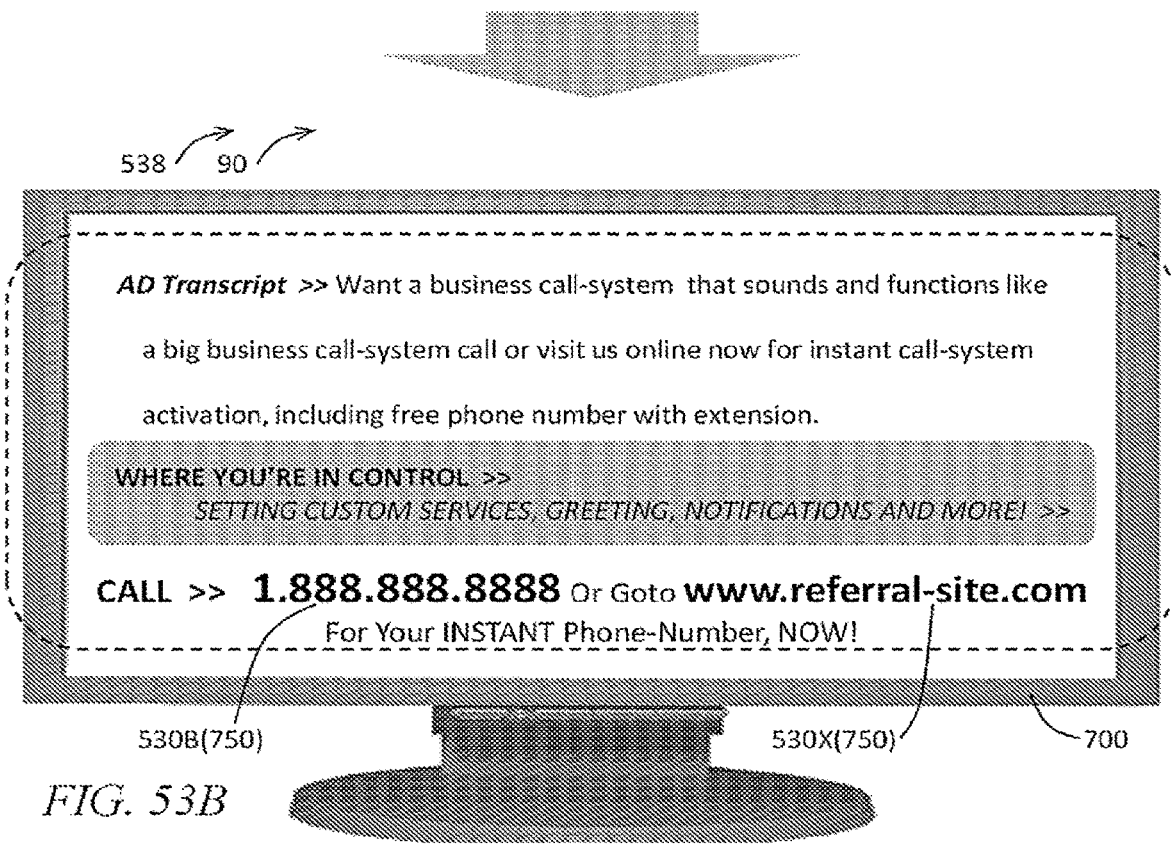
FIG. 53B depicts a snapshot of televised FIP of a type television.

FIG. 53B depicts a TV monitor on which said commercial, including referral phone number 530B and referral web address 530X, is being televised; and where said processes are similar to those depicted in FIG. 52C.

FIG. 54A-C depict (3) sample voice-prompts similar to those that might be heard by a viewer/consumer/user who calls to access system 600 related call-services. In FIG. 54A the introduction prompt asks caller to enter a referral-id in order to initiate a system response, in this case a response in the form of a sent instructional text message back to said caller's phone/call device; wherein so doing an optional conformation prompt would be played. In FIG. 54B, in a preferred embodiment it is assumed that the calling action itself initiated a system sent text message to said caller's phone/call device, where an introduction prompt optionally notifies said caller that a text message was sent; in an alternative embodiment the caller would be prompted before the system would initiate send of said informational text message, similar to FIG. 54A. In FIG. 54C the introduction prompt asks caller to enter a referral-code in order to receive product and/or service information, information that in this case is sent as an instructional text message back to said caller's phone/call device; wherein so doing an optional conformation prompt would be played. As an alternative or in addition to said system sending a text message, any number of other predefined system responses, some as described in the current application, could be triggered and/or initiated. Although FIG. 54 figures only show prompt options as related to requesting informational text-messages it should be understood that other call-system related requests/options, some as mentioned in the current application, could also be made available; furthermore call-system provided information could instruct caller on where/how/why/etc. to access system services, said call-system announced information could further include contact-element(s) information, e.g. access website(s), id(s), pin(s), etc., similar to those shown in FIG. 55. In the case where the call itself triggers the system response(s), it should be noted that this is a 1-step process with the advantage of saving time while minimizing caller to call-system interactions, interactions that can be frustrating to callers.

FIG. 55A-55H depict examples of system-services sent text information, as referenced in FIG. 59; whereby said text message data as related to current figure include at least one contact-element, and more specifically at least one contact element of a type referral-element. Alternative to said information being presented in the form of a text message the information could instead be presented in via an application, website, email, fax, letter, voice message, text-to-speech translated data, etc.; furthermore said information could be presented by/via call-systems, web-systems, fax-systems, email-systems, mail-services, etc.

Figure 56:
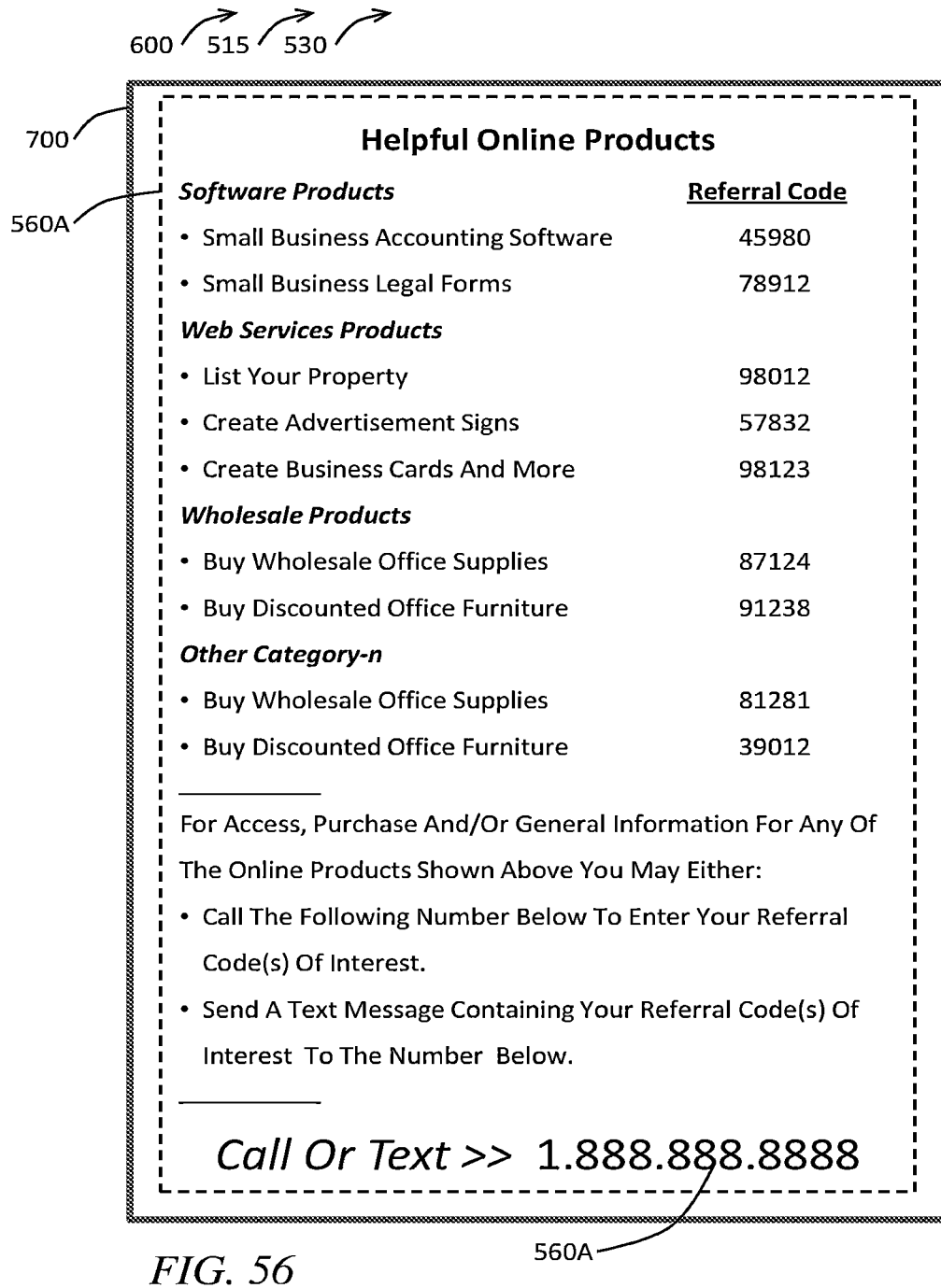
FIG. 56 depicts an FIP of a type service/products referral sign, a sign primarily intended for display in retail/service organization locations.

FIG. 56 shows a FIP 700 (of a type sign, preferably mass manufactured and intended for placement into retail/service oriented customer centers/locations) configured with contact-element(s) group 560A. FIP 700 and related processes can provide an alternative revenue source for the service/product provider 515 in the form of (monetary) credit for every consumer 530 who purchases an online product/service through a FIP 700 related referral. In a preferred embodiment the referral codes are preferably unique at a provider 515 level, so as to allow for provider level referral/credit tracking processes, a process similarly depicted in FIG. 47; and involves a process where a consumer 530, referring to FIP 700, would submit referral codes, as related to product(s)/service(s) of interest, to system 600 for processing; whereas and preferably said consumer 530 submittal would either be sent via text message and/or via a placed call to a system 600 related call-application; wherein the case of a text message being sent, consumer 530 would select at least one service/product related referral code and text send code to system linked phone number 560B for system 600 processing; and wherein the case of a submittal via a call being placed, consumer 530, using a call device, would place a call to phone number 560B and when prompted (a prompt similarly depicted in FIG. 54C) would enter at least one service/product related referral code to system 600 for processing; whereupon said referral code processing, system 600 would send instructional information, preferably to consumer 530, and more specifically to consumer 530 call (smart phone) device, and more specifically still to consumer 530 call device in the form of a text-message, a similar process depicted in FIG. 55.

As related to FIG. 56, said FIP could be configured with information located on each side; said FIP related SKU could include mounting hardware, displays, other parts, etc., for use in mounting for display said FIP; said FIP configured phone number 560B could instead be a referral phone number, a number unique to the provider level and optionally used for referral/credit tracking purposes; said FIP configured referral codes could alternatively be only reference codes, not used for referral tracking processes; said FIP referral elements could be used for referral/credit tracking at any defined (sub) group level; said FIP configured referral related product(s)/service(s)/instruction(s) are not limited in number, type, arrangement, location, naming conventions, etc. Furthermore, data-exchange method(s) from consumer 530 to system 600 and/or vice-versa can vary, including data-exchange methods as mentioned in the current application. Also, additional information/data besides said referral code could be requested and/or required for send/submittal to system 600 for processing, additional data alternatives as mentioned in the current application. Furthermore still, there could be more than one data (or request for data) exchange between system 600 and consumer 530 and/or vice-versa. In another alternative, the product/service information sent by system 600 to consumer 530 could include any one of and/or combination of, instructions, code(s), fax number(s), email address(es), web address(es), contact name(s), account(s), phone number(s) (with or without extensions), contact information, any contact element, file(s) etc., all data that could be used to obtain/purchase services/products, initiate system responses, etc. Yet another alternative includes a process by which a picture of said FIP could be taken and submitted to system 600 for processing, a process similar to those described in FIGS. 66-68, 76-80, and/or a process which upon completion of said picture processing occurring would then allow consumer 530, preferably via an application loaded on said call-device, to then select the service(s)/product(s) of interest, whereupon making a selection consumer 530 could preferably then retrieve related data, information, services, account signup options, mailing list sign-up options, membership options, purchasing options, etc. From a manufacturing perspective referral elements could be tracked as similarly depicted in FIG. 57 for distribution related crediting/tracking purposes, the signs (FIPs) could be mass manufactured then distributed/tracked/related-to various distributors, retailers and/or service-providers, etc.

FIG. 57 depicts a flowchart showing a preferred FIP distribution embodiment, detailing a preferred referral and credit tracking process/system:

FIG. 57, Step 570-1: Manufacture or L0_distributor 570C manufactures a predetermined number of FIP 700 units, assumedly each unit uniquely configured with a serialized referral code 570A. Next, L0_distributor 570C would now either make some or all of said manufactured FIP 700 units available, preferably for sale, to end consumer(s) 530, for FIP 700 setup and activation, similar to that depicted in FIG. 46-48; and/or build a new L0_bundle 570B by bundling together a predetermined number of referral code sequenced FIP 700 units, pulling from said manufactured FIP 700 units. Next, L0_bundle 570B related L0_bundle-info 570J is entered to system 600; whereas L0_bundle-info 570J preferably includes, L0_bundle 570B related and sequentially serialized FIP referral code L0_data-range 570X data, i.e. if the serialized referral code configured on the first counted FIP unit was 5000 and the last 8000 then L0_data-range 570X would be 5000 to 8000; and L0_distributor 570C, referral-tracking pertinent and related, L0_distributor-info 570Y, e.g. contact information, banking information, etc.; and FIP 700 descriptive data, including FIP descriptions, FIP types, manufacturing information, shipping information, etc. Next, a system 600 generated barcode L0_label 570L would be preferably applied to L0_bundle 570B for quick-scan, inventorying and referral/credit tracking purposes, L0_lable 570L barcode data being related to system 600 maintained L0_bundle-info 570J data. Next, L0_bundle 570B would be stored for future distribution and/or sent to a down-line distributor.

FIG. 57, Step 570-2: L1_distributor 570C' would receive and preferably verify L0_bundle 570B against system 600 stored L0_bundle-info 570J; whereby either rejecting a bad bundle, rejecting bad bundle related FIP units, receiving to inventory a good bundle, receiving to inventory good bundle related FIP units and/or a combination and/or variation thereof; whereas verified bundle related information would preferably be entered to and tracked by system 600, including data obtained by scanning bundle configured barcode L0_label 570L and/or any affected FIP 700 unit(s) configured serialize referral code 570A data; whereby, good L0-bundle 570B content would be received to L1_distributor 570C' inventory and bad bundle content would preferably be rejected, assumedly for reprocessing and/or disposal; and whereas, said captured bundle verification data could then be used to create a L0_distributor570C to L1_distributor570C' distribution link, preferably used for credit and referral tracking purposes.

FIG. 57, Step 570-3: L1_distributor 570C' would now either make some or all L0_bundle 570B related FIP 700 units available, preferably for sale, to end consumer(s) 530, for FIP 700 setup and activation, similar to that depicted in FIG. 46-48; and/or build a new L1_bundle 570B' by bundling together a predetermined number of referral code sequenced FIP 700 units, pulling from L0_bundle 570B. Next, L1_bundle 570B' related L1_bundle-info 570J' would be preferably entered to system 600; whereas L1_bundle-info 570J' preferably includes, L1_bundle 570B' related and sequentially serialized FIP referral code L1_data-range 570X' data; and L1_distributor 570C', referral-tracking pertinent and related, L1_distributor-Info 570Y'; and FIP 700 descriptive data. Next, a system 600 generated barcode L1_label 570L' would be preferably applied to L1_bundle 570B' for quick-scan, inventorying and referral/credit tracking purposes, L1_lable 570L' barcode data being related to system 600 stored L1_bundle-info 570J' data. Next, L1_bundle 570B' would be stored for future distribution and/or sent to a down-line distributor.

FIG. 57, Step 570-4: Ln_distributor 570C'' would receive and preferably verify L1_bundle 570B' against system 600 stored L1_bundle-info 570J'; whereby either rejecting a bad bundle, rejecting bad bundle related FIP units, receiving to inventory a good bundle, receiving to inventory good bundle related FIP units and/or a combination and/or variation thereof; whereas verified bundle related information would preferably be entered to and tracked by system 600, including data obtained by scanning bundle configured barcode L1_label 570L' and/or any affected FIP 700 unit(s) configured serialize referral code 570A data; whereby, good L1-bundle 570B' content would be received to Ln_distributor 570C'' inventory and bad bundle content would preferably be rejected, assumedly for reprocessing and/or disposal; and whereas, said captured bundle verification data could then be used to create L1_distributor 570C' to Ln_distributor570C'' distribution link, preferably used for credit and referral tracking purposes.

FIG. 57, Step 570-5: Ln_distributor 570C'' would now either make some or all L1_bundle 570B' related FIP 700 units available, preferably for sale, to end consumer(s) 530, for FIP 700 setup and activation, similar to that depicted in FIG. 46-48; and/or build a new Ln_bundle 570B'' by bundling together a predetermined number of referral code sequenced FIP 700 units, pulling from L1_bundle 570B'. Next, Ln_bundle 570B'' related Ln_bundle-info 570J'' would be preferably entered to system 600; whereas Ln_bundle-info 570J'' preferably includes, Ln_bundle 570B'' related and sequentially serialized FIP referral code Ln_data-range 570X'' data; and Ln_distributor 570C'', referral-tracking pertinent and related, Ln_distributor-Info 570Y''; and FIP 700 descriptive data. Next, a system 600 generated barcode Ln_label 570L'' would be preferably applied to Ln_bundle 570B'' for quick-scan, inventorying and referral/credit tracking purposes, Ln_lable 570L'' barcode data being related to system 600 stored Ln_bundle-info 570J'' data. Next, Ln_bundle 570B'' would be stored for future distribution and/or sent to a down-line distributor.

In FIG. 57, Steps 570-3 to 570-5 can be repeated for as many down line distributors as required. Steps 570-1 to 570-5 can be repeated for any number of distributor(s) and/or distributor down-line(s), distributing any number of FIP bundles, containing any FIP type, each preferably configured with unique serialized referral code.

In FIG. 57, since down-line distributor bundle inventory is always pulled from up-line available bundle inventory, with exception to manufacturer or top-level distributor, crediting referral tracking for crediting purposed is simple maintained. When an end consumer 530 sets FIP 700 related services 900, as similarly depicted in FIGS. 46-48, said set services can be up-line distributor related, preferably using system 600 resources, to utilize distributor bundle-info data, most importantly sequential data-range information, to determine which distributor up-line available bundle inventory said FIP 700 was distributed through, this information along related distributor-info data defines said FIP 700 distributor up-line. Optionally, for-pay services 900 credit could be applied to some or all of said up-line distributors, preferably said credit being monetary with money paid being some percentage of services 900 related consumer 530 costs.

In FIG. 57, alternative to barcode-label being placed onto bundle for tracking purposes, instead data-range placed, where once entered to system 600 could be combined with previously stored distributor-info to create FIP up-line distributor relationship for tracking and crediting purposes. Also, instead of a referral tracking barcode-label containing barcode data being applied to bundle, said barcode and/or similar data, with or without human readable information, can be directly configured onto bundle. Still, any barcode equivalent code could instead be used. More still, any code could be system linked to distributor info and configured directly on/with bundle, preferably for referral and credit tracking purposes. Furthermore, depending on predetermined conditions, system 600 could make available all or any predefined subset of bundle-info made available to any given distributor, third parties and/or third party systems. Bundle-info can vary in content, content-type, etc. Even more generally, all or any predefined subset of system 600 maintained distribution activities and/or processes can be shared with any given distributor, third parties and/or third party systems. Still yet, serialized FIP referral code(s) could instead be unique codes, preferably maintained by system 600 for organization, FIP-tracking, distribution tracking, etc.; whereby in this alternative and due to the large number of individually tracked FIP units, it would also be preferred that system 600 automatically (or in combination with limited manual interaction) manufacture, bundle, label and/or track the individual FIP referral codes as related to current-level distributors. Also alternatively, FIP bundles could contain other FIP bundles.

In FIG. 57, alternatively the following areas could vary, distribution steps, referral tracking procedures; referral logging procedures (including who or which organization logs FIP bundle/distributor information); referral information to systems entry procedures (including automated and/or manual systems); referral tracking systems and procedures (including automated and/or manual systems); FIP bundle counts; referral tracking information and/or data; FIP bundle label information; distributed FIP types; distribution processes; distribution payment methods; distributor crediting processes; distributor(s) credited; credit types, monetary payment types (e.g. onetime payment, reoccurring payment, delayed payments, etc.; referral tracking procedures in general. As a general alternative, when information such as a referral id is sent to system 600 for processing other information such as, payment, appointment, file data, data etc. could also be sent, preferable used for advanced system-services processing purposes. Furthermore, auto-billing could be initiated upon a consumer 530 data send to system 600 with billing information already available to system 600 an/or sent to the consumer call-device provider from with said data sent occurred.

FIGS. 58-68 depict several FIG. 1 contact-element(s) group alternatives, each containing at least one instructions infused referral element 750. As related to each figure, it can be assumed that consumer 530 has already acquired or will acquire a FIP or SIP, unto which any system 600 additionally provided contact-element(s) assumedly would be placed. To reiterate, a SIP or standard information product, is a product that is not configured with and/or supplied with system 600 linked contact-element(s) group data; whereas a FIP or for information product, is a product that is configured with and/or supplied with system 600 linked contact-element(s) group data; thus an SIP is converted in definition to a FIP when system linked contact-element(s) are configured to and/or supplied with a previously defined SIP. Also, the figured related referral elements 750 depicted in these figures would ideally be used for referral and crediting processes, similar to FIG. 46-47, 57 depicted crediting processes. Furthermore, alternatively or in addition to any system 600 generated contact-element(s) being intended for placement onto a FIP and/or SIP, they could be used for televised or broadcast FIP purposes, similar to FIGS. 52-53.

FIG. 58A shows contact-element(s) group 580A-1 alternative-29, instructing consumer 530 to lookup referral web address 580X-8 (using a web enable device), which upon doing, said device navigates to present said address linked website that allows access to services 900; whereat at least one system 600 linked unique phone-number 580-B1 and/or unique web address 580E-1 is generated/provided; whereas web address 580E-1 preferably/initially points to a system 600 created and unique services website, preferably including access to a related services-account that is consumer 530 settable and/or changeable, allowing for modifications to said and optionally public services website; and whereas phone number 580B-1 points to a system 600 created and unique IVR call application service, including access to a related services-account, preferably consumer 530 settable and/or changeable, allowing for modifications to said and optionally public IVR call application service; and whereas phone number 580B-1 and/or web address 580E-1 can be preferably placed onto applicable FIP(s)/SIP(s); whereby FIP viewers can either call-to system 600 using phone number 580B-1 to access consumer 530 previously set IVR call application services account data, or viewers can lookup web-address 580E-1, navigating consumer 530 previously set unique services website. In a preferred embodiment, upon web address 580E-1 and phone number 580B-1 initial activation, said website and/or IVR application service-account(s) would be default set, making related IVR application and/or services website active and immediately available said FIP inquiring viewers. In another embodiment consumer 530 would be allowed to modify said IVR application service related services-account via said services website related services-account.

FIG. 58B shows contact-element(s) group 580A-2 alternative-30, instructing consumer 530 to lookup referral web address 580X-2 (using a web enable device), which upon doing, said device navigates to present said address linked website that allows access to services 900; whereat at least one system 600 linked unique phone-number 580B-2 is generated/provided, pointing to a system 600 created and unique IVR call application service, including access to a related services-account, preferably consumer 530 settable and/or changeable, allowing for modifications to said and optionally public IVR call application service; whereas phone number 580B-2 can be preferably placed onto applicable FIP(s)/SIP(s); whereby FIP viewers can call-to system 600 using phone number 580B-3, can access consumer 530 previously set IVR call application services account data. In a preferred embodiment, upon phone number 580B-2 initial activation, related services-account would be default set, making related IVR applications service active and immediately available to said FIP inquiring viewers. In another embodiment consumer 530 would be allowed to modify said IVR application service related services-account via said services website related services-account.

FIG. 58C shows contact-element(s) group 580A-3 alternative-31, instructing consumer 530 to lookup referral web address 580X-3 (using a web enable device), which upon doing, said device navigates to present said address linked website that upon entry of referral code 580Y-3 when prompted, allows access to services 900; whereat at least one system 600 linked unique phone-number 580B-3 with related lookup ID 580R-3 is generated/provided, combined pointing to a system 600 created and unique IVR call application service, including access to a related services-account, preferably consumer 530 settable and/or changeable, allowing for modifications to said and optionally public IVR call application service; whereas phone number 580B-3 and/or lookup ID 580R-3 can be preferably placed onto applicable FIP(s)/SIP(s); whereby FIP viewers can call-to system 600 using phone number 580B-3, when prompted entering lookup ID 580R-3, to access consumer 530 previously set IVR call application services account data. In a preferred embodiment, upon phone number 580B-3 and lookup ID 580R-3 initial activation, related services-account would be default set, making related IVR applications service active and immediately available to said FIP inquiring viewers. In another embodiment consumer 530 would be allowed to modify said IVR application service related services-account via said services website related services-account.

FIG. 58D shows contact-element(s) group 580A-4 alternative-32, instructing consumer 530 to lookup referral web address 580X-4 (using a web enable device), which upon doing, said device navigates to present said address linked website that allows access to services 900; whereat at least one unique web address 580E-4 is generated/provided, initially pointing to a system 600 created and unique services website, preferably including access to a related services-account that is consumer 530 settable and/or changeable, allowing for modifications to said and optionally public services website; whereas web address 580E-4 can be preferably placed onto applicable FIP(s)/SIP(s); whereby FIP viewers can lookup web-address 580E-4, navigating to consumer 530 previously set unique services website. In a preferred embodiment, upon web address 580E-4 initial activation, related services-account would be default set, making related services website active and immediately available to said FIP inquiring viewers.

FIG. 58E shows contact-element(s) group 580A-5 alternative-33, instructing consumer 530 to lookup referral web address 580X-5 (using a web enable device), which upon doing, said device navigates to present said address linked website that allows access to services 900; whereat at least one unique contact-element is generated/provided, initially relating to system 600 system-service(s), preferably including access to a related services-account that is consumer 530 settable and/or changeable; whereas applicable contact-element(s) can be preferably placed onto applicable FIP(s)/SIP(s); whereby FIP viewers can reference said contact-element(s) to preferably access consumer 530 previously set and said system-service(s). In a preferred embodiment, upon said contact-element(s) initial activation, related services-account would be default set, making related system-services active and immediately available to said FIP inquiring viewers. Alternatively, referral web-address 580X-5 could also be classified as a serialized referral web-address, with serialization preferably occurring in said referral web-address numeric data-string; furthermore, a serialized referral web-address could instead be used in place of FIG. 57 depicted serialized referral code 570A.

FIG. 58F shows contact-element(s) group 580A-7 alternative-34, instructing consumer 530 to lookup referral web address 580X-7 (using a web enable device), which upon doing, said device navigates to present said address linked website that upon entry of referral code 580Y-7 when prompted, allows access to services 900; whereat at least one unique contact-element is generated/provided, initially relating to system 600 system-service(s), preferably including access to a related services-account that is consumer 530 settable and/or changeable; whereas applicable contact-element(s) can be preferably placed onto applicable FIP(s)/SIP(s); whereby FIP viewers can reference said contact-element(s) to preferably access consumer 530 previously set and said system-service(s). In a preferred embodiment, upon said contact-element(s) initial activation, related services-account would be default set, making related system-services active and immediately available to said FIP inquiring viewers. It is noted, that web-address 580X-7 and referral code 580Y-7 allow for referral tracking down to 2-levels, i.e. referral web-address 580X-7 could relate to a retailer 515 organization and referral code 580Y-7 could relate to some specified division of said organization, division ideally being one of several stores/locations.

FIG. 58G shows contact-element(s) group 580A-8 alternative-35, instructing consumer 530 to lookup referral web address 580X-8 (using a web enable device), which upon doing, said device navigates to present a related services 900 access website; or in a preferred embodiment-1, and upon first navigating to services 900 the related services-account would be auto/default set, making predefined services 900 active and immediately available. In another similar embodiment-2, a referral code, similar to that depicted in FIG. 58C, could be provided, for entry to said web-address 580X-8 related and said website, to gain access to services 900 (also establishing a referral line); whereby optionally and upon said referral code entry predefined services 900 would be activated and made immediately available. Services 900 are not limited and can include any applicable alternatives as discussed in the current application.

FIG. 59A, shows contact-element(s) group 590A-1 alternative-36, instructing consumer 530 to call referral phone number 590X-1 (using a call capable device), which upon doing, consumer 530 would be connected to system 600 (IVR script similar to FIG. 54B), allowing for an option to initiate a system 600 text-back message, preferably back to said call-device using previously stored and related caller-id data. In a preferred embodiment-1, said text-back message preferably contains instructions (similar to that shown in FIG. 55B) and a referral web-address (as similarly described in FIG. 58A). In a preferred embodiment-2, said text-back message preferably contains instructions (similar to that shown in FIG. 55C); and at least one services 900 linked unique phone-number and/or unique web-address (as similarly, described in FIG. 58A and shown in FIG. 55C); and a referral web-address (as similarly, described in FIG. 58A and shown in FIG. 55C); and/or an optional access code (similar to that shown in FIG. 55C). Alternatively, upon system 600 answering said call device placed call said text-back could be automatically initiated, preferably followed by a system 600 prompt explaining the action. See FIG. 47, step-a, for additional, applicable alternative embodiments.

FIG. 59B, shows contact-element(s) group 590A-2 alternative-37, instructing consumer 530 to call referral phone number 590X-2 (using a call capable device), which upon doing, consumer 530 would be connected to system 600 (IVR script similar to FIG. 54B), allowing for an option to initiate a system 600 text-back message. In a preferred embodiment-1, said text-back message preferably contains instructions (similar to that shown in FIG. 55B) and a referral web-address (as similarly described in FIG. 58B). In a preferred embodiment-2, said text-back message preferably contains instructions (similar to that shown in FIG. 55D); and at least one services 900 linked unique phone-number (as similarly, described in FIG. 58B and shown in FIG. 55D); and a referral web-address (as similarly, described in FIG. 58B and shown in FIG. 55D); and/or an optional password (similar to that shown in FIG. 55D).

FIG. 59C, shows contact-element(s) group 590A-3 alternative-38, instructing consumer 530 to call referral phone number 590X-3 (using a call capable device), which upon doing, consumer 530 would be connected to system 600 (IVR script similar to FIG. 54A) and prompted to enter referral id 590Y-3, allowing for an option to initiate a system 600 text-back message. In a preferred embodiment-1, said text-back message preferably contains instructions (similar to that shown in FIG. 55B) and a referral web-address (as similarly described in FIG. 58C). In a preferred embodiment-2, said text-back message preferably contains instructions (as shown in FIG. 55E); and at least one services 900 linked unique phone-number with lookup ID (as similarly, described in FIG. 58C and shown in FIG. 55E); and a referral web-address (as similarly, described in FIG. 58C and shown in FIG. 55E); and/or an optional pin (similar to that shown in FIG. 55E).

FIG. 59D, shows contact-element(s) group 590A-4 alternative-39, instructing consumer 530 to call referral phone number 590X-1 (using a call capable device), which upon doing, consumer 530 would be connected to system 600 (IVR script similar to FIG. 54B), allowing for an option to initiate a system 600 text-back message. In a preferred embodiment-1, said text-back message preferably contains instructions (similar to that shown in FIG. 55B). In a preferred embodiment-2, said text-back message preferably contains instructions (similar to that shown in FIG. 55F); and at least one services 900 generated/linked unique web address (as similarly, described in FIG. 58D and shown in FIG. 55F); and a referral web-address (as similarly, described in FIG. 58D and shown in FIG. 55F); and/or an optional pin. Optionally, referral phone number could be with lookup ID.

FIG. 59E, shows contact-element(s) group 590A-5 alternative-40, instructing consumer 530 to call referral phone number 590X-1 (using a call capable device), which upon doing, consumer 530 would be connected to system 600 (IVR script similar to FIG. 54B), allowing for an option to initiate a system 600 text-back message, preferably back to said call-device using previously stored and related caller-id data. In a preferred embodiment-1, said text-back message preferably contains instructions (similar to that shown in FIG. 55B) and a referral web-address (as similarly described in FIG. 58E). In a preferred embodiment-2, said text-back message preferably contains instructions (similar to that shown in FIG. 55C); and a contact-element group (similar to that shown in FIG. 55C); and a referral web-address (as similarly, described in FIG. 58E and shown in FIG. 55C); and/or an optional pin.

FIG. 59F, shows contact-element(s) group 590A-7 alternative-41, instructing consumer 530 to call referral phone number 590X-1 (using a call capable device), which upon doing, consumer 530 would be connected to system 600 (IVR script similar to FIG. 54A) and prompted to enter referral id 590Y-7, allowing for an option to initiate a system 600 text-back message, preferably back to said call-device using previously stored and related caller-id data. In a preferred embodiment-1, said text-back message preferably contains instructions (similar to that shown in FIG. 55B) and a referral web-address (as similarly described in FIG. 58F). In a preferred embodiment-2, said text-back message preferably contains instructions (similar to that shown in FIG. 55C); and a contact-element group (similar to that shown in FIG. 55C); and a referral web-address (as similarly, described in FIG. 58F and shown in FIG. 55C); and/or an optional pin.

FIG. 59G, shows contact-element(s) group 590A-8 alternative-42, instructing consumer 530 to call referral phone number 590X-1 (using a call capable device), which so upon doing, consumer 530 would be connected to system 600 either establishing access to services 900 or in a preferred embodiment, consumer 530 could request system 600 to send services 900 related data. Optionally, referral phone number could include related lookup ID. Furthermore, instead of consumer 530 requesting system 600 to send data, data instead could be auto-sent upon call being first detected by system 600, data preferably sent back to the system captured caller-id related and said call-device.

In applicable FIG. 59A-G, instead of the referral web-address(s) and/or referral-id(s) being used for referral/crediting tracking purposes the pins (passwords, access-codes, etc.) could in addition to functioning as a unique access code also function as a referral-element; and/or alternatively the referral web-address and/or referral-id in addition to functioning as a referral-element could also function as a unique access code. Furthermore, the alternative embodiments as discussed in FIG. 59A could (where applicable) be applied as related to any of the FIG. 59 and other applicable figures.

FIG. 60A, is contact-element(s) group 600A-1 alternative-43, instructing consumer 530 to download and open a (mobile) general application 600X-1, which upon doing so and when prompted, consumer 530 would then enter referral id 600Y-1, to access application referred services; whereby in a preferred embodiment-1, application 600X-1 would make available services 900 linked contact-element(s) data, for consumer 530 use(s); and whereby in an embodiment-2, application 600X-1 would send (using any of several methods described in current application) instructions to consumer 530; and whereby in an embodiment-3, application 600X-1 would either allow direct service access to retrieve contact-element(s) data and/or send information explaining how to retrieve contact-element(s) data.

FIG. 60B, is contact-element(s) group 600A-2 alternative-44, instructing consumer 530 to download and open a (mobile) referral application 600X-2, which upon doing so, consumer 530 would gain access to application referred services; whereby in a preferred embodiment-1, application 600X-2 would allow consumer 530 access to services 900, either as an administrator, user or both; and whereby in an embodiment-2, application 600X-2 when prompted, would send instructions.

FIG. 61A, is contact-element(s) group 610A-1 alternative-45, instructing consumer 530 to send referral code 610Y-1, via long-code SMS address 610X-1 (using a text capable device), to system 600 in order to retrieve contact-element(s) data; whereby in a preferred embodiment-1, system 600 would respond by sending (using any of several methods described in current application) ready-for-use linked contact-element(s) data and/or instructions; and whereby in an embodiment-2, system 600 would respond by sending instructions. Alternatively, instead of consumer 530 sending SMS text message to long-code SMS address a user could instead call said SMS address to access system services.

FIG. 61B, is contact-element(s) group 610A-2 alternative-46, instructing consumer 530 to send a blank text, via short-code SMS address 610X-2 (using a text capable device), in order to access system services 900; whereby in a preferred embodiment, system 600 would respond by sending instructions.

In FIGS. 61A-B and similar embodiments where a SMS text message is sent to system 600 to initiate a system service related action, specific information could be sent in said text message that triggers different system 600 actions, e.g. sent payment information could initiate a payment transaction, sent appointment information could set an appointment, sent product id could initiate the return of product related data, sent event id could trigger reservation to said event, etc.; furthermore system 600 SMS text message sent requests involving for-pay services, billing could occur automatically via SMS text service provider with bill being passed on to said SMS message sender, FIP viewer/consumer.

FIG. 62A, is contact-element(s) group 620A-1 alternative-47, instructing consumer 530 to call call-id 620X-1, via a call application such as SKYPE™ call-system (using a call capable device), which upon doing, consumer 530 would be connected to system 600 and prompted to enter referral id 620Y-1 in order to retrieve contact-element(s) data; whereby in a preferred embodiment-1, system 600 would respond by sending (using any of several methods described in current application) system linked contact-element(s) data and/or instructions; and whereby in an embodiment-2, system 600 would respond by sending instructions. Alternatively, any (web/ip) call application providers could be used.

FIG. 62B, is contact-element(s) group 620A-2 alternative-48, instructing consumer 530 to call call-id 620X-2, via a call application such as SKYPE™ call-system (using a call capable device), which upon doing, consumer 530 would be connected to system 600 either establishing access to services 900 or in a preferred embodiment, consumer 530 could request system 600 to send services 900 related data.

In FIGS. 62A-B and similar embodiments where a call is placed via a call application, related FIP call access instructions could include information on where/how to download/retrieve said call-application related software, i.e. instructions could tell viewer to go to a specific website or in the case of a mobile device to download a specific application, in order to retrieve said call application.

FIG. 63 shows a (FIG. 1) contact-element(s) group 630A alternative-49, instructing consumer 530 to send a blank email to SMS address 630X-1 (using an email capable device), in order to access system services 900; whereby in a preferred embodiment, system 600 would respond by sending instructions, optionally with links to services 900 related website(s).

FIG. 64 shows a (FIG. 1) contact-element(s) group 640A alternative-50, instructing consumer 530 to send a blank fax to SMS address 640X-1 (using an fax capable device/service), in order to access system services 900.

FIG. 65 shows a (FIG. 1) contact-element(s) group 650A alternative-51, instructing consumer 530 to send <specified information/item(s)> to mailing address 650X-1 (using a mail processing services/providers), in order to access (request access to) system services 900.

FIG. 66 shows a (FIG. 1) contact-element(s) group 660A alternative-52, instructing consumer 530 to scan barcode 660Y-1 (using a scan capable device), in order to access system services 900 and/or receive information on how to access services 900. More specifically an (mobile) application 660X-1 could initiate, process, send, receive, etc. making available services 900 related information available to both consumer 530 (users) and system 600.

FIG. 67 shows a (FIG. 1) contact-element(s) group 670A alternative-53, instructing consumer 530 to scan QR-code 670Y-1 (using a scan capable device), in order to access system services 900 and/or receive information on how to access services 900. More specifically an (mobile) application 670X-1 could initiate, process, send, receive, etc. making available services 900 related information available to both consumer 530 (users) and system 600.

FIG. 68 shows a (FIG. 1) contact-element(s) group 680A alternative-54, instructing consumer 530 to take a picture 680M of said contact-element(s) group, including referral id 680Y-1; whereby upon taking picture 680M using application name 680Y associated application 680W via a system networked and mobile picture enabled device 680N (PDA, smart phone etc.) picture 680M would then be sent to system 600 for analyzing/processing; where during said picture 680M analyzing process image data, preferably analyzed using image recognition system(s)/service(s)/application(s)/software, identifies/isolates referral id 680Y-1, which it would then translate to system readable electronic-data, electronic data that triggers a system 600 (service) response, preferably to/thru/using device 680N. In a preferred embodiment system services would provide consumer 530 with linked contact-element(s) intended for placement onto a SIP/FIP; and/or said system response would allow access to an account (or accounts) where consumer 530 or affiliate(s) could set [contact-element(s) linked] system-services. Alternatively, said system response could provide data, service(s), application(s) and/or perform action(s), preferably via device 680N. Preferably application 680W and/or device 680N would allow for a consumer 530 one-step point-and-click picture 680N submittal and resultant return system response process; or a process utilizing as few consumer 530 steps as possible. FIG. 68 processes, none to all, could be shared between application 680Y and system 600.

In FIGS. 66-67, alternative to scanning process being used to send code data to related system-services, a picture of the codes could instead be sent for processing using a process similar to that depicted in FIG. 68.

In FIG. 68, instead of or in addition to said picture of referral code being translated to electronic-data for processing, any code and/or combinations of codes could be used, including, human readable code, any non-human-readable code and/or variations thereof and/or combinations thereof. Furthermore, instead of or in addition to said codes being translated to electronic-data for processing, pattern recognition data could be used, such as data derived from data/word patterns, data/word associations, data/word spacing associations, data/word definitions, data/word meaning, data-strings, data/word/phrases/character types and/or variations thereof and/or combinations thereof, i.e. food product nutritional value(s). Furthermore still, instead of or in addition to pattern recognition data being translated to electronic-data for processing, material composition data could be used, such as composition data related to radio-active signature, ingredient(s), aroma, etc. Yet furthermore, instead of or in addition to material composition data being translated to electronic-data for processing, frequency data could be used, such as data captured from rf-tags etc. Yet furthermore still, any one and/or combination of codes, pattern recognition data, material composition data, frequency data and variations thereof and combinations thereof could be translated to electronic-data for processing.

In FIGS. 66-68, the data being analyzed for translation could be analyzed and checked against information previously made available to system 600 and/or check against third party system data and/or checked against data looked-up via a network and/or checked against real-time data obtained/looked via the worldwide web or similar network. Also, said data processing/analyzing could occur local to said scan/picture device (smart phone), system remote, variations thereof, combinations thereof, etc.

FIG. 69A-G show a contact-element group 690A, not defined but could assumedly be any one of the applicable contact-element(s) group embodiment possibilities as presented in the current application; whereas said contact-element(s) group is configured onto the header of related FIP 700, FIP(s) 700 being a type of display.

FIG. 70 depicts a process by which a consumer 530 references a retailer 515 displayed FIP 700 in order to request an electronic gift card 700G be sent to a FIP 700" (text enabled device) belonging to either consumer 530 or another consumer 530'; whereby the recipient of electronic gift card 700G can present said card to participating service provider(s), to be scanned for credit towards the purchase of product(s), item(s), service(s), etc. FIP 700" (text enabled device) is defined as a FIP when broadcasting, televising, and displaying and/or otherwise making available system-linked contact-element data.

FIG. 70 shows an intended for retailer 515 display FIP 700 (of a type tear-out-page booklet with header), comprising an optional header configured with contact-element(s) group 700A and a multi-page booklet, each FIP 700' (booklet page) intended for removal by consumer 530, for future referencing purposes; wherein, each FIP 700' (booklet page) is configured with a contact-element(s) group 700A', consisting of instructions 700D with infused referral SMS address 700X; whereby instructions 700D instruct consumer 530 on how to send a text message 700K containing specific text information 700P to system 600 for service related processing. More specifically, instructions 700D instruct consumer 530 to send a text message 700K, containing at least one cell phone number 700B to which the electronic gift card 700G is to be sent along with the gift card 700G related (crediting) dollar amount 700C, to system 600 for service related processing; where upon text-message 700K being received, system 600, using cell phone number 700B, generates and sends contact-element(s) group 700A", also defined as electronic gift card 700G, in the form of SMS text message 700L, consisting of instructions and a message attached dollar amount 700C credit linked QR code 700X', to FIP 700" (text enabled device). The preferred payment method for electronic gift card 700G is auto-billing, processed by the FIP 700" (text enabled device) related communications service provider and submitted-to/paid-for by consumer 530. Alternatively and as indicated in instructions 700D, phone number 700B could instead be omitted from sent text information 700P; whereby system 600 could use the caller-id information captured during the initial text-message 700K to send electronic gift card 700G back to the consumer 530 related FIP 700" (text enabled device).

Upon FIG. 70 text message 700L being received and displayed on FIP 700" (text enabled device), as shown in FIG. 70, the electronic gift card recipient 515' could then present the electronic gift card 700G to a participating service provider 530' for scan of QR code 700X' and resultant credit towards any recipient 515' qualifying purchases; whereby upon said scan and resultant crediting activity being complete system 600 would preferably generate and send a text message receipt to recipient 515', via FIP 700" (text enabled device), said receipt containing information such as remaining credits data, no credit remaining notification, online access information to view past transactions, etc.

As related to FIGS. 70, referral SMS address 700X and/or related QR code 700X' could be used for referral and credit tracking purposes similar to the process depicted in FIGS. 46-47. Alternatively, instead of FIP 700 (of a type tear out page booklet with header) the FIP electronic gift card ad could instead be broadcast (as in FIG. 53A-C), televised (as in FIG. 52A-B), presented on a website (optionally with hyperlink to electronic gift card service site) and/or presented-with/configured-onto any SIP/FIP, preferably meant for display; whereby optionally, transactions completed via said advertiser placed FIP gift card ad(s) would be tracked for crediting and referral purposes as similarly depicted in FIGS. 46-47. Also, as an alternative to the electronic gift card having credit applied to it once, it could be associated to an account, allowing for credit refills; and/or instead of billing related to a sent gift card being auto-bill processed by the text enabled device related communications provider, consumer 530 could (be instructed to) include credit card information as part of the sent text information 700P, credit card information processed by system 600; furthermore an electronic gift card could be linked to bank account and/or credit card information, preferably via an online account, where upon depletion of electronic gift card credit an auto-recharge (using said bank/credit-card) could occur or upon an electronic gift card transaction occurring a direct debut (using said bank/credit-card) could occur, replenishing the related electronic gift card credit. Furthermore, instead of or in addition to the electronic gift card being sent via SMS text message it could be sent via email (intended for printout and use), presented on a site (intended for printout and use), faxed and/or any other applicable way, some as described in the current application, that data can be sent by system 600 to the electronic gift card recipient. Furthermore still, instead of all text information 700P being sent in the initial text message request for an electronic gift card, there could be a system 600 to consumer 530 exchange of information, i.e. user could send some data and system 600 could respond by requesting more data; and/or if bad text information 700P is sent system 600 could respond by requesting correct(ed) data, etc. In place of a QR code the electronic gift card could consist of any code, to be used by said gift card related services/products provider for crediting purposes. Alternatively the electronic gift card could instead be an electronic ticket, money transfer, money card, etc.; furthermore the electronic card could be intended for scan by a related provider to track points, e.g. mileage points, reward points, credits towards purchase of products/services/items, etc. Yet as another alternative, instead of the electronic gift card being sent in a text message to said recipient it could instead be made available/managed via a (mobile) application.

FIG. 71A are steps associated with FIG. 50, wherein step 7100, consumer 530 references a retailer 515 displayed FIP 700 (of a type service referral sign). In step 7105, consumer preferably calls referral phone number 500B, accessing system services. In step 7110, while interacting with system 600 call-attendant services (script similar to FIG. 54B), consumer 530 would initiate a text-back request, to have sent (via text message) services 900 linked information (similar to any of the FIGS. 55A-H). In step 7115, upon receiving said step 7110 system 600 sent text-message consumer 530, referencing said text information, would then preferably access a services website through which they could custom set contact-element(s) linked system services. In step 7120, upon completing step 7115 system-services set-up process, consumer 530 could then scribe contact-element(s) onto FIP 700' (similar to FIPs shown in FIG. 48, 49), said contact-element(s) consisting of a services linked phone number and related referral code (similar to that depicted in the sample-sign shown on the FIG. 50 service referral FIP insert). In step 7125, consumer 530 displays the FIP 700' configured in step 7120, for viewer inquiry options, consisting of many options as presented in the current application. Alternative to consumer 530 calling to system 600 to retrieve said contact-element(s), as indicated in FIG. 50, they could instead look-up referral web address 500X to be navigated to a services website from which to set/receive said contact-element(s) and related services.

FIG. 72A-F depict the steps and FIP parts involved to use a retail available FIP 700 (of a type window envelope containing FIP 700-1 of a type pre-scored label stock sheet); whereby FIP 700 can be hung for display by product hang-hole 720E and/or placed in a display, intended for consumer purchase.

Figure 72A:
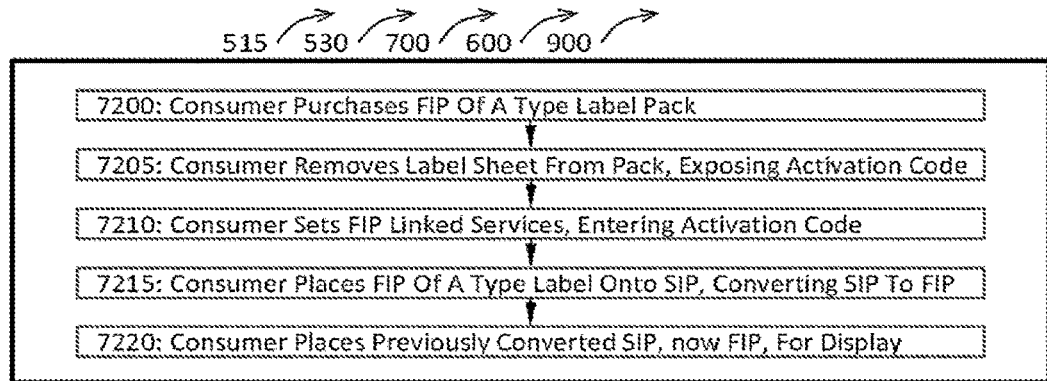
FIG. 72A-F depicts FIP-parts and processes as related to FIP of type package-envelope containing pre-scored FIP label stock; where
Figure 72B:
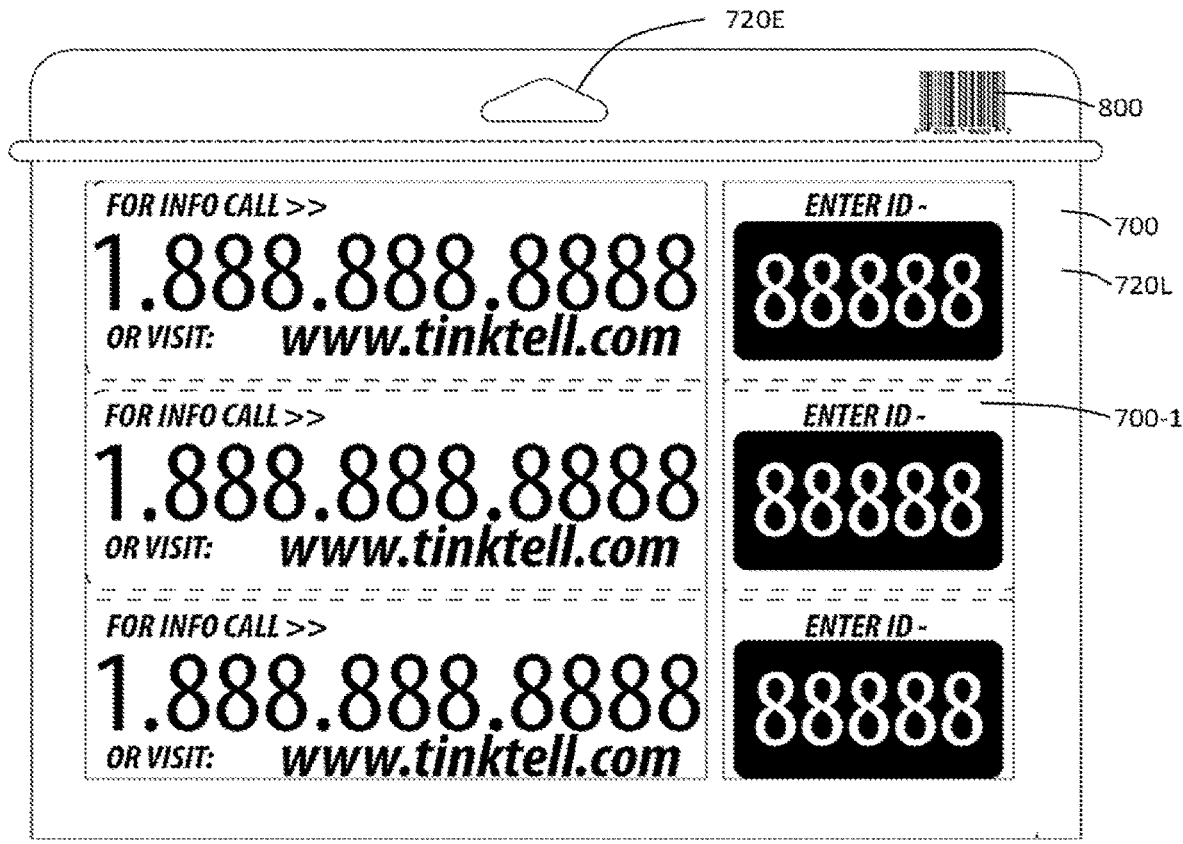
Figure 72C:
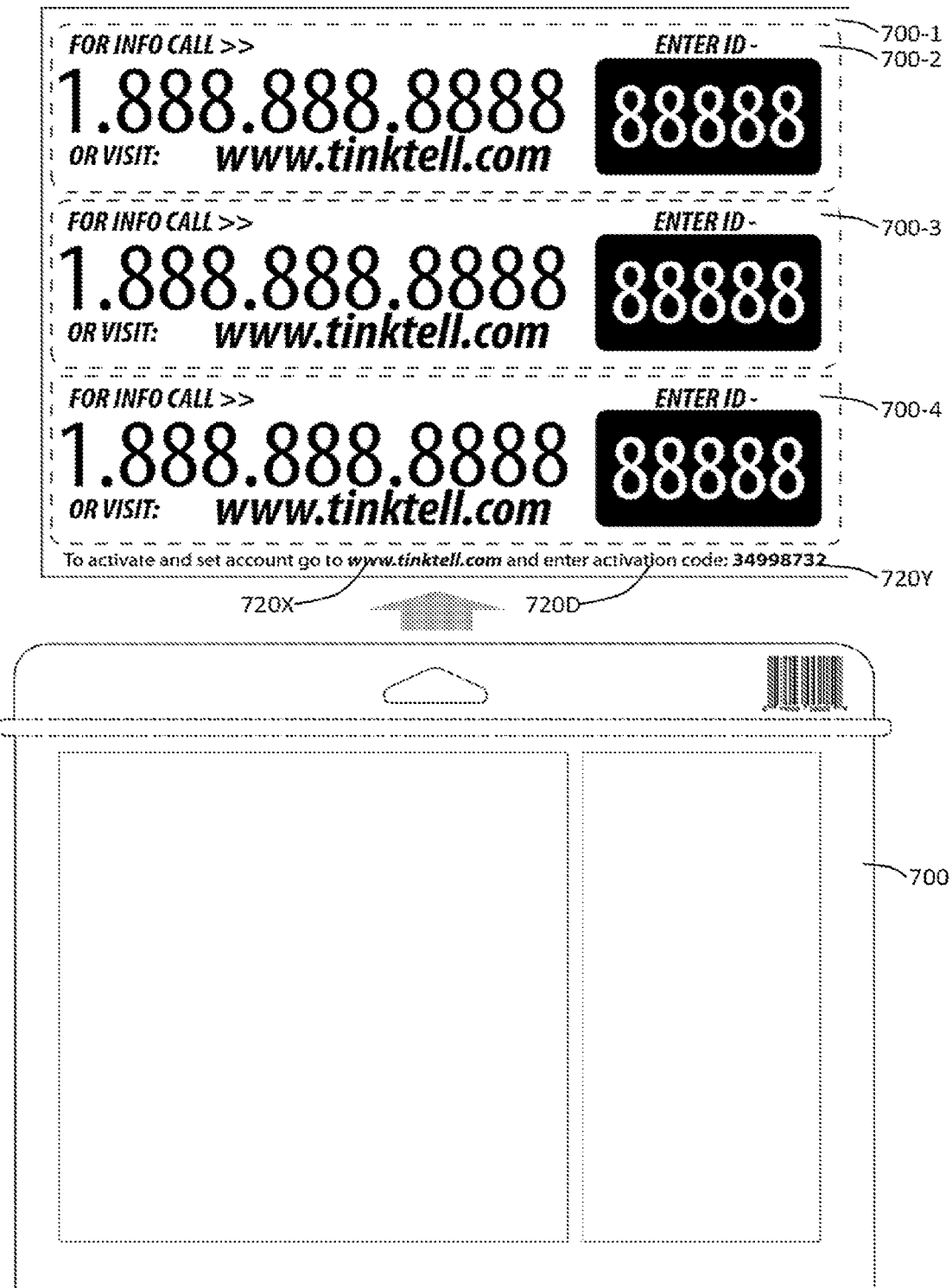
Figure 72D:
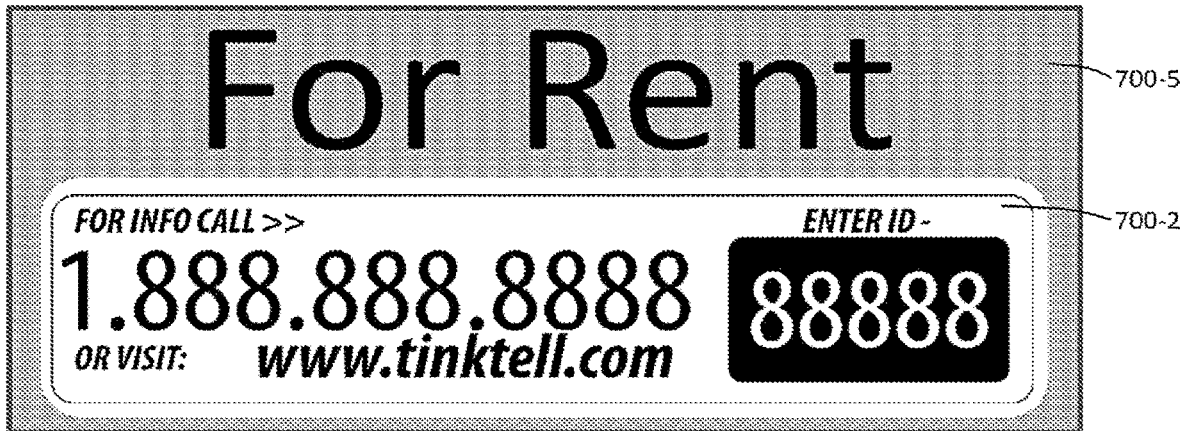
Figure 72E:
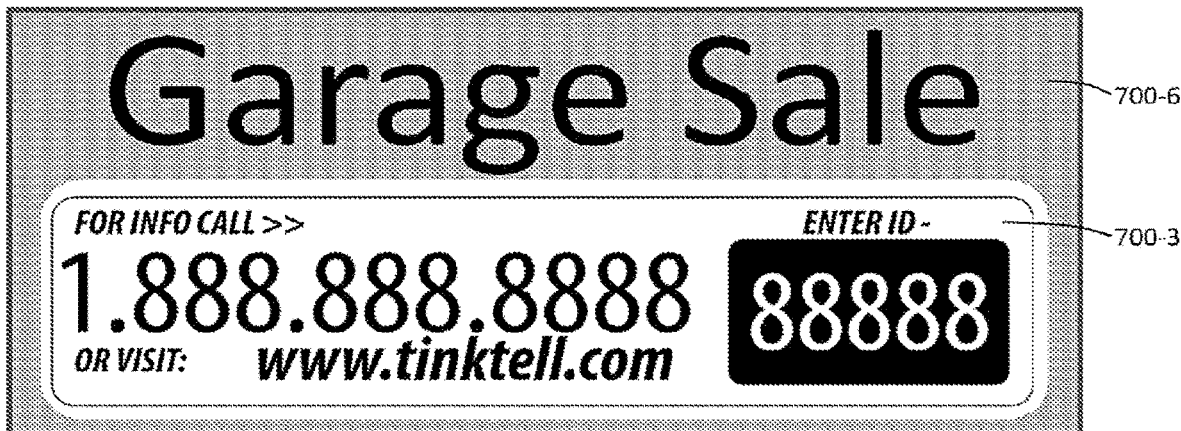
Figure 72F:

In step 7200 as related to an embodiment, consumer 530 purchases FIP 700, before which product barcode 800 would be scanned for inventory related purposes. In step 7205 as depicted in FIG. 72C, consumer 530 removes FIP 700' (label sheet) from packaging envelope 720L, exposing previously hidden referral activation code 720Y. In step 7210, following instructions 720D, consumer 530, via web address 720X related service website, sets FIP 700' linked services, during which activation code 720Y is entered, after which FIP 700' configured contact-element(s) are made system 600 active, contact-element(s) pointing to services 900. In step 7215 as depicted in FIGS. 72D-F, consumer 530 places FIP 700-2 thru FIP 700-4 (contact-element(s) configured labels) onto FIP 700-5 (system-linked for rent sign), FIP 700-6 (system-linked garage sale sign) and FIP 700-7 (system-linked for sale sign); whereby it can be assumed that each said FIP (contact-element(s) configured label) contains a different reference-id, each pointing to different services as related to each sign type and related advertised item(s). In step 7220, consumer 530 place newly activated FIP 700-5 thru FIP 700-7 signs for display. Item to note, FIP 700-5 thru FIP 700-7 (system-linked signs) prior to FIP 700-2 thru FIP 700-4 (contact-element(s) configured labels) being placed onto them were defined as SIS(s) or standard information signs because they did not contain system 600 linked contact-element(s). Furthermore and preferably, said FIP (contact-element(s) configured labels) as described in step 715 would be identical, allowing for placement onto multiple SIS (standard information signs) of the same type, related services 900 advertising the same object(s). As in FIG. 46-47, referral activation code 720Y is preferably used for distribution and credit tracking purposes; alternatively, referral activation code 720Y could be used for distribution tracking purposes as depicted in FIG. 57, activation code 720Y used in place of referral code 570A.

Figure 73:
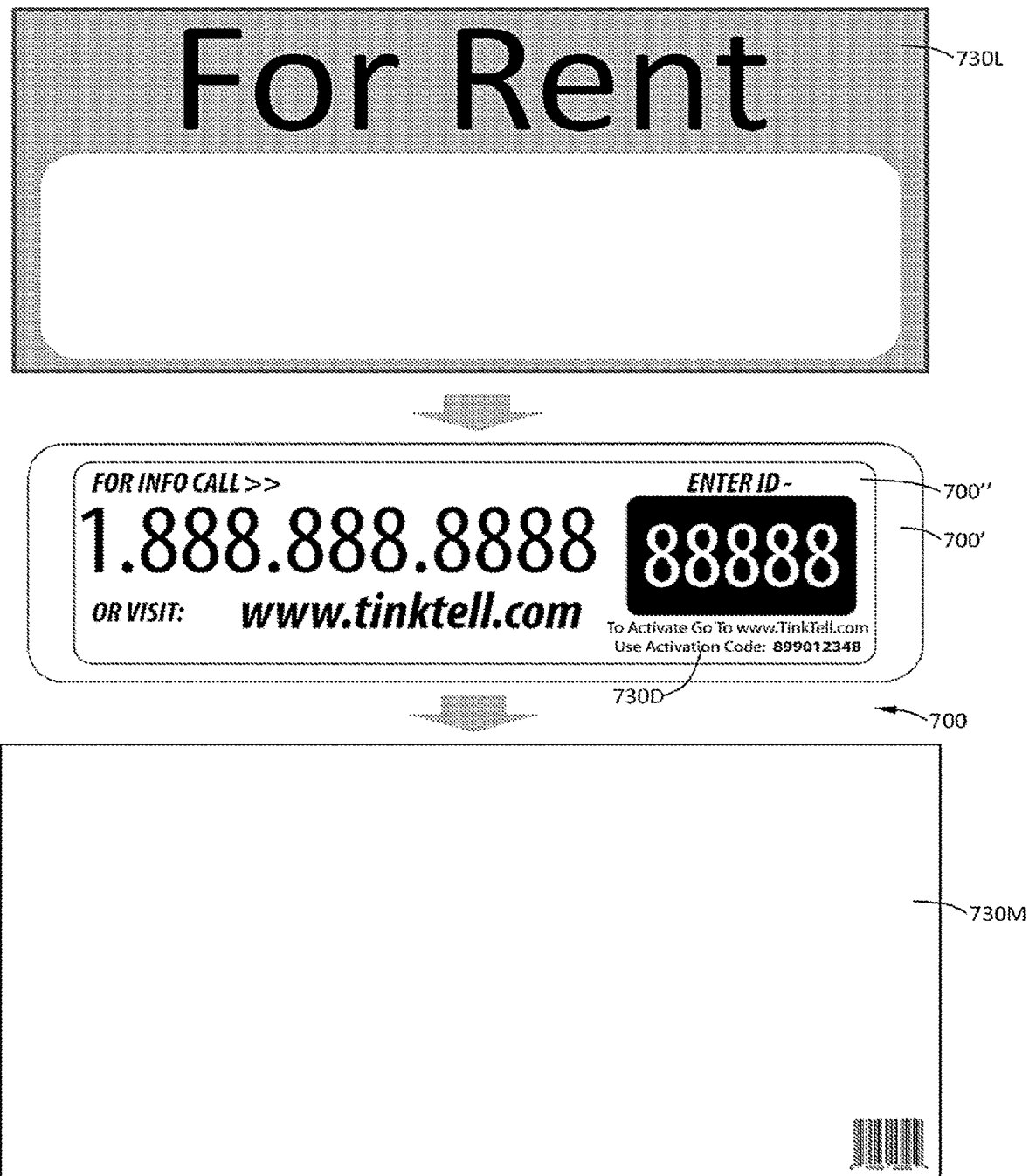
FIG. 73 depicts a standard information sign of type for-rent-sign being placed along with FIP label stock into a (retail) plastic bag, preferably to be made available for retail sale.

FIG. 73 depicts a SIS 730L (standard information sign, of type for rent sign) and FIP 700' (label stock with peel away FIP 700'' contact-element(s) configured label) optionally being placed into bag 730M, with resultant assembly preferably being made available for retail purchase; whereby upon purchase of FIP 700 (of a type bag containing SIS 730L and FIP 700') consumer can optionally set FIP 700'' (contact-element(s) configured label) related services, placing activated FIP 700'' label onto SIS 730L. The instructions 730D infused activation code as related to this embodiment would be entered during the FIP 700 linked services, via website, set-up process, as explained by instructions 730D. By bundling FIP (label stock or similar) with SIS/FIP for retail products it provides another possible source of revenue to the retailer (end-consumer distributing organization); in that, if the FIP consumer decides to set the said FIP related and preferably for-pay and referral tracked services, then said retailer could be paid monetary credit for activate services referral as similarly depicted in FIGS. 46-47.

Figure 74:
FIG. 74 depicts a FIP of type for-rent-sign being placed into a (retail) plastic bag, preferably to be made available for retail sale.

FIG. 74 depicts a FIP 700' (system-linked for rent sign) optionally being placed into bag 740M, with resultant assembly FIP 700 (of a type FIP 700' in retail bag 740M) preferably being made available for retail purchase by a FIP consumer. The instructions 740D infused activation code as related to this embodiment would be entered during the FIP 700 linked services, via phone, set-up process, as explained by instructions 740D.

Figure 75:
FIG. 75 depicts a retail ready FIP of type label-stock with peel away FIP of type label, typically intended for placement onto SIP(s)/FIP(s).

FIG. 75 depicts a FIP 700 (of a type label stock with FIP 700' peel-away label), preferably made available for retail purchase. Alternatively, FIG. 75 could also be viewed as a FIP 700 (of a type label stock with FIP 700' of a type peel-away label), located in a (retail) package envelope, preferably made available for retail purchase.

Retail available FIP labels that adhere to FIP(s)/SIP(s), as in FIGS. 39-41, 72-75 have numerous advantages, with a primary advantage being optimization of valuable retail space; possible, because FIP labels allow the consumer the option of applying said label to existing FIP(s)/SIP(s) thus providing the retailer the option of not having to stock both SIP(s) and SIP equivalent FIP(s), i.e. in the case of the for information signs (such as a for sale sign), instead of a retailer having to stock both the SIS (standard information signs) and FIS (system-linked for information signs a type of FIP) version of said sign, which can take up lots of retail space, said retailer could instead stock FIP labels intended for placement onto said SIS(s) and in doing so eliminate the need to stock contact-element(s) pre-configured FIS(s). As related to FIGS. 72-75 FIP embodiments along with any other referral tracked, for-pay services linked FIP(s), another primary advantage is that these products can offer a potentially significant additional source of income to the end-consumer distributor (or retailer) in the form of monetary credits applied as a result of activated services referrals, similar to that depicted in FIGS. 46-47.

The referral activation code as depicted in FIGS. 72-75, allow for credit/distribution/referral tracking as related to FIP linked services, similar to that depicted in FIGS. 46-47, 57; it allows for a fast FIP related services setup process, in that (1) referral activation code as related to distribution tracking data and system-services linked contact-element(s) data, can be entered to system 600, instantly activating related service account(s); said activation code could instead be a unique activation referral web-address, that when looked up could automatically navigate a user to a services webpage through which services could be accessed; said activation code could be a unique referral phone number (or call/ip address, e.g. Skype™ call-id, etc.), that when called could access services; said activation code could be any activation id intended for entry via a call-application, that when looked up could automatically access services; said activation code could be a unique referral email-address, that when emailed to could automatically reply with an email providing access, via link(s), to services; said activation code could be any activation id intended to be sent via email to system 600, an email that when sent triggers a system 600 automatic email reply, said reply email preferably providing access, via link(s), to services; said activation code could be a unique referral fax number (fax id), that when faxed could automatically set/activate services, where upon completion system 600 would preferably fax-back a confirmation notice (optionally including services access instructions, information, etc.); said activation code could be a unique referral SMS short/long code address, that when texted to could automatically set/activate services, where upon completion system 600 would preferably fax-back a confirmation notice (optionally including services access instructions, information, etc.); said activation code could be any activation id intended for send via SMS short/long code address to system 600 to set/activate services, where upon completion system 600 would preferably text-back a confirmation notice (optionally including services access instructions, information, etc.); activation codes could be scan (picture translation, as depicted in FIGS. 66-68) based, that when scanned could automatically set services; activation codes, could be non-referral (data) related. Alternatively, an activation code upon system entry, could automatically default-set (service) accounts; trigger system processes that could make (specific, custom, general, settable, customizable, etc.) site(s), website(s), application(s), etc. available; trigger system processes that make system-services linked contact-element(s) available; trigger system processes that make data/information available, such as information intended to instruct a user on how to access/set FIP related services; and/or trigger any (system 600) applicable action and/or process. Alternatively, said email based referral activation code could be used to set/access/activate/review applicable FIP related information/data/account(s)/service(s)/item(s); more generally, any activation code could be used to set/access/activate/review related and system maintained information/data/account(s)/service(s)/item(s). Furthermore FIP(s) related contact-element(s) group could consist of only an activation code and an (optional but recommended) address/application through which to enter it, preferably for credit tracking purposed.

In FIGS. 72-75, the label count, size, packing method/configuration (including no packaging), layout, method of intended display, etc. can vary; furthermore the referral activation code and/or related instructions could be made visible or they could be hidden by retail packaging/marketing materials, located on a hidden portion of related FIP, concealed by rub/peel away material, obscurely supplied with FIP, etc.

Figure 76A:
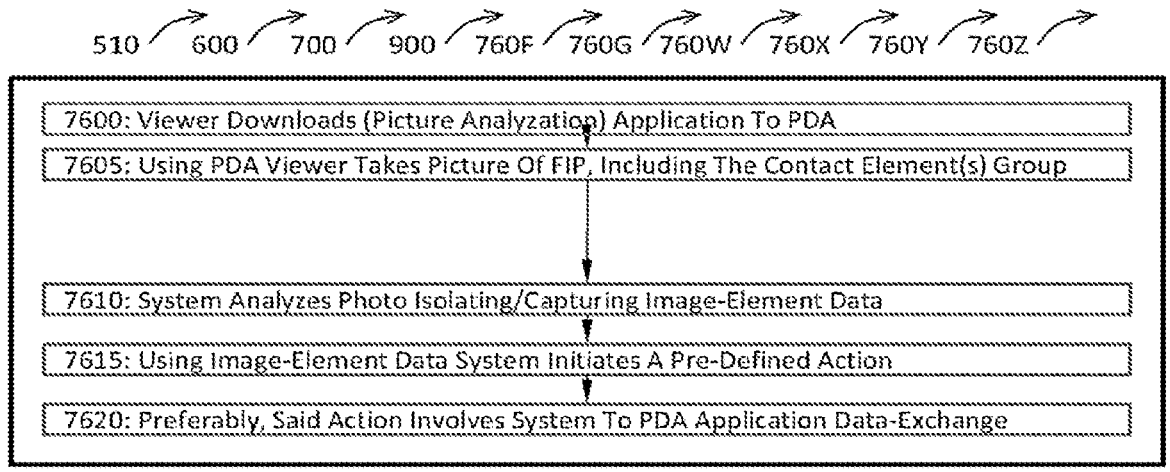
FIG. 76A depicts a picture-submission process which initiates system response(s), preferably, response(s) as related to FIP of a type billboard, as shown in FIG. 76B.
Figure 76B:
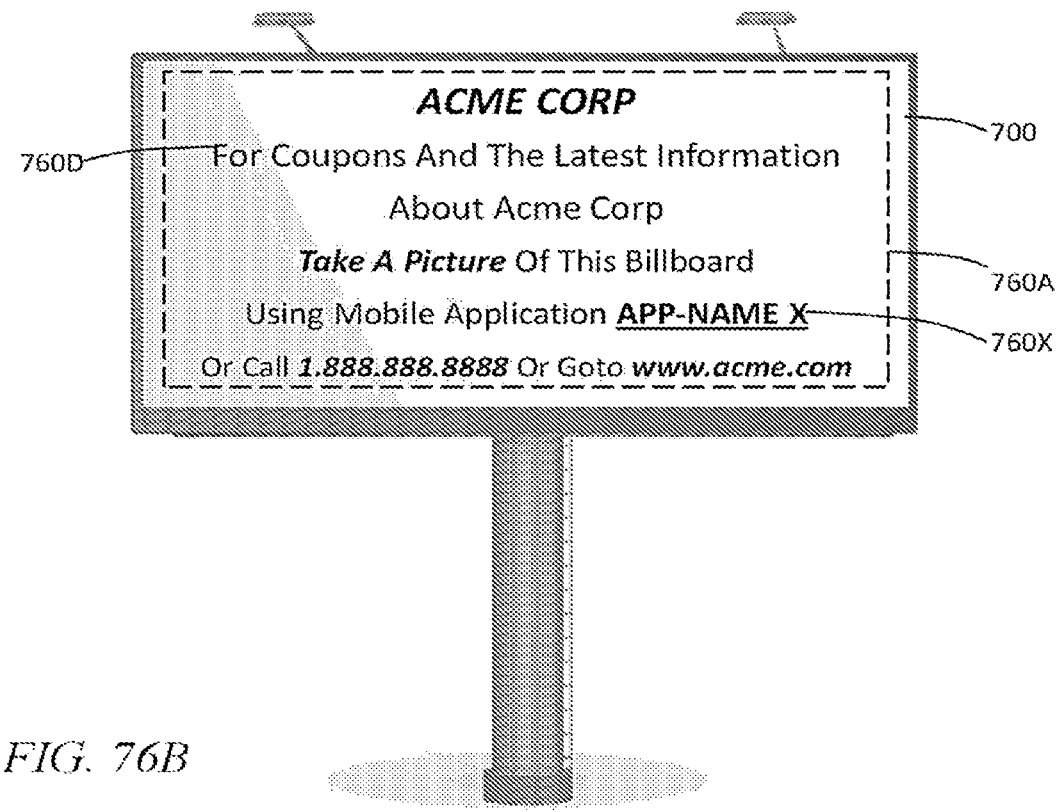

FIG. 76A-B depicts a FIP 700 (of a type billboard) configured with contact-element(s) group 760A, said elements including FIP instructions 760D infused with (mobile) application name 760X; wherein step 7600, a FIP 700 related viewer 510, would install application name 760X related application 760Y onto their PDA 760W (a type of mobile networked computing and/or communication device), if not already installed; wherein step 7605, (consumer) viewer 510, using PDA 760W, takes an electronic picture 760Z of FIP 700 including contact-element(s) group 760A; wherein step 7610, application 760Y sends picture 760Z to system 600 for photo analysis, similar to processes depicted in FIG. 68; wherein step 7615, during said photo analysis, system 600 digitizes/translates contact-element(s) group 760A photo data into searchable electronic data 760F, using image recognition/analysis/type(s) of software(s)/application(s)/process(s); wherein step 7620, system 600 cross-references searchable electronic data 760F against system available data 760G; wherein step 7625, when qualifying said cross-referenced results, as related to system 600 maintained/predefined criteria(s), are met system 600 responds by executing predefined service(s), command(s), action(s), etc., e.g. sending data, requesting data, performing an instant action, setting a future action, making services available, sending/requesting information/data via application 760Y, making services available via application 760Y, etc. The searchable electronic data 760F in FIG. 76 would most likely be the company website and/or phone number data-elements, advertised on FIP 700.

Figure 77:
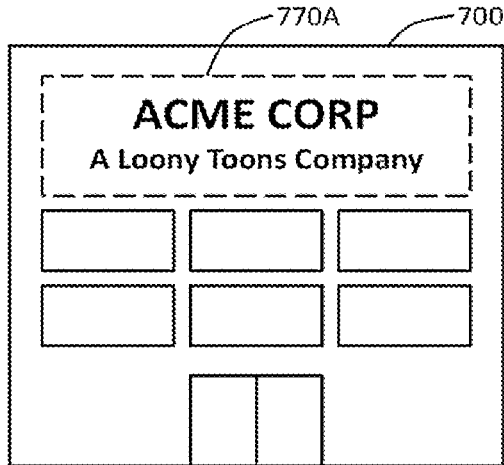
FIG. 77 depicts a FIP of a type building configured with stencil lettering of said building related organization name and slogan.

FIG. 77 depicts a FIP 700 (of a type organization building) configured with contact-element(s) group 770A, said elements consisting stencil lettering spelling out name of said organization and related slogan; wherein a viewer following processes similar to those depicted in FIG. 76A would trigger system response; with the searchable electronic data most likely being a combination of the organization name and slogan, or parts thereof.

Figure 78:
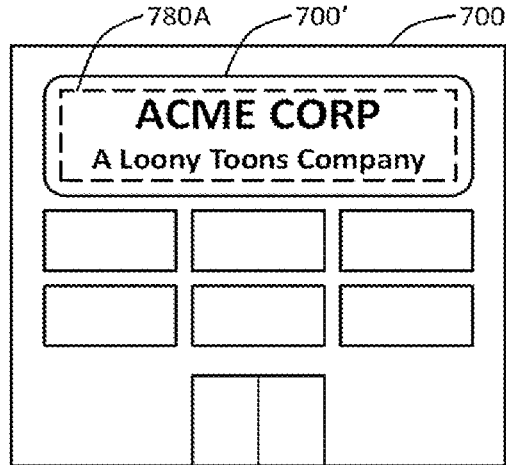
FIG. 78 depicts a FIP of a type building configured with a sign, sign configured with lettering of said building related organization name and slogan.

FIG. 78 depicts a FIP 700 (of a type organization building configured with FIP 700' of a type sign) configured with contact-element(s) group 780A, said elements consisting of said organization name and related slogan; wherein a viewer following processes similar to those depicted in FIG. 76A would trigger system response; with the searchable electronic data most likely being a combination of the organization name and slogan, or parts thereof.

Figure 79:
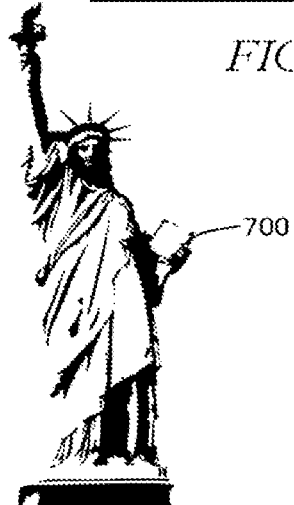
FIG. 79 depicts a FIP of a type landmark (Statue of Liberty).
Figure 80:
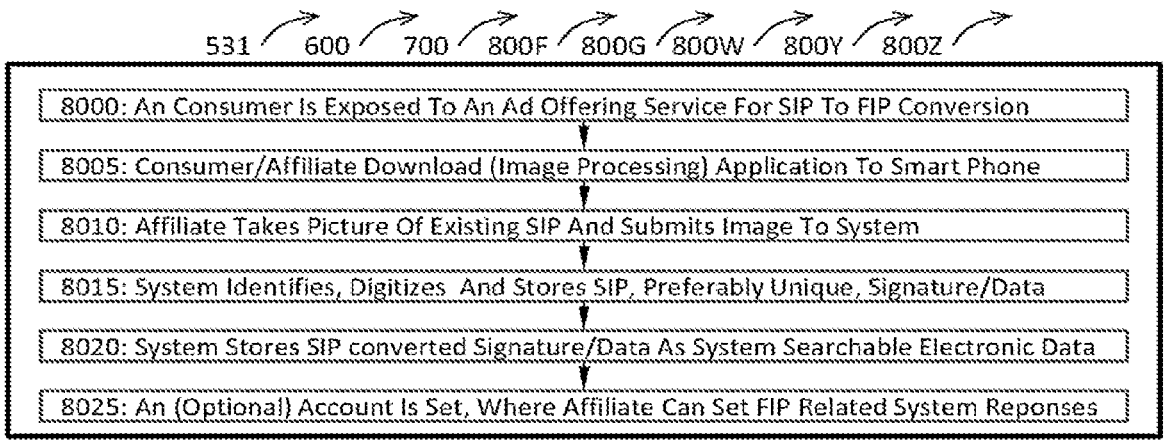
FIG. 80 depicts a picture-submission process by which an organization authorized affiliate converts an existing SIP (standard information product) into an FIP, were said FIP related system responses can be triggered by pictures of said FIP being submitted to said system for processing by FIP viewers.

FIG. 79 depicts a FIP 700 (of a type recognizable landmark, Statue of Liberty); wherein the FIP 700 related contact-element(s) data is in and of itself also FIP 700, element(s) being the unique and distinguishable attributes of the Statue of Liberty, said attributes that can be translated-to/used-as system searchable electronic data as referenced in FIG. 76; wherein a viewer taking a picture of the Statue of Liberty and following processes similar to those depicted in FIG. 76A would trigger predefined system response(s). Other photo captured contact (data) element(s) that could be translated for use a searchable electronic data could further include, general shape(s) of FIP 700 (in this case said statue) areas/in-total as taken by photo from different vantage points; and/or feature(s) to feature(s) relative distance(s) as taken by photo from different vantage points; and/or use of global-positioning data as provided by said picture device to system; and/or variations thereof; and/or combinations thereof; etc.

In FIGS. 76-79 said system triggered response could include but is not limited to, sending (said organization related) data to said viewer, e.g. information, promotions, sales, products-offered, services-offered, products-accepted, services accepted, hiring information, contact information, personnel information, website information, hours-of-operations, etc.; and/or said action(s) could include adding said viewer (via said PDA system captured information) to membership and/or mailing lists; and/or said response could auto-set (said organization related) accounts/services; and/or said actions could make available (said organization related) services, website services, website calling services, website faxing services, SMS services, email services; and/or action(s) could initiate system initiated call-backs, text-backs, fax-backs, emails, etc.; and/or actions could send requests for said viewer information; and/or in the case of text based FIP(s) submitted pictures, said system response could be to playback text-to-speech translations of said text to said viewer, preferably via said viewer PDA or similar device; and/or variations and/or combinations thereof. Alternative to a system response of sending textual based data for viewer review, system could instead send audio/visual/text translated versions of said text and/or predefined audio/visual/text data for review; whereby said audio portion and/or subtitled video portion of sent data could alternatively be translated into any language or dialect thereof, including language and/or language deciphering processes used by the hearing/seeing/physically impaired (people).

FIGS. 76-79 introduce a new method of marketing/advertising, a field where every advantage counts, a method that allows users/consumers to take pictures of FIP(s) around them for instant feedback, FIP(s) that said users are already ready use to seeing and understand, FIP(s) such as, signs, labels, billboards, product-packaging, service center locations, sales signs, newspaper stories/ads, magazine stories/ads, book covers (titles), literature (titles), landmarks, license plates, cards, business cards, objects, items, landmarks any FIP as mentioned in the current application, any item that can be uniquely identified and cross-referenced with system obtainable information; the method turns practically/applicably everything in the real world into a potential FIP, where when said picture of real-world item is sent to system, said system responds. A primary advantage of FIP(s) configured contact-element(s) group(s) that consist of non-code/address based elements is, it allows for a natural looking/feeling FIP, one viewers thereof are already use to seeing; some said non-code/address based elements include images, graphics, text, titles, names, slogans, descriptions etc.

In FIGS. 76-79, system available data, could be data as related to real-time lookup, system stored data, previously entered system data, system calculated data, system decoded data, system arranged data, combined data, variations thereof, combinations thereof, etc.; whereby searchable electronic data could comprise address(es), web-addresses(s), phone-id(s), email-address(es), street address(es), call-id(s), encoded graphic(s), codes, id(s), special font(s), slogans, title(s), organization name(s), name(s), contact-element(s) data, contact-element(s) spacing data, contact-element(s) arrangement data, contact-element(s) orientation data, logos, data-string(s), embedded code(s), human readable code(s), machine readable code(s), artwork, image(s), variations thereof, combinations thereof, etc.

As related to embodiments as described in FIGS. 76-79 and similar, the said call-device installed (picture processing) application name/download-location, and/or instructions detailing the method by which said picture should be submitted to said system for processing, could be configured directly onto and/or supplied with said FIP; alternatively and/or in addition to said picture processing related information being supplied-with/configured-onto said FIP, some portion-of or all of said information could also be provided on related/referred electronic/physical media(s). Furthermore instead-of or in addition to electronic picture data being submitted for processing, video data, multi-media data, audio data, and/or variations thereof, and/or combinations, etc., could be submitted for processing.

FIG. 80B depicts a SIP 800G (Standard Information product, of a type NON system-linked existing organization billboard); wherein step 8000, a said organization authorized affiliate 531 obtains information on how to convert said existing SIP 800G into a FIP 700 (of a type system linked organization billboard), preferably communicated to them by way of a text/televised/broadcast/web-presented/etc. advertisement/message; wherein step 8005, authorized affiliate 531, if not already downloaded, downloads a (mobile) application 800Y to a PDA 800W or similar device; wherein step 8010, using application 800Y via PDA 800W, takes a picture of said SIP 800G, thus in so doing sending SIP 800G captured image 800Z to system 600 for processing; wherein step 8015, system 600 digitizes and extrapolates (using image recognition type of software/application/services/etc.) SIP 800G specific and preferably (system) unique image 800Z signature/data; wherein step 8020, system 600 stores said signature as searchable electronic data 800F, as similarly described in FIG. 76, to be used as similarly described in FIG. 76, and in so doing converting SIP 800G into a FIP 700; wherein step 8025, preferably some level of access to system 600 services as related to searchable electronic data 800F is provided to affiliate 531, services where system 600 responses/actions can be set, said responses triggered when a photo of said FIP 700 is submitted to system 600 for processing by a viewer, as similarly described in FIG. 76. As related to affiliate 531 set-up and use of said SIP to FIP conversion method, membership(s), account(s), payment(s)-for-use thereof, confirmation notice(s), requests for additional information after/before/with initial picture 800Z submittal, variations thereof, combinations thereof, etc., could be incorporated into the set-up and/or ongoing processes as related to said method. Information/data exchange between system 600 and affiliate 531 as related to said method, e.g. successful/unsuccessful picture submittal confirmation(s), service setup/access/information, future setup required instructions, etc. could occur by any of the data-exchange methods as described in the current application. Alternatively, affiliate could provide picture 800Z and/or any other required data to system 600 by any applicable (physical/electronic) delivery method, many as described in the current application. Another alternative could involve affiliate entering data as related to SIP(s) to system 600 for processing, preferably submitted using a networked computing device via the web. Still, instead of affiliate(s) providing information to system 600 to convert existing SIP(s) to FIP(s), system 600 could use previously provided, presorted, looked-up data, etc. to automatically convert SIP signature information to searchable electronic data; whereby automatically convert data would be optionally reviewed for correctness; and where preferably business methods/processes/programs would connect FIP (previously defined as said SIP) authorized affiliates to accounts, where said FIP related services could be managed.

As related in FIGS. 68, 76-80, said photos sent to system(s) for processing/analysis, could be sent using any applicable and available method to send data (electronic/physical), some as described in the current application, including, via application(s), by-text-send, by-email-send, by-mail-send, by-fax-send, variations thereof, combinations thereof, etc.; and/or photo could be placed (uploaded) to a site for system retrieval and processing; furthermore picture could be a physical picture mailed to a system 600 authorized administrator for processing. As related to picture(s) and/or related information/data sent to system for processing that is/are bad, missing, incomplete, unrecognizable, not-unique, invalid, improper type, not detailed enough, of insufficient quality, variations thereof, combinations thereof, etc., system 600 could return error messages, deny access, requestbetter/missing data, variations thereof, combinations thereof, etc.; and/or it could return a list of likely matches from which a user could make a selection, in order to initiate system responses as related to said selected match.

As related to FIGS. 68, 76-80 and in place of and/or in addition to FIP related contact-elements picture data being processed by system 600 for use, global positioning data as related to the FIP, device (used to submit picture of FIP elements, such as a PDA) and/or both could also be used to create rules as related to said electronic searchable data, preferably rules that make/set/affect said system actions based on geographical location; whereby fixed FIP related global-positioning data could be captured during initial set-up; and whereby said PDA global-positioning data would be dynamic, dependent on said device current location, said PDA location data provided to system, preferably via said picture processing related (mobile) application.

As related to FIGS. 68, 76-80, system 600 could query information from other systems for use as system available data, for example, upon an image of a business location sign being submitted for analysis, the system could use a combination of data-elements to automatically return information as it relates to said sign associated business. Said data-elements could include, said sign relative global positioning data (GPS-data as provided by picture taking smart phone location); (third party) system(s) searched/retrieved (organization) street address data (converted to global positioning data) located in the approximate same vicinity as said smart-phone location; and/or image data isolated during said image analysis, image data in this case most likely being said (digitized, image-text converted to digitized-text) business location name, slogan and/or logo, as located on said sign; wherein system using this data-elements could make available a list of the most likely business/organization names to said smart phone user for selection or if absolute, make available system responses as related to said absolute returned business/organization result. Said and searched third party systems could include the web and/or specific sites/databases, e.g. trademark sites (used in this case to find registered business names, slogans, logos, addresses, etc.), secretary of state site (to retrieve registered business names, addresses, website-info, etc.), etc. Alternatively, instead of said and analyzed image being that of an organization location sign, it could instead be of a non-landmark, etc.; furthermore said system response and/or returned information could be publicly available information such as advertised sales, promotions, services, products, etc., and/or related contact and website address information, and/or previously set said system services, preferable set by a said organization authorized affiliate.

The invention is not limited in that FIP(s) can be configured and/or supplied with multiple contact-element(s) group; whereby contact-element(s) groups can be comprised of multiple contact-element(s); and whereby contact-element(s) can be any element that is linked/associated to (FIP) related administrator(s) settable services.

In FIGS. 46-75, depicted referral elements could be used for referral tracking/crediting purposes, similar to that depicted in FIGS. 46-47; furthermore, any applicable contact-element associated to any given and applicable FIP could be used for referral tracking/crediting purposes similar to those depicted in FIGS. 46-47.

FIGS. 46-75 depicted referral elements can act as a reference-id, pointing to specific system services (areas); referral elements can function as a referral tracking contact-element, a line of distribution and credit tracking contact element and/or referencing contact-element; referral elements can be alpha, numeric, alpha-numeric, human readable code, electronic readable code, code/id, frequency and/or material signature-composition based and/or variations and/or combinations thereof, and are not limited in number of characters, configuration, arrangement, etc. They can be comprised of one or more data strings and can be optionally integrated into/with FIP related instructions, advertising/marketing info, graphics, text, objects/documents, etc. Furthermore, referral element(s) descriptive title(s)/heading(s) can vary, e.g. referral code, referral id, referral website, referral phone, etc. In addition to referral elements being related to distributors and/or retailers, they can also be related to manufactures, groups, people, items, entities and/or variations and/or combinations thereof. Additionally, any referral element related credit rates could vary or not be applied, as associated to distributor(s), retailer(s), entity(s), etc.; whereas monetary based credits could be variable, re-occurring, structured, onetime, milestones based/initiated, etc. Referral element based credit(s) could be applied to the purchase and/or obtainment-of and/or discount-on item(s) such as products, services, etc., of which providers of said item(s) are preferably affiliated with system 600 and/or system 600 related programs and/or services. Optionally, said crediting as related to (for-pay) services can vary both in amount and length of time. Additionally, said crediting could be extended to include credit (preferably monetary) for consumers who obtainment/purchase services, products, item(s), etc., as a result of being referred via initially set and credit tracked services. Yet still, instead of said credit being applied as related to consumer newly activated services, credit (preferably monetary) could also be applied/paid-for by providers, such as advertisers, service providers, product providers, organizations, groups, etc., as a result of FIP related referrals to said provider related services/advertisements/products/etc.

Figure 81A:
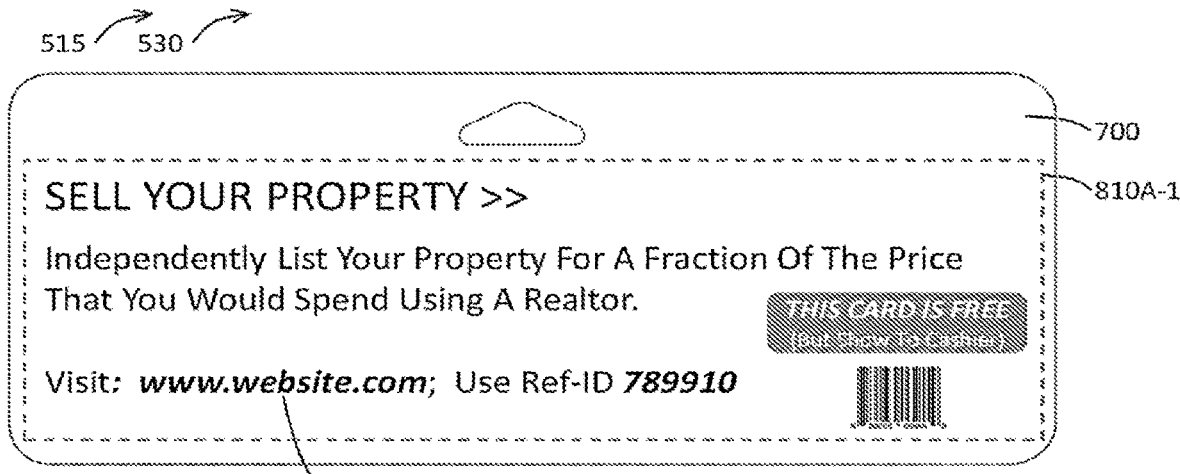
FIG. 81A-B depicts an FIP of a type hang-ready card configured with referral reference information, card primarily meant for retail/service location display and consumer consumption.

FIG. 81A depicts a FIP 700 (of a type hang-ready card configured with a single service reference, card primarily meant for retail/service location display and consumer consumption) configured with contact-element(s) group 810A-1; whereby several FIP700 cards are supplied to provider 515 with said cards intended for display in provider 515 service/retail location; wherein a preferred embodiment an interested consumer 530 while visiting a service/product provider 515 store/location would obtain FIP 700 for future reference in order to access services/products/software/etc. as referred to and configured on FIP 700; whereby consumer 530 referring to FIP 700 would lookup web-address 810X-1 related website services (in this case a services that allows property owners to list and market properties), where preferably during said website user-session consumer 530 would enter FIP 700 configured reference-id, establishing a consumer 530 said services to provider 515 credit/referral tracking link, a link whereby provider 515 could be credited for said services referrals, credit preferably being monetary as similarly depicted in FIG. 47.

Figure 81B:
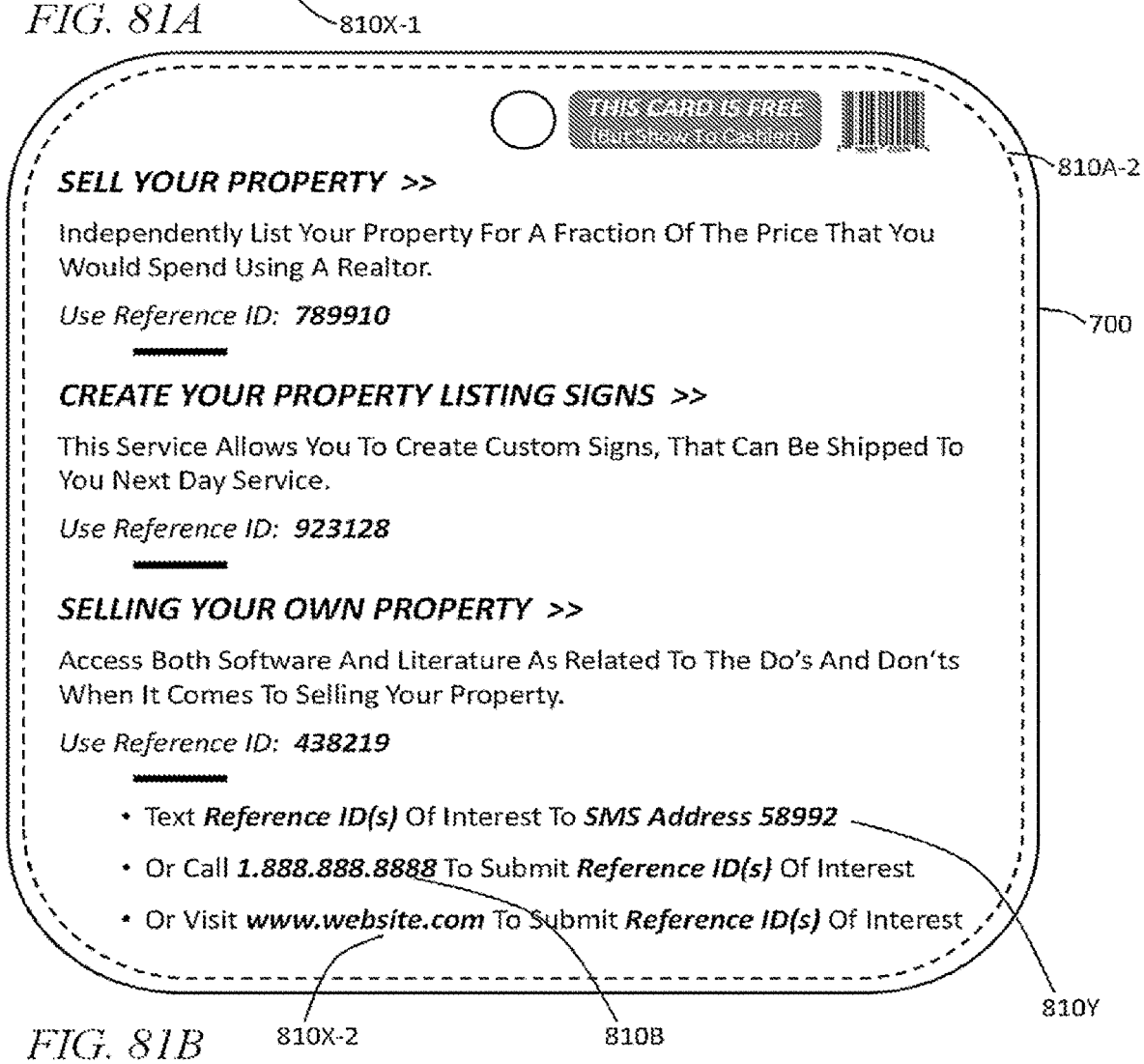

FIG. 81B depicts a FIP 700 (of a type hang-ready card configured with multiple service/product/software references, card primarily meant for retail/service location display and consumer consumption); where similar to FIG. 81A several cards are supplied to provider 515 for display intended for consumption and future reference by consumer 530; whereby to either gain access and/or receive data on how to gain access to FIP 700 referenced item(s), consumer 530 would either look-up web-address 810X-2 as similarly depicted in FIG. 81C and/or send a text-message containing at least one FIP 700 reference id of interest to SMS address 810Y as similarly depicted in FIG. 56 and/or call-to phone number 810B providing at least one FIP 700 reference id of interest as also similarly depicted in FIG. 56.

The process depicted in FIG. 81A-B offers a great opportunity and advantage to both provider 515 and consumer 530 alike; where for provider 515 it makes available another revenue stream previously not available, revenue stream being (monetary) referral credits as related to (online) software/product(s)/service(s)/item(s) sold as a result of a direct referral from a provider 515 to consumer 530 distributed FIP; and where for consumer 530 the process exposes helpful, and preferably proven and tested, software/product(s)/service(s)/item(s) that they might otherwise not be exposed to, in a familiar retail//service location setting. Furthermore, the process provides another revenue stream previously not available to the providers of the FIP referenced software/product(s)/service(s)/item(s), revenue stream being sales of said software/product(s)/service(s)/item(s) as a direct result of FIP related referrals.

In FIG. 81A-B alternatively, the FIP configured look-up web-address related service website could be a third party website; whereby consumer 530 would enter FIP 700 reference id(s) of interest to said third party website, and where said third party website related services could make available access information (e.g. passwords, pins, codes, login names, website-addresses, addresses, contact information, codes, etc.) as related to acquiring said entered FIP 700 reference id(s) related item(s); furthermore and preferably, said third party services would also maintain said entered reference id(s) and related said item(s) access data for crediting and/or referral tracking purposes, tracking processes as similarly described in FIG. 47; furthermore still, FIP 700 distribution tracking processes as similarly described in FIG. 57 could also be applied, where anyone or combination of FIP 700 configured and applicable contact-element(s) could be used for down-line distribution tracking purposes. It is preferred that said third party services be linked with and/or provided with data from said FIP 700 referenced item(s) provider systems, the most important data being said access related data; furthermore, at the time consumer 530 is submitting said reference id data to said third party systems said third party services could obtain/confirm other consumer 530 data (e.g. email addresses, phone numbers, addresses, contact information, names, profile pictures, other information, other files etc.), additional consumer 530 data that could be shared with said item(s) provider system(s), where said shared data would preferably be used for said item(s) access/obtainment purposes (i.e. setting up a service account). As an alternative to (and/or in addition to) said consumer 530 submitting data, including said reference id, to said third party system via said third party website in order to receive access data, instead upon consumer 530 said data submittal, third party system could navigate to a related (activated) service account webpage and/or to online store webpage and/or to any predestinated/applicable (services) webpage; wherein pertinent consumer 530 web-session activity, including purchase/obtainment of said item(s), data would be provided to said third party systems for credit/referral tracking purposes. In the case where said third party system makes available said access information to consumer 530, it is preferred that pertinent consumer 530 data as related to the purchase/obtainment of said item(s) be made available to said third party system for credit/referral tracking purposes. Third party systems in yet another alternative could conduct the transaction and the (optional) delivery of said and entered reference id related item(s).

In FIG. 81A-B, FIP 700 could be configured with any applicable contact-element(s) group arrangement, including the number of advertised item(s); FIP 700 could instead be any other applicable FIP type; various FIP 700 (cards) configured with varying information (offering various software, products, services, items, etc.) could be displayed for consumer consumption; FIP 700 configured reference ids could further function as discount codes, incenting users to enter code when requested; the reference id system submittal process/method could vary; product barcodes shown are optional and would preferably be used for inventory tracking purposes; a picture processing method as similarly described in FIG. 56 could be used to access FIP 700 referenced item(s).

As related to FIGS. 2, 43-45, 47, 52-53, 57, 71-72, 76 and/or any other process related FIGS. as presented in the current application, it is noted and as appropriate, the steps described could be re arranged, collapsed, expanded, removed, occur concurrently, occur simultaneously, have other steps added, be further broken down into sub-steps, etc., to achieve the same generally intended process and/or outcome.

FIP(s), as appropriate, alternatively:
1) Could be constructed from a single part.
2) Could be constructed from multiple parts and assembled during the manufacturing process and/or bundled intended for assembly by owner 500.
3) Could be comprised of many packaged/bundled parts intended for assembly and/or include part(s) intended for use separately.
4) Could be bundled with other FIP(s), whereas FIP 700 could be designed to function either independently and/or in conjunction with other FIP and/or non FIP related products and/or objects. FIP(s) could be designed to allow for attachment with other FIP(s) in a permanent, temporary or re-attachable fashion.
5) Could consist of at least one part and be fabricated from paper-based product, plastics, metals, composites, chemicals/compounds, furthermore and variations and combinations thereof. More specifically at least one part could be fabricated from polymers, rubbers, magnets, magnetic strips, Velcro®, static film material, peel-away adhesive backed materials, Dry Erase® pen-erasable and erase-durable materials, pen-erasable and erase-durable materials, pen writable and durable material, software media in the form of software and variations and combinations thereof.
6) Could consist of at least one component as selected from a group of mechanical components, electric components, computing components, chemical components and variations and combinations.
7) Could have associated graphics, which includes text, configured directly onto preferably bundled labels, tags and/or other objects; whereas objects would be preferably intended for placement onto the FIP preferably identified/designated placement areas; furthermore said labels/tags could be blank or partially blank to allow for placement of additional owner 500 placed customizable graphics; furthermore still objects meant for attachment to FIP(s) could be made for permanent, temporary and/or re-attachable placement onto/with FIP, more specifically said objects could be applied to FIP(s) by means of adhesives, tapes, fastening hardware, snap-fits, Velcro® and/or any other applicable attachment method.
8) Could contain multiple contact-element(s) groups.
9) Could additionally be configured with any arrangement of complementary graphics, including art, attached objects, marketing/advertising information, information, instructions, text and/or variations and/or combinations thereof.
10) Could be bundled with accessory parts such as, alpha-numeric characters, labels and/or tags that could either be permanently, temporarily or re-attachably applied; alpha-numeric stencils; various packaging related materials; writing utensils, such as Dry Erase® pens; software, such as label creation software; print ready label stock; pre-printed label stock; mounting and displaying materials; tools, equipment and/or hardware; other accessories; other bundles and variations and combinations thereof.
11) Could have product barcodes located on FIP associate packaging and/or on FIP bundles; or product barcode could be omitted all together.
12) Rather than be intended for public display it could be intended for private or limited use display for a targeted person, people or audience.
13) Could be made on demand through use of service website(s) and/or software; furthermore FIP(s) could be printed and/or assembled locally by an owner 500 and/or manufactured remotely by a fabricator and then sent to owner 500; furthermore this software could be distributed similar to the mass manufactured for distribution FIP products, including serialized tracking for distributor crediting purposes; furthermore still, service website referral and instructional information could be placed/configured on applicable media for mass manufacture and distribution.
14) Could be an information packet containing contact-element FIP-instructions only; whereas FIP-instructions would be placed on any form of applicable media and optionally packaged.
15) Could be configured with graphics and dedicated areas for owner 500 to include custom graphics, including text.
16) Could contain placement areas intended for placement of system generated and/or non-system generated, non-contact related elements, i.e. custom titles, graphics, text, headings, objects etc.; whereby non-contact related and applicable elements could be configured onto labels or similar, intended for application into said placement area(s).

Contact-Element(s) Groups, as Appropriate, Alternatively:
1) Could contain at least one contact-element as selected from phone numbers, mobile application names, application names, web addresses; ip addresses; fax numbers; email addresses, soft-phone ip-addresses, internet call service (e.g. Skype) addresses, SMS addresses, mailing addresses, any electronic-call address, any reference ids, pins, passwords, codes, temporary pins, temporary passwords, any pins, any passwords, code words, discount code, discount id, promotional id, promotional code, serialized barcodes, serialized code, QR codes, any system 600 linked data-strings/codes/ids, any contact-element (placement) areas, FIP-instructions, encoded graphics, encoded elements/data, encoded element/data arrangements, encoded data/element spacing, encoded data/element type, encoded features, encoded feature arrangements, encoded feature spacing, encoded feature type, encoded FIP incorporated features, encoded FIP incorporated feature arrangements, encoded FIP incorporated feature spacing, encoded FIP incorporated feature type, encoded related FIP shape, encoded FIP area shapes; any referral elements and/or any variations and/or combinations thereof. Referral elements are used for FIP related credit and referral tracking purposes (as depicted in FIGS. 46-70) and include referral phone numbers, referral web addresses, referral codes, referral ids, referral serialized codes, referral address, referral barcodes, referral QR codes, etc.
2) Could place contact-element FIP-instructions onto FIP associated packaging; and/or onto a separated/applicable media that could then be bundled with the FIP; and/or FIP instructions could reside on system 600 and be presented to owner 500 upon first access when setting services 900. FIP-instructions could also instruct viewer 510 on how to use FIP. In addition, FIP-instructions could incorporate marketing, advertising and/or promotional elements as well; another undesirable alternative would be to omit FIP-instructions all together. FIP-Instructions could be placed on any applicable area on and/or in FIP as one area/block of information and/or as multiple smaller areas/blocks of information.
3) Could vary in arrangement and/or graphics/text layout as it relates to identifying and/or the labeling of contact-element(s) within the contact-element group; furthermore contact-element(s) related graphics/text could be omitted all together.
4) Could have at least one contact-element which is referenced by/in at least one other contact-element(s) group.
5) Could be configured with at least one call address and multiple call address related reference ids and/or contact-element (placement) areas for system 600 generated reference ids; furthermore reference ids could point to the same or different system services 900 and/or all/any combinations thereof.
6) Could be configured onto FIP related objects, such as labels that are intended for placement onto FIP, preferably pre-designated placement areas; furthermore and more specifically contact-element(s) or contact-element parts could also or instead of be configured onto said objects.
7) Could be configured with at least one temporarily concealed contact-element as depicted in FIGS. 26 and 27.
8) Could contain contact-element(s) which initially point to preset system services 900, services of which none to all could be set by owner 500.
9) The activation barcodes also referred to as serialized barcodes, as depicted in FIGS. 25-27 could be placed/located on the FIP related packaging and/or placed on some applicable media and bundled with FIP. The activation of a FIP related barcode could activate one to all of the contact-element(s) groups contained on a single FIP or contained within a multiple FIP bundle. Furthermore, said activation barcode would preferably contain human readable and directly translated code, human readable code that could be manually entered to system 600 and/or system 600 related systems should a scanner and/or similar device become unavailable. Furthermore still, as an alternative to standard barcode(s) being used any number of other scan-able methods/processes including the use of other scan-able codes/patterns, frequency, special material and any other viable scan based methods could be used.
10) Could consist of parts configured onto different label(s), object(s), item(s) etc.

System Services 900, as Appropriate:
1. Can be pointed to by one or many contact-element(s).
2. Can be maintained on a single system or multiple systems.
3. Can be displayed over many sites, web-based or otherwise
4. Can consist of at least one service.
5. Can consist of at least one service-application.
6. Can be turned on/off by FIP related users.
7. Can be comprised of applications that can be turn/on, initiated by FIP users.
8. Can contain various user/people/groups/organizations/system/services/applications access-level permission settings.
9. Can include pay-for, free and/or a combination of pay/free services.
10. Can be credit/referral tracked/traced back to FIP through up-line distribution.
11. Could provide instructions, more specifically they could provide FIP related instruction on how/where/why to design, build, order, custom-order, etc. various kinds of FIP(s).

Contact-element(s), (including call addresses), as appropriate and applicable, alternatively, could be alpha based; numeric based; scan readable; frequency based; any other readable format based and/or any variation and/or combination thereof.

An FIP reference id, as appropriate and applicable, alternatively, could be unique at a FIP, call address, system service, system, manufacturer, distributor, any definable group and/or combinations thereof defined level.

An FIP call address, as appropriate and applicable, alternatively, could be unique at a FIP, call address, system service, system, manufacturer, distributor, any definable group and/or combinations thereof defined level.

An FIP product barcode, as appropriate and applicable, alternatively, could be unique at a FIP, call address, system service, system, manufacturer, distributor, any definable group and/or combinations thereof defined level.

An FIP activation barcode, as appropriate and applicable, alternatively, could be unique at a FIP, call address, system service, system, manufacturer, distributor, any definable group and/or combinations thereof defined level.

Any FIP contact-element, as appropriate and applicable, alternatively, could be unique at a FIP, call address, system service, system, manufacturer, distributor, any definable group and/or combinations thereof defined level.

As an alternative to system 600 generating to send contact-element data for user placement onto FIP(s), the system could instead send previously entered/stored and maintained contact-element(s) to owner 500 (user) for placement onto FIP. Furthermore, system 600 method of contact-element send could be completed via IVR voice applications; IM/SMS/Text applications; web/internet applications; request to physical have mail containing data sent; by fax; by email and/or combinations and/or variations thereof and/or by any other method by which data/information could be sent to owner 500.

When a FIP viewer/consumer calls to system 600 to access services and/or to set services system 600 could capture call related data during the call session, e.g. caller-id, service(s) accessed, system 600 area(s) accessed, call initiation time, call disconnection time, etc. so at a future time said viewer/consumer could access said call session related information either when calling back to system 600 and/or via a services website and/or via any other applicable method by which call session related information/data could be retrieved. Optionally, a pin/password/transaction-id/etc. could be provided to said viewer during the call session, for use to securely access said session information at some future point.

As an alternative to System 600 generating to send/provide system services related data to FIP viewer 510, the system could instead send data via, IVR voice applications; im/SMS/text applications; web/internet applications; request to physical have mail containing data sent; by fax; by email and/or combinations and/or variations thereof and/or by any other method by which data/information could be sent to viewer 510.

An alternative for system 600 received data is, when system 600 first detects inbound data, the sent-from device data, i.e. caller-id, ip-address, etc. along with/without system-address data, also known as the address used to call-to/send said system 600 inbound data to, can be used to initiate/activate any applicable services 900 related and/or system 600 related unique and/or general auto-response. This alternative provides the advantage of speed providing the minimal number of steps to set system-services, in this case for the most part, involving 1-step.

System 600 should not be considered limited in, functionality and/or capability(s); compatibility and/or access to/with third party system(s) and/or network(s).

In order to process mail related services as depicted in FIGS. 23-24, system 600 could be integrated with physical mail processing related assets/organizations/processes/services/etc., that would fulfill physical mail related system services requests.

System 600 generated contact-element(s) could be scribed and/or applied to FIP(s) in any number of ways, including the use of stencils, adhesively attached characters, mechanically attached characters, removably attached characters, pre-configured labels, etc.

System services 900 can be any service and/or combination of services that can be modified/set by FIP related administrators/owners; whereon and typically an administrator, preferably through a services 900 related administrator account, could set data, information and services related settings, preferably as they relate to a FIP and/or FIP related and/or advertised object, product, service, event, information, item, etc.

FIP inquiring users, e.g. viewers, consumers, owners, etc. can interact with system-services in a variety of ways, in both sending and/or receiving information, files, data, objects, items, etc., simply called item(s). Item(s) exchange/interaction methods can include but are not limited to, system-to user sent/received, calls, SMS (text) messages, electronic messages, faxes, scanned data, website placed item(s), any electronic-site placed item(s), application provided item(s), physical courier services mailed item(s), and/or any applicable way to send/receive item(s), and/or variations thereof and/or combinations thereof; whereas said interactions can be fully automated, live person involved or both automated and live person involved; and whereas initiation sources to send said item(s) can include, but are not limited to, people, services, applications, web services, web applications, systems, system 600, computers, user devices, user communication devices, mobile electronic devices, any applicable device/service/application; and/or variations thereof and/or combinations thereof; and whereas processing of said item(s) can occur at/by/in, systems, services, applications, physical service providers, electronic service providers, providers, people, machines, any applicable item processor, any applicable method by which to process said item(s) and/or variations thereof and/or combinations thereof; and whereas said item exchange requests, by system(s) to FIP user(s) or by FIP user(s) to system(s), are not limited, including at least one said exchange.

Services related data that can be exchanged between system-services and FIP users can include, but are not limited to, data sets/categories related to ANY contact element, any non-system linked contact-element equivalent element, payments, credit-cards, personal information, medical information, files, appointments, receipts, advertisings, marketing, specifications, dates/times, names, titles, headings, short descriptions, descriptions, statistics, scores, gaming information, profile names, login names, picture files, wave files, video files, media files, document files, any-files, account information, profile information, online service information, physical services information, financial information, financial stock codes, abbreviated names, faxes, instructions, directions, comments, requests, SKUs, product-ids, program-ids, department names/ids, organization information, product information, visual-media services data, audio-media services data, print-media services data, other-media services data, any applicable data, and/or variations thereof, and/or combination thereof.

Services related function(s) can include, but are not limited to, performing calculations; management/processing/storage/distribution/calculation of contact-element(s), data/item(s), etc.; analyzing contact-element(s), patterns, user behaviors, behaviors, data/item(s), etc.; management of contact-element(s), products, services, addresses, IDs, IPs, web-addresses, websites, financials, statistics, logs, data/item(s), etc.; auto creation/maintenance/generation of contact-element(s), accounts, services, sites, memberships, transactions, online products, products, data/item(s), etc.; (auto) translations/conversion of contact-element(s), codes, languages, currencies, rates, data/item(s), etc.; processing contact-element(s), alerts, notifications, calls, emails, faxes, texts, pictures, files, data/item(s), etc.; searching/searching-for contact-element(s) data/item(s), etc.; manipulation of contact-element(s), data/item(s), etc.; making data/item(s), etc. available to users, systems, services, applications, sites, locations, entities, organizations, groups, people, etc.; and/or variations thereof and/or combinations thereof.

More specifically, call services are not limited in their type, capability and/or scope, but generally serve as a call attendant, either processing FIP viewer incoming calls or providing FIP administrators access to set system 600 maintained and related services. The following are call service example(s) and as such should not be considered limiting; they can be comprised of a single to any combination of (applicable) service(s), including the service(s) described below:

Call Service (1-1) Named, Notification and Review Call Service

[Version-1] Is a call service whereby a FIP administrator can set at least one recorded notification, assumedly related to an FIP related advertised item; whereby a FIP viewer upon connecting with said call service would have the option to review said administrator previously set notification(s).

Call Service (2-1) Named, Leave a Message Call Service

[Version-1] Is a call service whereby a FIP administrator could preferably set a custom message greeting, whereby FIP viewer upon connecting with said call service would have the option to leave said administrator a message, for future retrieval and/or review.

Call Service (3-1) Named, Call Action Request

[Version-1] Is a call service whereby a FIP viewer would be given the option of sending an action request to related FIP administrator, e.g. call back request, etc. Preferably, said call service would collect to make available said viewer call related data to said owner.

Call Service (4-1) Named, Call Connection Service

[Version-1] Is a call service whereby a FIP administrator could set at least one call forwarding extension (or call address); whereby a FIP viewer upon connecting with said call service would review-to-select a said administrator previously set extension or call address, at which point system 600 could place and connect the call. Alternatively, call service could auto-place calls to said administrator preset call address(es).

Call Service (5-1) Named, Call to Retrieve Texted Back Data

[Version-1] Is a call service, whereby a FIP administrator could store at least one text, picture, video, audio, file and/or variations/combinations thereof (data) onto system 600; and whereas viewer upon connecting with said call service, via a text enabled phone, could request that at least one said file be sent, via SMS/text-message, back to said viewer text enabled phone. Alternatively, instead of said FIP administrator data being texted back, system 600 generated/available data could be texted back, e.g. system linked contact-element data, etc.

More specifically, SMS services are not limited in their type, capability and/or scope, and typically involve processing FIP viewer sent SMS-text messages, triggering a system 600 initiated action. The following are SMS services example(s) and as such should not be considered limiting; they can be comprised of a single to any combination of (applicable) service(s), including the service(s) described below:

SMS Service (1-1) Named, Send Text to Retrieve Texted Back Data

Is a SMS service, whereby a FIP administrator could store at least one text, picture, video, audio, file and/or variations/combinations thereof (data) onto system 600; and whereas upon a FIP viewer sending a SMS text-message to system 600, said system would send a text containing said data back to said viewer text enabled phone. Alternatively, a said sent text could include a code, word, phrase, etc. requesting specific FIP administrator data be sent. Furthermore, instead of said FIP administrator data being texted back, system 600 generated/available data could be texted back, e.g. system linked contact-element data, etc.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

The invention claimed is:

1. A system comprising:
   an item including a system-linked readable code, wherein the system-linked readable code comprises a customized action setting, the customized action setting being associated with activation of a preset computerized response, the preset computerized response being configured to activate responsive to a computerized device receiving digital input comprising scanned data, the scanned data including the system-linked readable code; and
   a computer system configured to: receive a customized information, the customized information including user provided information; generate the customized action setting responsive to receiving the customized information; generate the system-linked readable code responsive to generating the customized action setting; wherein the preset computerized response activated by the customized action setting comprises one or more computerized actions, the one or more computerized actions comprising the generating of information derived from the customized information, wherein the information derived from the customized information is not the same as the customized information.

2. The system of claim 1, wherein the system-linked readable code is a scannable code.

3. The system of claim 1, wherein the system-linked readable code is one of a QR code.

4. The system of claim 1, wherein the preset computerized response system-linked readable code is a barcode.

5. The system of claim 1, wherein the item comprises a physical item.

6. The system of claim 1, wherein the item comprises a digitally presented item.

7. The system of claim 6, wherein the digitally presented item comprises a digital communication.

8. The system of claim 6, wherein the digitally presented item comprises an email communication.

9. The system of claim 6, wherein the computer system is further configured to communicate the digitally presented item with the system-linked readable code.

10. The system of claim 1, wherein the digitally presented item with the system-linked readable code is transmitted according to the customized information.

11. The system of claim 1, wherein the one or more computerized actions further comprises printing a physical item, the physical item displaying the information derived from the customized information.

12. The system of claim 1, wherein the one or more computerized actions further comprises displaying on a user device the information derived from the customized information.

13. The system of claim 1, wherein the information derived from the customized information comprises a second system-linked readable code.

14. The system of claim 1, wherein the user provided information comprises user contact information.

15. A system comprising:
a digitally presented item including a system-linked readable code, wherein the system-linked readable code comprises a customized action setting, the customized action setting being associated with activation of a preset computerized response, the preset computerized response being configured to activate responsive to a computerized device receiving a digital input comprising scanned data captured by a camera associated with the computerized device, the scanned data including the system-linked readable code; and
a computer system configured to: receive a customized information, the customized information including user provided information; generate the customized action setting responsive to receiving the customized information; generate the system-linked readable code responsive to generating the customized action setting; transmit the digitally presented item with the system-linked readable code, the digitally presented item being transmitted according to the customized information;
wherein the preset computerized response activated by the customized action setting comprises one or more computerized actions, the one or more computerized actions comprising the generating of information derived from the customized information, wherein the information derived from the customized information is not the same as the customized information and comprises a second system-linked readable code.

16. The system of claim 15, wherein the system-linked readable code is a QR code.

17. The system of claim 15, wherein the second system-linked readable code is a scannable code.

18. The system of claim 15, wherein the second system-linked readable code is a barcode.

19. The system of claim 15, wherein the digitally presented item comprises a digital communication.

20. The system of claim 15, wherein the digitally presented item comprises an email communication.

21. The system of claim 15, wherein the one or more computerized actions further comprises printing a physical item, the physical item displaying the second system-linked readable code.

22. The system of claim 15, wherein the user provided information comprises contact information.

23. A method for providing a system-linked item using a computerized system over a global communication network, the method comprising the steps of:
receiving a customized information, the customized information including user provided information;
generating a customized action setting responsive to receiving the customized information, the customized action setting being associated with activation of a preset computerized response, the preset computerized response being configured to activate responsive to a computerized device receiving digital input comprising scanned data, the scanned data including the system-linked readable code;
generating a system-linked readable code responsive to generating the customized action setting; and
communicating a digitally presented item with the system-linked readable code, the digitally presented item being communicated according to the customized information;
wherein the preset computerized response activated by the customized action setting comprises one or more computerized actions, the one or more computerized actions comprising the step of:
generating an item, the item including information derived from the customized information, wherein the information derived from the customized information is not the same as the customized information.

24. The method of claim 23, wherein the item is a digital item, the method further comprising the step of displaying the digital item on a user device.

25. The system of claim 23, wherein the information derived from the customized information comprises a second system-linked readable code.

26. The method of claim 23, wherein the item is a physical item, the method further comprising the step of printing the physical item, the physical item displaying the information derived from the customized information.

* * * * *